US010139695B2

(12) United States Patent
Lam et al.

(10) Patent No.: US 10,139,695 B2
(45) Date of Patent: *Nov. 27, 2018

(54) VARIABLE TRANSMITTANCE OPTICAL DEVICES

(71) Applicant: Switch Materials, Inc., Burnaby (CA)

(72) Inventors: Duhane Lam, Vancouver (CA); Neil Robin Branda, North Vancouver (CA); Matthew Paul Smit, Burnaby (CA); Peter Alexander Von Hahn, Vancouver (CA)

(73) Assignee: SWITCH MATERIALS, INC., Burnaby (BC) (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,980

(22) Filed: Oct. 2, 2015

(65) Prior Publication Data

US 2016/0085131 A1    Mar. 24, 2016

Related U.S. Application Data

(63) Continuation of application No. 13/994,388, filed as application No. PCT/CA2011/001377 on Dec. 15, 2011, now Pat. No. 9,176,357.
(Continued)

(51) Int. Cl.
*G02F 1/163* (2006.01)
*G02F 1/01* (2006.01)
(Continued)

(52) U.S. Cl.
CPC ............... *G02F 1/163* (2013.01); *B60J 3/04* (2013.01); *G02B 5/208* (2013.01); *G02B 5/23* (2013.01);
(Continued)

(58) Field of Classification Search
CPC ... B60J 3/002; B60J 3/005; B60J 3/04; G02B 5/208; G02B 5/23; G02C 7/101;
(Continued)

(56) References Cited

U.S. PATENT DOCUMENTS 3,837,118 A   9/1974  Goss, Jr. et al.
4,370,830 A   2/1983  Schaefer et al.
(Continued)

FOREIGN PATENT DOCUMENTS

JP    57-167009    10/1982
JP    08-160471     6/1996
(Continued)

OTHER PUBLICATIONS

Bar et al., "A new approach for design of organic electrochromic devices with inter-digitated electrode structure", *Solar Energy Materials & Solar Cells*, vol. 93, 2009, pp. 2118-2124.
(Continued)

*Primary Examiner* — Loha Ben
(74) *Attorney, Agent, or Firm* — Merchant & Gould P.C.

(57) ABSTRACT

A self-powered variable transmittance optical device, such as a smart window or other device, and associated method are provided. The device comprises one or more transparent substrates, with a switching material disposed thereon or therebetween. The switching material may be a hybrid photochromic/electrochromic material capable of transitioning from a first transmittance state to a second transmittance state with application of electricity, and from second state to first state due to another stimulus, such as UV radiation. Electrodes are coupled to the switching material for applying electricity. An electrical system provides for controllable application of the electricity, and may store energy. Energy is provided by an energy-harvesting power source such as a solar cell or other photovoltaic source, or array thereof, or
(Continued)

another device for harvesting vibrational or thermal energy. Energy harvesting, energy storage capacity and/or switching material may be configured to provide at least a predetermined level of device operability.

10 Claims, 19 Drawing Sheets

Related U.S. Application Data

(60) Provisional application No. 61/423,524, filed on Dec. 15, 2010.

(51) Int. Cl.
| | |
|---|---|
| *G02F 1/157* | (2006.01) |
| *G02B 5/20* | (2006.01) |
| *G02B 5/23* | (2006.01) |
| *B60J 3/04* | (2006.01) |
| *G02F 1/15* | (2006.01) |
| *G02C 7/10* | (2006.01) |
| *G09G 3/38* | (2006.01) |
| *G09G 3/34* | (2006.01) |
| *G02F 1/153* | (2006.01) |

(52) U.S. Cl.
CPC ............ *G02C 7/101* (2013.01); *G02C 7/102* (2013.01); *G02F 1/0102* (2013.01); *G02F 1/0126* (2013.01); *G02F 1/15* (2013.01); *G02F 1/157* (2013.01); *G09G 3/38* (2013.01); G02F 1/153 (2013.01); G02F 2201/086 (2013.01); G02F 2202/14 (2013.01); G09G 3/34 (2013.01); Y10T 29/49155 (2015.01)

(58) Field of Classification Search
CPC . G02C 7/102; G09G 3/34; G09G 3/38; G02F 1/0102; G02F 1/0018; G02F 1/0126; G02F 1/132; G02F 1/15; G02F 1/153; G02F 1/1533; G02F 1/155; G02F 1/157; G02F 1/163; G02F 2201/086; G02F 2202/14; G02F 2203/48; E06B 9/24; E06B 2009/2405; B32B 17/10486; B32B 17/10513
USPC ....... 359/238, 241, 244, 245, 265, 267, 275, 359/288; 345/105; 29/825, 846; 156/99
See application file for complete search history.

(56) References Cited

U.S. PATENT DOCUMENTS

| | | | |
|---|---|---|---|
| 4,475,031 A | 10/1984 | Mockovciak, Jr. | |
| 5,355,245 A | 10/1994 | Lynam | |
| 5,384,653 A * | 1/1995 | Benson | G02F 1/153 359/265 |
| 5,463,491 A | 10/1995 | Check, III | |
| 5,604,626 A | 2/1997 | Teowee et al. | |
| 5,649,389 A | 7/1997 | Coddens | |
| 5,729,379 A * | 3/1998 | Allemand | G02F 1/15 359/270 |
| 5,805,330 A * | 9/1998 | Byker | G02F 1/13318 359/265 |
| 5,806,256 A | 9/1998 | Byrne | |
| 5,838,483 A | 11/1998 | Teowee et al. | |
| 6,055,088 A | 4/2000 | Fix et al. | |
| 6,055,089 A | 4/2000 | Schulz et al. | |
| 6,065,836 A | 5/2000 | Krishnan et al. | |
| 6,084,702 A * | 7/2000 | Byker | B32B 17/10036 106/31.17 |
| 6,178,034 B1 * | 1/2001 | Allemand | G02F 1/1521 359/265 |
| 6,185,034 B1 * | 2/2001 | Nakamura | G02F 1/1533 359/265 |
| 6,246,505 B1 | 6/2001 | Teowee et al. | |
| 6,256,931 B1 | 7/2001 | Kenkel et al. | |
| 6,266,177 B1 * | 7/2001 | Allemand | G02F 1/1523 252/500 |
| 6,297,900 B1 | 10/2001 | Tulloch et al. | |
| 6,301,039 B1 * | 10/2001 | Tench | G02F 1/1506 359/266 |
| 6,597,489 B1 | 7/2003 | Guarr et al. | |
| 6,606,184 B2 | 8/2003 | Guarr et al. | |
| 6,910,729 B2 | 6/2005 | Kraenzler et al. | |
| 6,934,067 B2 | 8/2005 | Ash et al. | |
| 6,961,168 B2 * | 11/2005 | Agrawal | B60R 1/088 252/583 |
| 6,984,902 B1 | 1/2006 | Huang et al. | |
| 7,300,167 B2 | 11/2007 | Fernando et al. | |
| 7,323,634 B2 | 1/2008 | Speakman | |
| 7,382,512 B2 * | 6/2008 | Chen | G02F 1/135 313/463 |
| 7,385,333 B2 | 6/2008 | Chou et al. | |
| 7,397,169 B2 | 7/2008 | Nersessian et al. | |
| 7,450,292 B1 * | 11/2008 | Burrell | B60R 1/088 252/583 |
| 7,459,189 B2 | 12/2008 | Tahara et al. | |
| 7,535,614 B1 * | 5/2009 | Tapley | B60J 3/04 345/105 |
| 7,679,810 B2 * | 3/2010 | Fuss | G02F 1/1533 345/105 |
| 7,719,748 B2 * | 5/2010 | Hall | G02F 1/1523 345/105 |
| 7,746,534 B2 | 6/2010 | Tonar et al. | |
| 7,755,829 B2 * | 7/2010 | Powers | E06B 9/24 359/227 |
| 7,768,693 B2 * | 8/2010 | McCarthy | G02B 5/223 250/517.1 |
| 7,777,055 B2 | 8/2010 | Branda et al. | |
| 7,998,546 B2 * | 8/2011 | Wisnudel | G09F 3/0291 283/72 |
| 8,030,807 B2 | 10/2011 | Gieras et al. | |
| 8,072,672 B2 * | 12/2011 | Powers | E06B 9/24 359/227 |
| 8,169,685 B2 * | 5/2012 | Powers | E06B 9/24 359/227 |
| 8,441,707 B2 * | 5/2013 | Lam | G02B 5/23 359/241 |
| 8,450,503 B2 | 5/2013 | Branda et al. | |
| 8,687,258 B2 * | 4/2014 | Lam | G02F 1/0126 359/241 |
| 8,755,105 B2 * | 6/2014 | Powers | E06B 9/24 349/167 |
| 8,760,750 B2 * | 6/2014 | Powers | E06B 9/24 349/167 |
| 8,837,032 B2 * | 9/2014 | Lam | G02B 5/23 359/241 |
| 9,235,099 B2 * | 1/2016 | Lam | G02B 5/23 |
| 2002/0005977 A1 | 1/2002 | Guarr et al. | |
| 2006/0007519 A1 | 1/2006 | Kanouni et al. | |
| 2006/0209007 A1 | 9/2006 | Pyo et al. | |
| 2007/0128905 A1 | 6/2007 | Speakman | |
| 2007/0153355 A1 | 7/2007 | Huang et al. | |
| 2007/0220427 A1 | 9/2007 | Briancon et al. | |
| 2008/0066796 A1 | 3/2008 | Mitchell et al. | |
| 2008/0239452 A1 | 10/2008 | Xu et al. | |
| 2009/0002802 A1 | 1/2009 | Shibuya et al. | |
| 2010/0072759 A1 | 3/2010 | Andosca et al. | |
| 2010/0266801 A1 | 10/2010 | Jahoda et al. | |
| 2011/0047875 A1 | 3/2011 | Kelley | |
| 2011/0063061 A1 | 3/2011 | Fullerton et al. | |
| 2011/0078963 A1 | 4/2011 | Pardue et al. | |
| 2011/0100709 A1 | 5/2011 | Wang et al. | |
| 2011/0215590 A1 | 9/2011 | Arnold et al. | |

FOREIGN PATENT DOCUMENTS

| | | |
|---|---|---|
| WO | WO 02/18132 | 3/2002 |
| WO | WO 2004/015024 | 2/2004 |

(56) References Cited

FOREIGN PATENT DOCUMENTS

| WO | WO 2006/125317 | 11/2006 |
|---|---|---|
| WO | WO 2009/087575 | 7/2009 |
| WO | WO 2010/142019 | 12/2010 |
| WO | WO 2012/125348 | 9/2012 |
| WO | WO 2013/044371 | 4/2013 |

OTHER PUBLICATIONS

Bechinger et al., "Photoelectrochromic windows and displays", *Letters to Nature*, vol. 383, 1996, pp. 608-610.
Deb et al., "Stand-alone photovoltaic-powered electrochromic smart window", *Electrochimica Acta*, vol. 46, 2001, pp. 2125-2130.
Extended European Search Report from European Application No. 10785617.1 dated Jan. 31, 2013.
Gilat et al., "Light-triggered Electrical and Optical Switching Devices", *J. Chem. Soc.*, vol. 18, 1993, pp. 1439-1442.
Gorodetsky, Brian, "The Design of Dual-Mode Photochromic and Electrochromic 1,2-Dithienylcyclopentene Dyes", *PhD Dissertation, Simon Fraser University, Ch. 1 and 5, Section 4.4*, 2008.
International Preliminary Report on Patentability from International Application No. PCT/CA2010/000849 dated Dec. 12, 2011.
International Preliminary Report on Patentability from International Application No. PCT/CA2011/001378 dated Jun. 18, 2013.
International Search Report and Written Opinion from International Application No. PCT/CA2010/000849 dated Oct. 27, 2010.
International Search Report and Written Opinion from International Application No. PCT/CA2011/001377 dated Apr. 5, 2012.
International Search Report and Written Opinion from International Application No. PCT/CA2011/001378 Apr. 3, 2012.
Notification Concerning Transmittal of International Preliminary Report on Patentability from International Application No. PCT/CA2011/01377 dated Jun. 27, 2013.
Zhang et al., "An UV photochromic memory effect in proton-based $WO_3$ electrochromic devices", *Applied Physics Letters*, vol. 93, 2008, pp. 203508-1-203508-2.

\* cited by examiner

VARIABLE TRANSMITTANCE OPTICAL DEVICES

RELATED CASES

This application is a Continuation Application of U.S. Non-Provisional application Ser. No. 13/994,388, filed Jun. 14, 2013, (now U.S. Pat. No. 9,176,357), which is a National Stage Application of PCT/CA2011/001377, filed Dec. 15, 2011, which claims the benefit of U.S. Provisional Application No. 61/423,524 filed Dec. 15, 2010, and which applications are incorporated herein by reference. To the extent appropriate, a claim of priority is made to each of the above disclosed applications.

FIELD OF THE INVENTION

The present invention relates generally to variable transmittance optical filters and devices comprising such filters. The devices may further comprise a power source.

BACKGROUND OF THE INVENTION

Optical filters have been used in glazings in window technology to control the flow of light and heat through the glazing. Such filters may be used on any sort of window, including those in buildings, vehicles, aircraft, spacecraft, ships or the like. Optical filters have also been used to regulate lighting and heating levels, for glare reduction, and energy load management. As an example, buildings consume over one third of all energy and over two-thirds of the electricity used in the United States, and are responsible for about one third of all greenhouse gas (GHG) emissions, as well as about 30% of a building's energy loss. As such, windows with improved technology for reducing heat loss and solar heat gain can offer significant benefits and cost savings.

Optical filters have also found application in ophthalmic devices to control the light impacting the eye. Opthalmic applications include, for example, prescription and non-prescription glasses, goggles, sunglasses, visors, and safety eyewear.

There are a number of technologies that have been used in optical filters and related devices and applications for dynamically varying the degree of visible light transmittance, including photochromics, electrochromics, liquid crystals, thermochromics, and suspended particle displays.

Electrochromic, liquid crystal, and suspended particle displays or devices may be switched between states of high light transmissibility to one of a lower light transmissibility (or opacity/increased light scattering for some devices) by application of electricity. Such existing power source and wiring may be used in this manner, and may not be inconvenient when a building is designed to accommodate windows or screens comprising such devices, it may necessitate an undesired amount of routing of electrical cables to the device, or cumbersome retrofitting of wiring to accommodate optical filters put in place after a building is constructed. Where the optical filter is used in a wearable device (e.g. opthalmic devices) portability of the power source is an important factor. Thus, devices with a need for high voltage or a bulky power source may not be suitable.

Several concepts for solar-powered windows have been described. For example, U.S. Pat. No. 4,475,031 discloses a sun-sensitive window comprising liquid nematic crystals powered directly by a solar cell. U.S. Pat. No. 5,384,653 discloses an electrochromic window powered by an array of photovoltaic cells deposited along an edge of the window pane. U.S. Pat. No. 5,805,330 discloses an electro-optic window powered solely by photovoltaic cells placed within the window area. U.S. Pat. No. 6,055,089 discloses an electrochromic window powered by photovoltaic cells positioned so that at least part of the incident light on the cells passes through the electrochromic device, providing a form of feedback control. U.S. Pat. No. 6,297,900 discloses a smart window comprising a regenerative photoelectrochromic photovoltaic power source element covering the window area co-extensively with an electrochromic window element.

Some electrochromic devices require continuous power to maintain the dark or faded state, and the power demand may increase with increasing size of the device, particularly windows. For a solar-powered window, a photovoltaic power source with a surface area of sufficient size to meet the device's power requirement may be of an impractical size, and/or prohibitively expensive. If the photovoltaic power source is on a frame or pane of a window or lens, it may interfere with aspects such as window viewability. As photovoltaic power sources are dependent on the available amount of incident light, some lighting conditions may not consistently provide sufficient incident light to generate sufficient power for operation. Finally, even with self-contained photovoltaic power sources, the solutions identified in the past may not provide an adequate means for retrofitting existing buildings with smart window technology.

Therefore there is a need for a solution that overcomes at least one of the deficiencies in the art.

SUMMARY OF THE INVENTION

The present invention relates generally to variable transmittance optical filters and devices comprising such filters. The devices may further comprise a power source.

In accordance with one aspect of the invention, there is provided a device comprising: a variable transmittance optical filter, a power source; and an electrical system configured to receive power from the power source and to provide a voltage to a first electrode and a second electrode of the variable transmittance optical filter.

In accordance with another aspect of the invention, there is provided an insert window comprising a frame defining an insert window area, a variable transmittance optical filter suspended within the frame, over substantially all the insert window area; and an electrical system configured to receive power from a power source and to provide a voltage to a first and a second electrode of the variable transmittance optical filter.

In accordance with another aspect of the invention, there is provided an insert window comprising: a variable transmittance optical filter, a pane having the variable transmittance optical filter disposed on a first side; and an electrical system configured to receive power from a power source and to provide a voltage to a first and a second electrode.

In accordance with another aspect of the invention there is provided an insert window comprising: a variable transmittance optical filter disposed on a first pane; a first frame holding the first pane and configured for slidably mounting in a second frame, the second frame configured for mounting adjacent to an existing window of a building; and a fastening system for mounting the second frame adjacent to the existing window.

In accordance with another aspect of the invention, there is provided a method of transitioning the device or the insert window from a dark state to a light state comprising the steps of: providing an input for transitioning the device to the control system, the input activating a switch of the control system; and applying power from the power source to the electrodes of the device via the electrical system, the power sufficient to effect transition of the switching material from the dark state to a light state.

In accordance with another aspect of the invention, there is provided a method of operating a smart window comprising the steps of: providing a variable transmittance optical filter; providing a power source and an electrical system configured to receive power from the power source and to provide a voltage to a first electrode and a second electrode of the variable transmittance optical filter; and providing an input to operate a switch, the switch electrically connecting and applying a voltage from the power source to the first and second electrodes of the variable transmittance optical filter; and activating the switch.

The variable transmittance optical filter may comprise a first substantially transparent substrate comprising a first electrode, a second substantially transparent substrate comprising a second electrode; a switching material disposed between, and operatively coupled to, the first and second electrodes, the switching material transitionable from a first light transmittance state to a second light transmittance state with application of voltage to the switching material, and transitionable from the second light transmittance state to the first light transmittance state with application of a second non-electrical stimulus.

In accordance with an aspect of the present invention, there is provided a self-powered variable transmittance optical device comprising: a substantially transparent substrate; a switching material disposed on the substrate, the switching material configured to transition from a first transmittance state to a second transmittance state due at least in part to application of an electric voltage, the switching material configured to transition from the second transmittance state to the first transmittance state due at least in part to a stimulus other than the electric voltage; a first and second electrode operatively coupled to the switching material; an energy-harvesting power source; and an electrical system configured to receive power from the energy-harvesting power source and to provide power to the first electrode and the second electrode for application of the electric voltage.

In accordance with another aspect of the present invention, there is provided a self-powered variable transmittance optical device comprising: a substantially transparent substrate; a switching material disposed on the substrate, the switching material capable of transitioning between a light state and a dark state based at least in part on application of an electric voltage; a first and second electrode operatively coupled to the switching material; an energy-harvesting power source; and an electrical system configured to receive power from the energy-harvesting power source and to provide power to the first electrode and the second electrode for application of the electric voltage.

In accordance with another aspect of the present invention, there is provided a self-powered variable transmittance optical device film comprising: a substantially transparent and flexible substrate; a switching material flexibly disposed on the substrate, the switching material capable of transitioning between a light state and a dark state based at least in part on application of an electric voltage; a first and second electrode operatively coupled to the switching material; an energy-harvesting power source flexibly disposed on the device film; and an electrical system configured to receive power from the energy-harvesting power source and to provide power to the first electrode and the second electrode for application of the electric voltage, the electrical system flexibly disposed on the device film.

In accordance with another aspect of the present invention, there is provided a method for preparing a self-powered variable transmittance optical device, the method comprising: disposing a layer of switching material on a substantially transparent substrate, the switching material capable of transitioning from a light state to a dark state on exposure to UV radiation and from a dark state to a light state with application of an electric voltage, wherein a first and second electrode are disposed such that the switching material is proximate with the first and second electrodes; providing an energy-harvesting power source; and providing an electrical system configured to receive power from the energy-harvesting power source and to provide power to the first electrode and the second electrode for application of the electric voltage through the first and second electrodes.

In accordance with another aspect of the present invention, there is provided a method for preparing a self-powered variable transmittance optical device, the method comprising: disposing a layer of switching material on a substantially transparent substrate, the switching material capable of transitioning between a light state and a dark state based at least in part on application of an electric voltage, wherein a first electrode and a second electrode are disposed such that the switching material is proximate with the first and second electrodes; providing an energy-harvesting power source; and providing an electrical system configured to receive power from the energy-harvesting power source and to provide power to the first electrode and the second electrode for application of the electric voltage through the first and second electrodes.

In accordance with another aspect of the present invention, there is provided a method for preparing a self-powered variable transmittance optical device film, the method comprising: disposing a layer of switching material on a substantially transparent and flexible substrate, the switching material capable of transitioning between a light state and a dark state based at least in part on application of an electric voltage, wherein a first electrode and a second electrode are flexibly disposed such that the switching material is proximate with the first and second electrodes; disposing a flexible energy-harvesting power source on the device film; and disposing a flexible electrical system on the device film, the electrical system configured to receive power from the energy-harvesting power source and to provide power to the first electrode and the second electrode for application of the electric voltage.

Aspects of the invention may be advantageous in reducing solar heat gain and/or reducing cooling loads in buildings, vehicles and transit systems. Aspect of the invention may be useful as variable glare- or light-reducing lenses or visors of opthalmic devices. The darkening response to UV light does not require power input, and the electrochromic fading is effected with very low power demands that may be met by small, portable or wearable, energy harvesting power sources.

This summary of the invention does not necessarily describe all features of the invention. Other aspects, features and advantages of the present invention will become apparent to those of ordinary skill in the art upon review of the following description of specific embodiments of the invention.

BRIEF DESCRIPTION OF THE DRAWINGS

These and other features of the invention will become more apparent from the following description in which reference is made to the appended drawings wherein.

DESCRIPTION OF THE INVENTION

Figure 1:
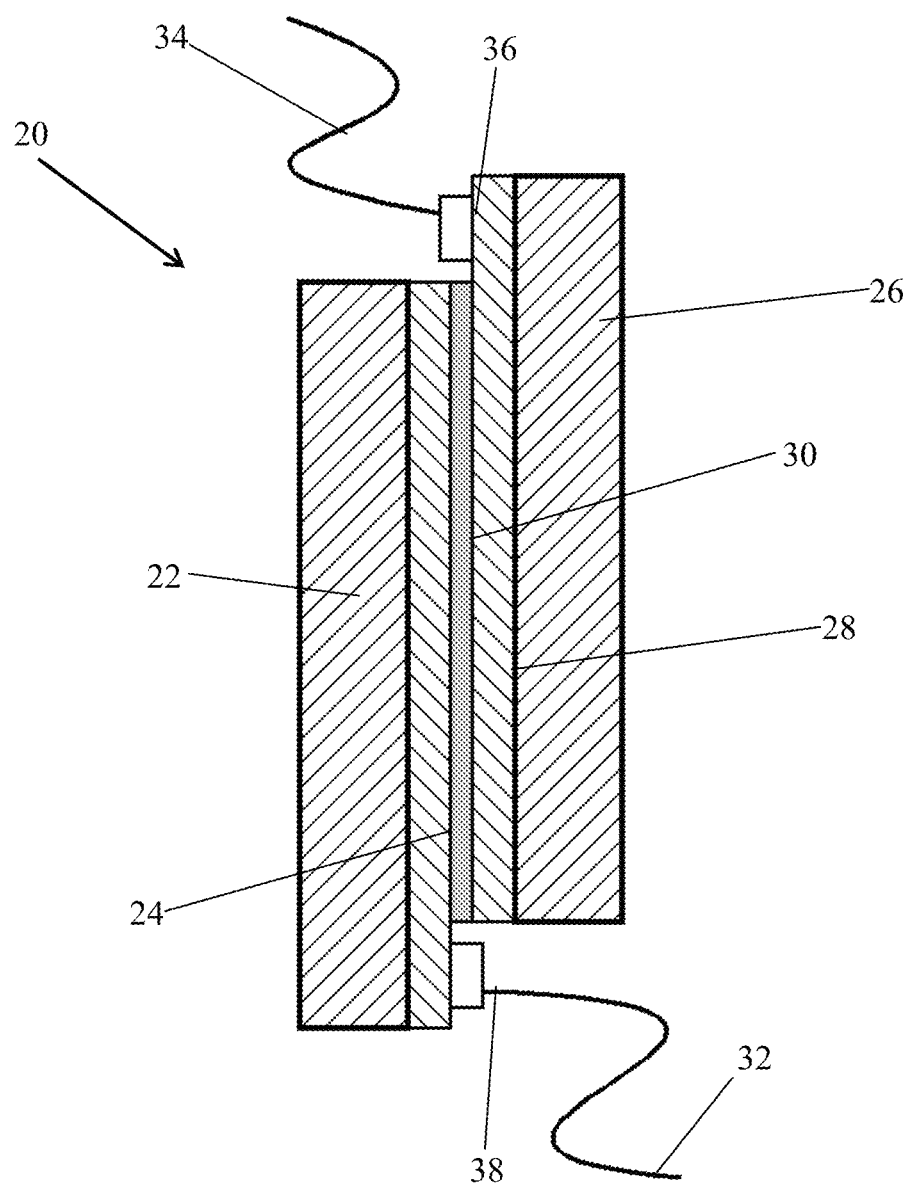
FIG. 1 is a cross-sectional schematic view of an optical filter portion of an optical device according to an embodiment of the present invention.

The invention relates, in part, to a variable transmittance optical (VTO) filter ("optical filter") and devices comprising such filters. The VTO filter is electrically coupled to an electrical system, and optionally to a power source. The invention also relates, in part, to a device comprising a VTO filter, electrically coupled to an energy harvesting power source. The invention also relates to an insert window comprising a VTO filter electrically coupled to an electrical system, and optionally to a power source.

The invention provides, in part, a variable transmittance optical (VTO) device comprising an energy harvesting power source (a "self-powered" VTO device), the device capable of transitioning between a dark state and a light state with application of a voltage to the device. In some embodiments, the device may transition from a light state to a dark state with application of a voltage, or from a dark state to a light state with application of a voltage. In some embodiments, the device may transition from a light state to a dark state on exposure to a light source and from a dark state to a light state with application of an electric voltage. In some embodiments, the device may transition from a light state to a dark state on exposure to a light source, and from a dark state to a light state with application of power (voltage) and exposure to a light source. The light source may provide UV light alone or in combination with VIS and/or IR light.

The invention further provides, in part, a device comprising a VTO filter, an energy harvesting power source and an electrical system configured to receive power from the energy harvesting power source and to provide a voltage to first and second electrodes of the VTO filter, thereby transitioning the optical filter from a dark state to a light state.

In some embodiments, the device may be a window, an opthalmic device, an optical filter, a display, signage or the like. The terms "smart window" and "variable transmittance window" may optionally be used to refer to an architectural, vehicle, or other window having a dynamic component that can darken and lighten according to a stimulus. Instead of being fixed, the visible light transmittance of the window, or a portion of the window, may be variable. The window may be an insulated glazing unit (IGU) or an insert window.

Thus, the invention further provides, in part, an insert window comprising a frame defining an insert window area, a variable transmittance optical filter suspended within the frame, over substantially all the insert window area, and an electrical system configured to receive power from a power source and to provide a voltage to the first and the second electrode of the variable transmittance optical filter.

Power from a power source may be received by an electrical system and optionally stored in an energy storage component, the electrical system configured to deliver power from the energy-harvesting power source, from the energy storage component, or a combination thereof, to the VTO filter or device to effect a transition of the VTO filter or device from a dark state to a light state, or from a light state to a dark state. The power may be generated by an energy harvesting power source. The electrical system may comprise control electronics for controlling aspects such as energy storage, power conversion, and power delivery. The control electronics may be configured to accept input from a user, or from another control system or a sensor.

"Visible light" refers to the band of electro-magnetic radiation with a wavelength from about 400 nm to about 750 nm. "Ultraviolet (UV) light" refers to electromagnetic radiation with a wavelength shorter than that of visible light, or from about 10 nm to about 400 nm range. In some embodiments, sub-ranges of ultraviolet light may be used, and/or may overlap with light in the visible range, for example from about 100 to about 420 nm, or from about 200 to about 420 nm, or from about 300 to about 420 nm, or from about 350 to about 420 nm. "Infrared radiation (IR)" refers to electro-magnetic radiation with a wavelength from about 750 nm to about 50,000 nm. Its wavelength is longer than that of visible light. Light may also be described with reference to colour or range of wavelength.

A "light source" is a source of VIS, UV and/or infrared light (IR). A light source may also provide full spectrum light, including one or more of VIS, UV and IR light, or light of wavelengths within a VIS, UV or IR range. Light sources may include natural or simulated sunlight (direct or indirect), or light from a selected wavelength or range of wavelengths. The selected wavelength or range of wavelengths may be selected by the nature of the light source itself (e.g. a lamp that produces light in a particular range such as a UV lamp, or may be selected through use of a cutoff filter, designed to eliminate light above or below a cutoff wavelength, or between two cutoff wavelengths. In some embodiments of the invention, the light source may be configured to provide light above or below a predetermined wavelength, or may provide light within a predetermined range. A device or apparatus according to some embodiments of the invention may comprise a light source.

Devices according to various embodiments of the invention may be described with reference to clarity, visible light transmittance, switching speed, durability, photostability, contrast ratio, state of light transmittance (e.g. dark state or light state) to further define the device, or aspects of the device; some values or characteristics of such descriptors may be applicable to some or all devices, but only exemplified in one type of device; alternately, some values or characteristics of such descriptors may be applicable to only a few types of devices.

"Visible light transmittance (VLT)" refers to the quantity of visible light that is transmitted or passes through an optical filter, film or device. VLT may be expressed with reference to a change in light transmission and/or a particular type of light or wavelength of light (e.g. from about 10% visible light transmission (VLT) to about 90% VLT, or the like). A product with a higher VLT transmits more visible light. VLT is expressed as a number between 0 and 1, or as a percentage. VLT may alternately be expressed as absorbance, and may optionally include reference to one or more wavelengths that are absorbed. According to some embodiments, an optical filter may be selected, or configured to have in the dark state, a VLT of less than 80%, or less than 70%, or less than 60%, or less than 50%, or less than 40%, or less than 30%, or less than 20% or less than 10%, or any amount or range therebetween. According to some embodiments, an optical filter may be selected, or configured to have in the light state, a VLT of greater than 80%, or greater than 70%, or greater than 60%, or greater than 50%, or greater than 40%, or greater than 30%, or greater than 20% or greater than 10%, or any amount or range therebetween. Inclusion of a colourant or coloured film in the optical filter may additively reduce the VLT of the optical filter, in combination with the switching material. In some embodiments, the VLT of an optical filter in the dark state or the light state may independently be 1, 2, 3, 4, 5, 6, 7, 8, 9, 10, 12, 14, 16, 18, 20, 25, 30, 35, 40, 45, 50, 55, 60, 65, 70, 75, 80, 85, 90 or 95%, or any amount or range therebetween, with the proviso that the dark state of an optical filter has lesser VLT than the light state of the same optical filter.

The term "state of visible light transmittance" as used herein, refers to states such as a dark state, or a light state, or transition states in between. A switching material may darken (e.g. reach a 'dark state') when exposed to light (e.g. ultraviolet light) from a light source, or when a voltage is applied, and may lighten ("fade", "electrofade", "bleach", "electrobleach", achieve a 'light state") when exposed to an electric charge, or when exposed to visible light of a selected range. Such a switching material may be alternately described as an auto-darkening material. In some embodiments, the switching material may fade upon exposure to selected wavelengths of visible (VIS) light ("photofade", "photobleach"), without sacrifice of the ability to be electrofaded when restored to a darkened state. This term also refers to states such as opaque, clear, translucent, or transparent. For example, the term "dark state" can refer to a state in which there is a low to no transmittance of visible light. The term "light state" can refer to a state in which there is a high degree of transmittance of visible light. Dark state and light state may be described relative to each other.

The contrast ratio is a ratio of the VLT of a VTO filter, component of an optical filter or device comprising an optical filter in the dark state and the light state. For example, an optical filter may allow transmission of about 10% of the visible light (~10% VLT) in a dark state, and about 60% of the visible light (~60% VLT) in a faded state, providing a contrast ratio of about 6 (6:1). According to various embodiments of the invention, a material may have a contrast ratio of at least about 2, or 3, or 4, or 5, or 6, or 7, or, or 9, or 10, or 11, or 12, or any amount or range therebetween. It will be appreciated by those skilled in the art that other configurations of % VLT in light and dark states, and contrast ratios thereof, may be possible with other compounds, formulations or the like.

Clarity may be affected by haze due to cloudiness caused by scattering of light. Light may be scattered by particles that are suspended in the substance. Haze may be measured by methods known in the art, for example, using a "hazemeter" (e.g. XL-211 Hazegard, BYK Gardner), according to known and/or standardized methods. Optionally, the haze of the optical filters according to various embodiments is between about 0% and about 5%. In some embodiments of the invention, the optical filter has a haze transmission of about 5% or less, about 3% or less, about 2% or less, about 1.5% or less, or about 1% or less, or from 0-5%, 0.5 to 3% or the like.

"Switching time" ("switching speed") refers to the time necessary for a material to transition from a dark state to a clear state, or from a clear state to a dark state, or to alter light transmission by a defined amount (e.g. 60% to 10% VLT in 5 minutes). may depend on the construction and components, however, generally the optical filters of the present invention will have a darkening time of between about 1 second and 30 minutes to reach about 10% of the VLT of the dark state from the lightened state, and a lightening time of between about 1 second and 30 minutes to reach about 90% of the VLT of the light state from the darkened state. In some embodiments of the invention, the darkening time and lightening time of the optical filter are independently about 1, 2, 3, 4 or 5 minutes, or any amount of time or range therebetween.

The term "mil" as used herein, refers to the unit of length for 1/1000 of an inch (0.001). One (1) mil is about 25 microns; such dimensions may be used to describe the thickness of an optical filter or components of an optical filter, according to some embodiments of the invention. One of skill in the art is able to interconvert a dimension in 'mil' to microns, and vice versa.

As used herein, the term "about" refers to a +/−20% variation from the nominal value. It is to be understood that such a variation is always included in a given value provided herein, whether or not it is specifically referred to.

Variable Transmittance Optical (VTO) Filter

In one embodiment, a VTO filter comprises a first transparent substrate, a conductive layer disposed thereon and a switching material disposed upon the conductive layer. The conductive layer may be continuous, or discontinuous. Where the conductive layer is discontinuous, the conductive layer may be configured to comprise two or more electrically separated electrodes arranged in a substantially co-planar relationship, such as described in U.S. Patent Application No. 61/423,536 filed Dec. 15, 2010, and in PCT Application PCT/CA2011/001378. VTO filters are also described in PCT Publication WO2010/142019.

In another embodiment, a VTO filter comprises a first transparent substrate comprising a first electrode, a second transparent substrate comprising a second electrode, and a switching material disposed between and operatively (electrically) coupled to the first and second electrodes. The first and second substrates may be rigid or flexible; where the first and second substrates are flexible, the switching material may also be flexible. The switching material is transitionable from a first light transmittance state to a second light transmittance state with application of a voltage, light from a light source, or application of both a voltage and light from a light source.

Figure 2:
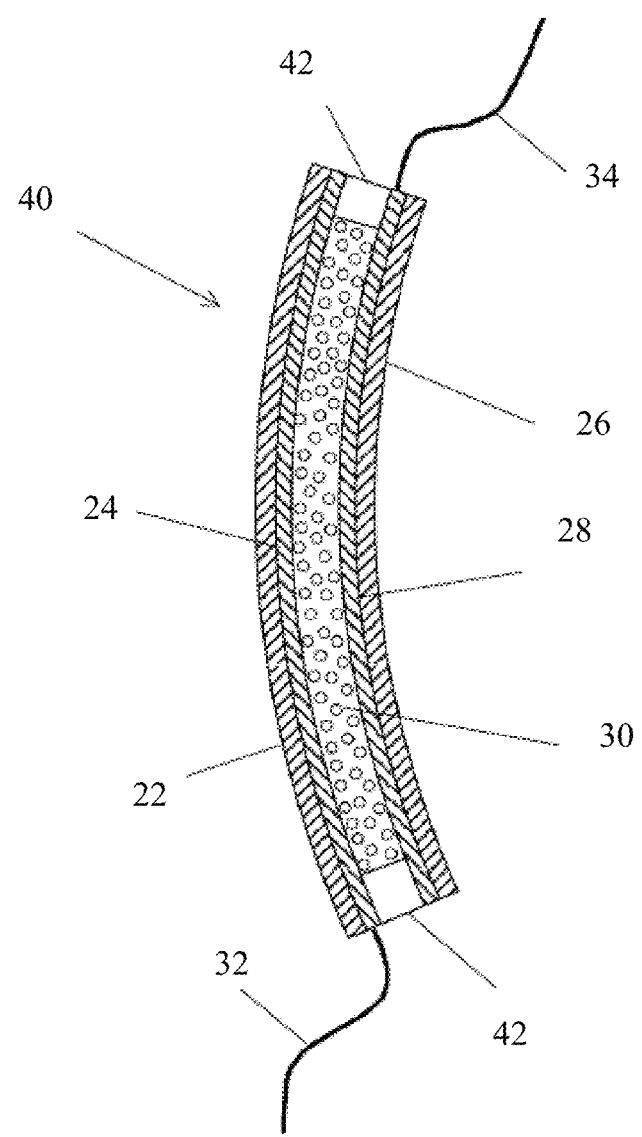
FIG. 2 is a schematic view of a curved variable transmittance optical filter according to an embodiment of the present invention.

Referring to FIGS. 1 and 2, a schematic diagram of a cross-section of a variable transmittance optical filter according to some embodiments of the invention is shown generally at 20. A schematic diagram of a cross-section of a curved optical filter according to some embodiments of the invention is shown generally at 40. A first transparent substrate 22 has a first transparent conductive layer 24 disposed thereon, and a second transparent substrate 26 has a second transparent conductive layer 28 disposed thereon; a switching material 30 is disposed between the first and second transparent substrates 22, 26 with their respective conductive layers 24, 28, and provides the electrical connection between the first and second conductive layers. Electrical connectors 32, 34 connect first conductive layer 24 and second conductive layer 28, respectively, via bus bars 36, 38, to a power source where the switching material 30 is flowable, optional seals 42 may be included to retain the switching material in the optical filter, between the substrates. In some embodiments, the seal may prevent ingress of water, gas, oxygen or other material into the switching material, and/or may prevent egress of one or more components of the switching material. First and second transparent conductive layers may be referred to as first and second electrodes, respectively. Optional spacer elements may be included between the first and second conductive layers, and may be attached to the first and/or second conductive layers or first and/or second substrates, or may be free-floating within the switching material. Spacer elements may be glass or plastic beads with a diameter or thickness about the same as the desired gap between the first and second conductive layers, or first conductive layer and second substrate (for an optical filter with substantially co-planar electrodes). The spacer elements may provide a gap from about 20 microns to about 500 microns, or any amount or range therebetween, for example about 25, 30, 40, 50, 60, 70, 80 or 90 microns. The spacer elements, if fixed to a substrate or conductive layer, may be spaced about 0.1 mm to about 1 mm apart, or any amount or range therebetween. Spacer elements may be printed on to the substrate using a screen printing technique. Spacer elements may be formed of any suitable material, for example acrylic (Electrodag™ PD-038, Henkel Corporation, Dusseldorf, Germany). Where the optical filter is curved, it may be, for example, a simple curve, a cylindrical curve, a compound curve, or a spherical curve. The curved optical filter may be a lens, or comprise a portion of a lens; the lens may be cylindrical, spherical, aspherical or the like. The curved optical filter may result from bending or flexing a substantially planar optical filter comprising flexible substrate(s). In some embodiments, the curved optical filter comprises first and optional second substrates that have been cast or molded into the selected curved shape, prior to, or after, a transparent conductive layer is applied and/or prior to, or after, a switching material is applied.

Relative thickness of layers in the figures herein may not represent the true relationship in dimensions. For example, where the substrate is a rigid pane (e.g. 3, 4, 5 or 6 mm glass of a window), the substrate may be thicker than the switching material. Where the substrate is a flexible material, the switching material may be thicker than the substrate. The figures are drawn for the purpose of illustrating the relationship or connection between components of the device, and not to provide dimensional information unless otherwise specified.

An electrical connector may comprise a bus bar. A bus bar may be applied at one edge of the optical filter and be in electrical connection with an electrode of the optical filter. Bus bars are known in the art, and may be formed of any suitable conducting material (e.g. Cu, Au, Ag or Al foil, conductive fabric or the like) and affixed to a conductive layer of an electrode using a conducting adhesive material, for example Cu tape, polymeric glue or epoxy comprising silver (e.g. Dupont Conductor paste #4817N), a polymeric glue comprising metal (e.g. Ag, Zn, Fe, Mg, Cu, Al or the like) particles, or the like or may be printed onto a substrate (e.g. using silver epoxy or silver ink material). US 2011/0100709 describes various conducting adhesive mixtures. To affix a bus bar, the conductive adhesive is applied to the conductive layer at a suitable location and the conductive material placed on top of the adhesive and pressed to eliminate uncontacted areas, gaps or bubbles. The adhesive is allowed to set or cure as appropriate.

As indicated above, first and second electrodes may be substantially co-planar in some embodiments of the invention. For an optical filter comprising substantially co-planar electrodes, both first and second electrodes are disposed on the first transparent substrate, and the second transparent substrate may lack a second transparent conductive layer.

Figure 21:
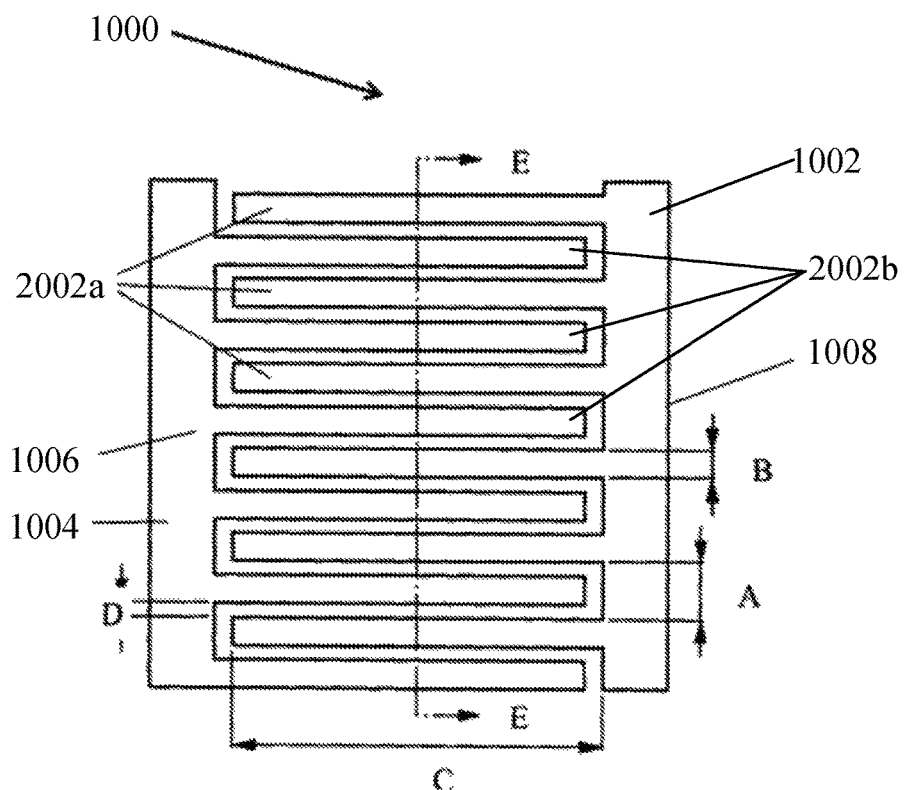
FIG. 21 is a schematic top view of a symmetric interdigitated electrode structure, according to another embodiment.
Figure 22:
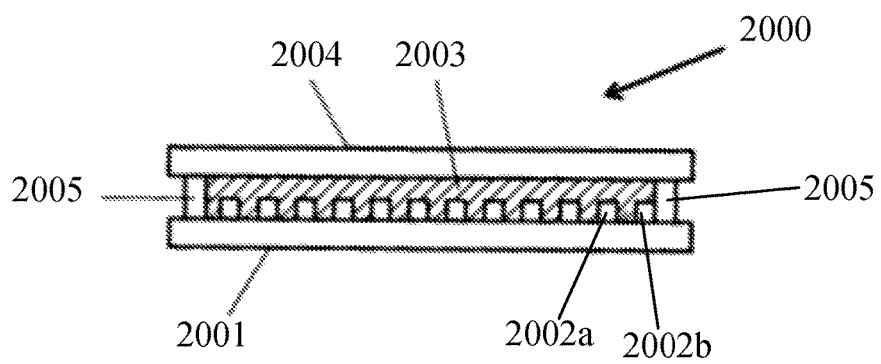
FIG. 22 is a cross-sectional schematic diagram along line E-E of FIG. 21.

In some embodiments, the pattern of the electrodes is such that each electrode comprises fingers or finger-like structures and the fingers or finger-like structures of the anode are interdigitated with the fingers or finger-like structures of the cathode. An illustrative example of an interdigitated electrode pattern is shown in FIGS. 21 and 22. Referring to FIG. 21, an embodiment of a substantially co-planar electrode system is shown generally at 1000. The electrode system comprises a first electrode 1002 and second electrode 1004, each comprising a plurality of digits 2002a and 2002b. In the embodiment shown, the electrodes each comprise a bus bar portion 1006, 1008. Digit spacing A, digit width B, digit length C and interdigit spacing D are indicated.

FIG. 22 illustrates a cross section along E-E of a variable transmittance optical filter comprising the substantially co-planar electrode system of FIG. 21, shown generally at 2000. The variable transmittance optical filter 2000 comprises a first substantially transparent substrate 2001 having first 2002a and second 2002b interdigitated electrodes disposed thereon. The transition material 2003 of the second layer (schematically illustrated, actual proportion of electrode dimension and/or second layer and/or other elements of the optical may vary) is disposed on the electrodes. In the embodiment illustrated, an optional, substantially transparent substrate 2004 is included, in contact with the second layer. In some embodiments, seals 2005 may be required to keep the transition material sandwiched between the first and third layers as well as to bond the two substantially transparent substrates together. In some embodiments, the transition material 2003, may have adhesive functionality and/or comprise an adhesive component and maintain the bond of the first layer and third layer to the transition material of the second layer; in such an embodiment, seals may not be needed. In some embodiments, spacer elements can be incorporated between the substrates in order to maintain a constant distance between them. The spacer elements can be attached to the substrate or the spacer elements can be freely distributed in the transition material.

The VTO filter may transition from a first transmittance state to a second transmittance state upon application of a voltage. The first transmittance state may be a dark state and the second transmittance state may be a light state. The voltage applied may be from about 0.1 V to about 20 V, or any amount or range therebetween, for example, 1, 2, 3, 4, 5, 6, 7, 8, 9, 10, 11, 12, 13, 14, 15, 16, 17, 18 or 19 V. In some embodiments, the amount of voltage applied is from about 0.1V to about 5V, or from about 1V to about 10 V, or from about 1.0 V to about 2.2 V, or from about 0.5V to about 3V, or from about 1.2V to about 2.5 V, or from about 1.8 V to about 2.1 V, or any amount or range therebetween. In some embodiments, the voltage applied is less than about 12 V, or less than about 6 V, or less than about 3 V or less than about 2.5 V, or about 2 V.

Substrate

In embodiments of the present invention, the transparent substrate provides sufficient structural integrity to support the switching material. The substrate may be rigid or flexible. Optical filters comprising flexible substrate(s) may be in the form of a film that may be applied to a rigid material, such as a pane of a window, or a lens. In some embodiments, the optical filter may comprise a first substrate with first conductive layer and switching material, and be applied to a pane of a window or a lens, the pane or lens comprising a second conductive layer (the pane or lens being a second substrate). In other embodiments, the optical filter comprises a first substrate with substantially-coplanar electrodes and switching material, and be applied to a pane of a window or a lens. For such an embodiment, the pane or lens may not include a second conductive layer. Examples of suitable materials that can be used as a substrate in embodiments of the present invention include, but are not limited to, glass, plastics and thermoplastic polymers. Suitable thermoplastic polymers include polyesters (PE), polycarbonates, polyamides, polyurethanes, polyacrylonitriles, polyacrylacids, (e.g. poly(methacrylic acid), including polyethylene terephthalate (PET), polyolefins (PO) or copolymers or heteropolymers of any one or more of the above, or copolymers or blends of any one or more of the above with poly(siloxane)s, poly(phosphazenes)s, or latex. Examples of polyesters include homopolymers or copolymers of aliphatic, semi-aromatic or aromatic monomeric units, for example polycondensed 4-hydroxybenzoic acid and 6-hydroxynapthalene-2-carboxylic acid (VECTRAN™), polyethylene napthalate (PEN), polytrimethylene terephthalate (PTT), polybutylene terephthalate (PBT), polyethylene terephthalate (PET), polyhydroxyalkanoate (PHA), polyethylene adipate (PEA), polycaprolactone (PCL) polylactic acid (PLA), polyglycolic acid (PGA) or the like. Examples of polycarbonates include bisphenol A polycarbonate or the like. Other thermoplastic polymers include polyethene (PE), polypropylene (PP) and the like. For an optical filter or a device comprising two or more substrates, the substrates may be the same material, or different. The material comprising a substrate may have UV, IR or VIS light blocking characteristics. In one embodiment of the invention, the substrate material is glass. In one embodiment of the invention, the substrate material is PET. In one embodiment of the invention, the substrate is heat-stabilized PET. Suitable glass includes float glass, tempered glass, laminated glass, tinted glass, mirrored glass, reinforced glass, safety glass, bullet-resistant glass, "one-way" bullet-resistance glass, Other suitable substrate materials include ceramic spinel or aluminum oxynitride.

In some embodiments, the optical filter, or a device comprising the optical filter, may comprise one or more UV blocking components (a "UV blocker") to block some or a substantial amount of the UV light that the device of the invention is exposed to in order to counteract UV light-induced degradation of the switching material. The UV blocker may be incorporated in the substrate or applied as a layer on a substrate, or applied as a layer of a device according to various embodiments of the invention. The layer may be a deposited organic or inorganic material or combination thereof, or may be a film. A UV blocker may be deposited by any suitable method, for example chemical vapor deposition, physical vapor deposition, (e.g. sputtering, electron beam evaporation, and ion plating), plasma spray techniques, sol-gel processes or the like. In some embodiments, an adhesive employed to affix an optical filter in the form of a film to a pane of a window or a lens may be, or comprise, a UV blocker (e.g. 8172PCL adhesive from 3M). Examples of UV blockers include $WO_2$, $WO_3$, ZnO, CdO or a combination thereof; thin film materials (e.g. a dichroic filter) with thickness and index of refraction chosen so as to reflect or absorb UV light; a UV absorbing polymer or a polymer comprising a light-absorbing or UV stabilizing component. Examples of such polymers include polyethylenes, polypropylenes, polybutylenes, epoxies, acrylics, urethanes, vinyls including polyvinyl chloride, poly(vinyl butyral), poly(vinyl alcohol), acetates, polystyrenes, polyimides, polyamides, fluorocarbon polymers, polyesters, polycarbonates, poly(methyl methacrylate), poly(ethyl methacrylate), poly(vinyl acetate), or co-polymers or polymer blends thereof. In some embodiments, the substrate is PET comprising a UV blocking additive (e.g. XST6578 from DuPont Teijin). Such a substrate may be a UV blocking layer.

In some embodiments, the substrate may have applied to one or both sides of it a UV, selective UV, IR, selective IR or selective VIS light blocking layer; the blocking layer may be in the form of a coating or film. A selective UV, VIS or IR blocking layer selectively blocks (absorbs or reflects) a portion of UV, VIS or IR light, respectively. Examples of UV blocking films that may be applied include (EnergyFilm™ (described in WO2002/018132) and EnerLogic™ (described in WO2009/087575). Examples of UV blocking layers include optical clear pressure sensitive adhesives with UV blocking components (e.g. 8172PCL from 3M).

In embodiments of the invention comprising a hybrid photochromic/electrochromic switching material, the concentration of UV light absorbers in the UV blocking layer and the thickness of the UV blocking layer may be selected so as to provide protection from UV degradation of the switching material while allowing a sufficient portion of the incident UV light to reach the switching material to effect auto-darkening. In one embodiment, the UV blocking layer blocks UV light below a certain wavelength. The lower energy UV light can be used to effect the auto-darkening of the switching material. In one embodiment, the UV blocker blocks most of the UV light below about 350 nm, or below about 365 nm, or below about 375 nm, or below about 380 nm, or below about 385 nm. In some embodiments, the VTO filter comprises a switching material that is transitionable to a dark state when exposed to UV light that is greater than about 350 nm, or greater than about 365 nm, or greater than about 375 nm, or greater than about 385 nm, or greater than about 385 nm.

The substrate material may be of uniform or varying thickness. Thickness of a substrate may be of any suitable dimension to provide sufficient structural integrity to support the switching material; determination of a suitable material and thickness is within the ability of one of skill in the art. For example, the substrate may have a thickness from about 0.01 mm to about 10 mm, or any amount or range therebetween, for example 0.05, 0.1, 0.5, 1, 2, 3, 4, 5, 6, 7, 8, 9 or 10 mm, or from about 0.012 mm to about 10 mm, or from about 0.5 mm to 10 mm, or from about 1 mm to 5 mm, or from about 0.024 mm to about 0.6 mm, or from about 0.051 mm (2 mil) to about 0.178 mm (7 mil). In some embodiments, the thickness and/or material of the first substrate differs from the thickness and/or material of the second substrate.

The substrates can optionally include additives or coatings such as a base colour tint or coloured layer to provide a darker overall range or colour to the optical filter, a barrier coating to block moisture, an antireflective coating and/or, a scratch resistant coating. A pressure-sensitive adhesive coating may be applied for laminating the optical filter onto glass. In some embodiments, an air gap may be provided between a substrate layer and an adjacent layer, for example to facilitate thermal insulation.

Electrodes

The conductive transparent layer(s) may alternately be referred to as electrode(s). Suitable materials for the conductive layers are well-known to those skilled in the art and include, for example, metal oxides, graphene, carbon nanotubes, and fine wire meshes. Exemplary conductive materials include layers of doped indium tin oxide, doped tin oxide, doped zinc oxide, antimony tin oxide, polyaniline, graphene, PEDOT (poly(3,4-ethylenedioxythiophene)), PEDOT:PSS (poly(3,4-ethylenedioxythiophene) poly(styrenesulfonate)), and polypyrrole, as well as thin, substantially transparent metallic layers such as gold, silver, aluminum, and nickel alloy. Methods of applying the electrically conductive material to a substrate to form suitable conductive layers and electrodes are well known in the art e.g. chemical deposition, sputter coating or the like. The conductive layer is coated or deposited onto the substrate to a thickness that provides adequate conductance for operation of the electrodes, and which does not appreciably interfere with the transmission of light. In one embodiment, the thickness of the conductive layer ranges from about 1 nanometer to about 90 microns, or any amount or range therebetween. In another embodiment, the thickness of the conductive layer ranges from about 10 nanometers to about 10 microns, or any amount or range therebetween.

In one embodiment of the invention, the conductive transparent layer(s) of the substrate material has a sheet resistance of up to about 100 Ohms/square, or up to about 1000 Ohms/square, or up to about 100,000 Ohms/square or up to about 1,000,000 Ohms/square, or any amount or range therebetween. In some embodiments of the invention, the transparent conductive material may have a sheet resistance from about 10 Ohms/square to about 1000 Ohms/square; or from about 20 Ohms/square to about 500 Ohms/square; or from about 100 Ohms/square to about 1,000 Ohms/square; or from about 1,000 Ohms/square to about 10,000 Ohms/square; or from about 10,000 Ohms/square to about 1,000,000 Ohms/square; or from about 1,000,000 Ohms/square to about 5,000,000 Ohms/square; or from about 5,000,000 to about 10,000,000 Ohms/square; or any amount or range therebetween.

Substrate materials pre-coated with indium tin oxide (ITO) are available from a number of suppliers, including CP Films of St. Louis, Mo. and Southwall Technologies Inc. of Palo Alto, Calif. One skilled in the art will recognize that multiple layers of conductive materials can also be employed in embodiments of the present invention.

Switching Material

A switching material ("transition material") reversibly interconverts between a first state of light transmittance and a second state of light transmittance and may be may be electrochromic, photochromic, thermochromic, or a combination thereof. Application of a first stimulus—voltage, light or temperature, respectively changes the colour or alters VLT of the material. In some embodiments, the change in colour or VLT may be reversible with application of a second stimulus; the second stimulus may be a voltage, a light or a temperature stimulus.

In some aspects of the invention, the switching material may be an electrochromic or another material such as liquid crystal, materials forming a suspended particle device, or other present or future switching materials as would be readily understood by a worker skilled in the art. Electrochromic materials include tungsten oxide, polyaniline, viologens, polyoxotungstates or the like. Electrochromic materials can be used to dynamically alter the visible light transmission properties of a material through the application of electricity. Electrochromic technology typically involves applying thin coatings of electrochromic materials to two transparent electrodes and sandwiching an electrolyte material in between. Unlike photochromic technology, electrochromic technology typically requires external electrical power to darken (see for example U.S. Pat. No. 6,934,067, describing an electrochromic rear view mirror. Liquid crystal filters comprise a liquid crystal material between two transparent electrodes. When an electric field is applied between the electrodes, the liquid crystals align in a certain orientation to allow light to pass through the filter. In the absence of a field, the liquid crystals have a random orientation and scatter the light, appearing translucent to an observer (see, for example U.S. Pat. No. 7,459,189 and U.S. Pat. No. 7,300,167. Suspended Particle Devices or displays (SPD) involve many small particles suspended in a liquid between two sheets of glass with conducting electrodes. Like liquid crystals, a voltage applied across the electrodes causes the particles to align and light is transmitted. In the absence of a voltage, the particles are randomly distributed and scatter light. The scattering of light means that SPD devices are typically not optically clear in the dark state. See, for example U.S. Pat. No. 5,463,491 and U.S. Pat. No. 6,910,729.

In some embodiments, the switching material comprises a compound that is electrochromic and photochromic (a "hybrid P/E" compound). A switching material comprising a hybrid P/E compound (hybrid P/E switching material) may darken (e.g. reach a 'dark state') when exposed to light comprising UV wavelengths, and may lighten ("fade", "electrofade", "bleach", "electrobleach", achieve a 'light state") when exposed to an electric charge via application of a voltage. Such a switching material may be alternately described as an auto-darkening material. In some embodiments, the switching material may fade upon exposure to selected wavelengths of visible (VIS) light ("photofade", "photobleach"), without sacrifice of the ability to be electrofaded when restored to a darkened state. In some embodiments, the hybrid P/E compound is a single organic species having both photochromic and electrochromic isoforms and is reversibly interconvertible between isoforms with application of light and/or voltage, respectively. In some embodiments, the switching material is a hybrid P/E switching material and is a liquid, a solid, a semi-solid, a sol-gel or a gel. The liquid, sol-gel or gel may be of a range of viscosity.

The thickness of the layer of hybrid P/E switching material may affect the transmittance of the variable transmittance optical filter of the invention and may be selected depending on the particular application desired. For example, when comparing a thinner and a thicker layer of the same hybrid P/E switching material, the thicker layer may provide a lower percentage visible light transmission in the dark state. Kinetics of the reduction and oxidation reactions may also be affected by the thickness of the switching material, a thinner layer may demonstrate a faster fading time than a thicker layer. In some embodiments of the invention, the hybrid P/E switching material has a thickness from about 0.1 microns to about 10,000 microns; or from about 1 to about 1000 microns; or from about 10 microns to 100 microns, or any amount or range therebetween for example 15, 20, 30, 40, 50, 60, 70, 80 or 90 microns. Typically, uniform thickness of the hybrid P/E switching material will be desired in most applications; however, it is contemplated that a variable transmittance optical filter of the invention can comprise a non-uniform thickness of the hybrid P/E switching material for applications where some darker regions and some lighter regions are desired.

In some embodiments, the switching material is a hybrid P/E switching material comprising one or more organic, hybrid P/E compounds. In certain embodiments, the hybrid P/E switching material may comprise one or more optional components. For example, the hybrid P/E switching material may further comprise one or more of a solvent, an electrolyte, a polymer, a charge compensator, a charge carrier, a UV stabilizing agent, a UV blocking agent, a tinting agent, or the like. One skilled in the art will recognize that certain components may be able to fill dual roles in the hybrid P/E switching material, for example, certain dyes may self-polymerize and fulfill the role of both dye and polymer; certain polymers may also have UV blocking capabilities; or the like. Conversely, in some embodiments, a given component may be made up of several individual compounds, e.g., the polymer component may be a copolymer comprising different monomeric units.

In one embodiment, the hybrid P/E switching material of the invention comprises a hybrid P/E compound and a component in which the hybrid P/E compound is soluble such as a solvent or a polymer, or a polymer that fulfills the function of a solvent. In another embodiment, the hybrid P/E switching material of the invention comprises a hybrid P/E compound, a solvent, and at least one optional component selected from the group consisting of: a) an electrolyte; b) a polymer component; c) a charge compensator; d) a charge carrier; e) a UV stabilizing agent; f) a UV blocking agent; and g) a tinting agent. In some embodiments, the hybrid P/E compound or hybrid P/E switching material is transitionable from a light state to a dark state when exposed to UV light that is greater than about 350 nm, or greater than about 365 nm, or greater than about 375 nm, or greater than about 385 nm, or greater than about 385 nm. In some embodiments, the hybrid P/E compound or hybrid P/E switching material that is transitionable to a dark state when exposed to UV of about 350 to about 420 nm, or of about 365 to about 420 nm, or of about 375 to about 420 nm, or of about 380 nm to about 420 nm, or of about 385 nm to about 420 nm.

Hybrid P/E Compounds:

The hybrid P/E switching material according to some embodiments comprises one or more organic compounds ("dyes" or "chromophores") that exhibit both photochromic and electrochromic characteristics. These dual mode compounds are capable of reversibly switching between two distinct isoforms when stimulated electrically and by light. The hybrid P/E compounds are organic, and include classes of compounds from the hexatriene family, for example, the class of compounds known in the art as diarylethenes, dithienylcyclopentenes, and fulgides. In some embodiments, conversion of the compound to the ring-open form is induced by application of a voltage to a switching material comprising the compound, and is independent of the polarity of the applied voltage.

According to one embodiment of the invention, the hybrid P/E switching material comprises one or more chromophores from the class of compounds known as diarylethenes. Examples of diarylethenes include derivatives of 1,2-dithienylcyclopentene as described in International Patent Publication No. WO 2004/1015024, having the general structure of Formula 1 below:

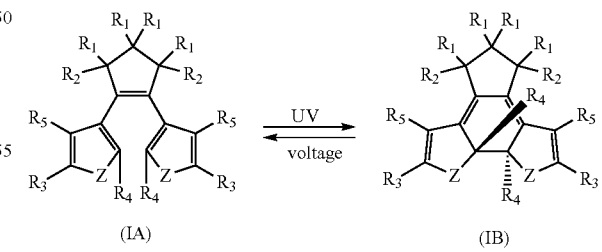

(IA)     (IB)

wherein each $R_1$ is independently H or a halogen;
Z is N, O or S;
wherein each $R_2$ is independently H, a halogen, or both $R_2$ when taken together form CH=CH, or when in polymeric form $R_2$ is CH=CH and forms part of a polymer backbone;
wherein each $R_3$ is independently alkyl, aryl, H, a halogen or $CO_2Y$ (Y=H, Na, alkyl, aryl); wherein $R_4$ is aryl; and
wherein each $R_5$ is independently H, alkyl or aryl.

"Aryl" includes substituted or unsubstituted benzyl or thiophenyl. Substitutions may be alkyl, halogen or the like. Benzyl may be substituted in ortho, meta or para positions of the benzyl ring. Thiophenyl may be substituted at one or more of positions 2, 3, 4 or 5 of the thiophene ring.
"Halogen" includes F, Br and Cl.
"Alkyl" includes methyl, ethyl, propyl, butyl, t-butyl.

Preparation of exemplary fluorinated dithienylcyclopentene derivatives that may be incorporated in the switching materials of the invention follows the general methodology of Scheme 1 below:

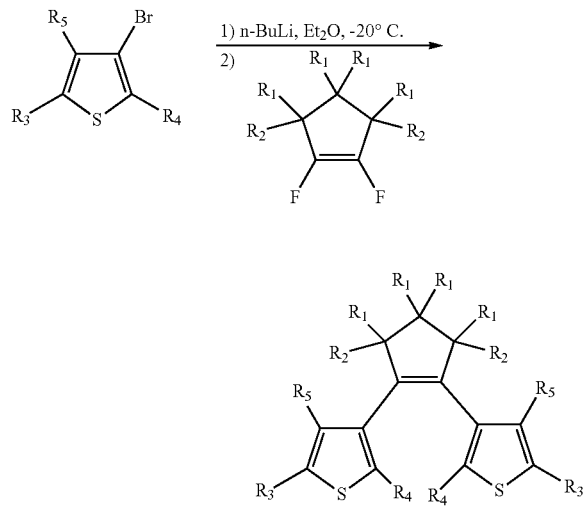

In one embodiment of the invention, the switching material comprises compounds of Formula 1 wherein $R_1$ and $R_2$ are F, $R_3$ and $R_4$ are

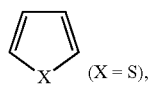

and $R_5$ is H. In another embodiment of the invention, the switching material comprises compounds of Formula 1 wherein $R_1$ and $R_2$ are F, $R_3$ is H, $R_4$ is

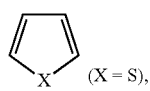

and $R_5$ is H. In a further embodiment of the invention, the switching material comprises compounds of Formula 1 wherein $R_1$ and $R_2$ are F, $R_3$ and $R_4$ are independently

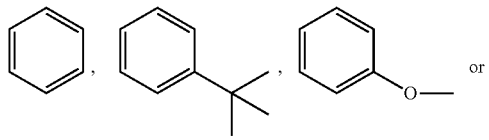

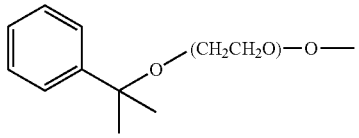

and $R_5$ is H. In a further embodiment of the invention, the switching material comprises compounds of Formula 1 wherein $R_1$ and $R_2$ are F, $R_3$ is

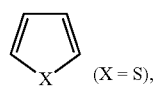

$R_4$ is $CH_3$, and $R_5$ is H. In another embodiment of the invention, the switching material comprises compounds of Formula 1 wherein $R_1$ and $R_2$ are F, $R_3$ is

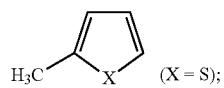

$R_4$ is $CH_3$, and $R_5$ is H.

The chromophores can be incorporated into the switching material in monomeric or polymeric forms depending on the functional demands required. The compounds of Formula 1 may be incorporated in polymeric form as part of the polymer backbone or as a pendant group. For example, fluorinated compounds may be polymerized using ring-opening metathesis polymerization in accordance with Scheme 2 below:

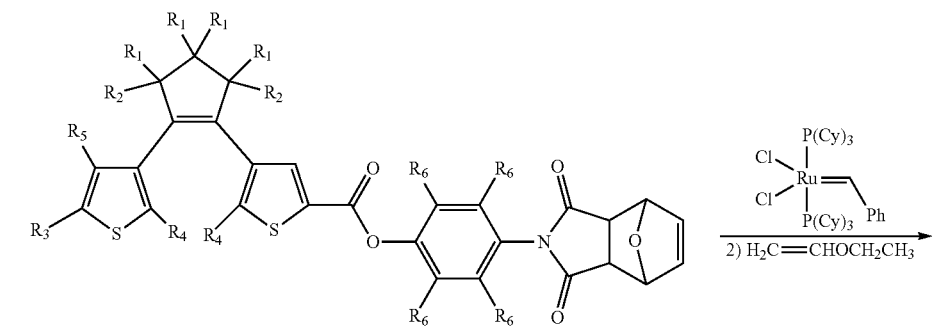

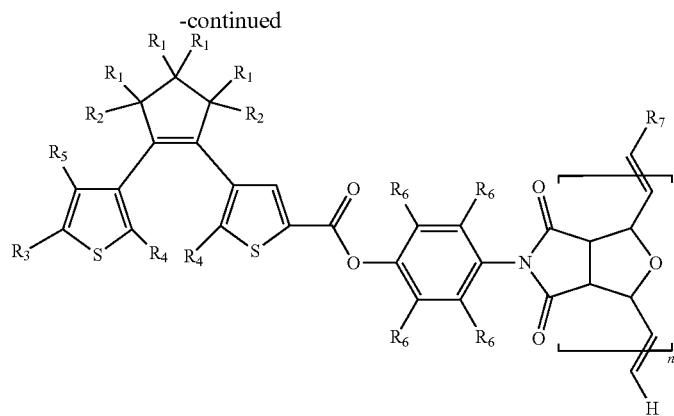

Exemplary non-fluorinated dithienylalkene derivatives that may be incorporated in the switching materials of the invention can be prepared in accordance with the general methodology of Scheme 3 below:

In one embodiment of the invention, the switching material comprises a compound of Formula 1 wherein $R_1$ is H, $R_2$ is CH=CH, $R_3$ is Cl, $R_4$ is $CH_3$, and $R_5$ is H. In another embodiment of the invention, the switching material com-

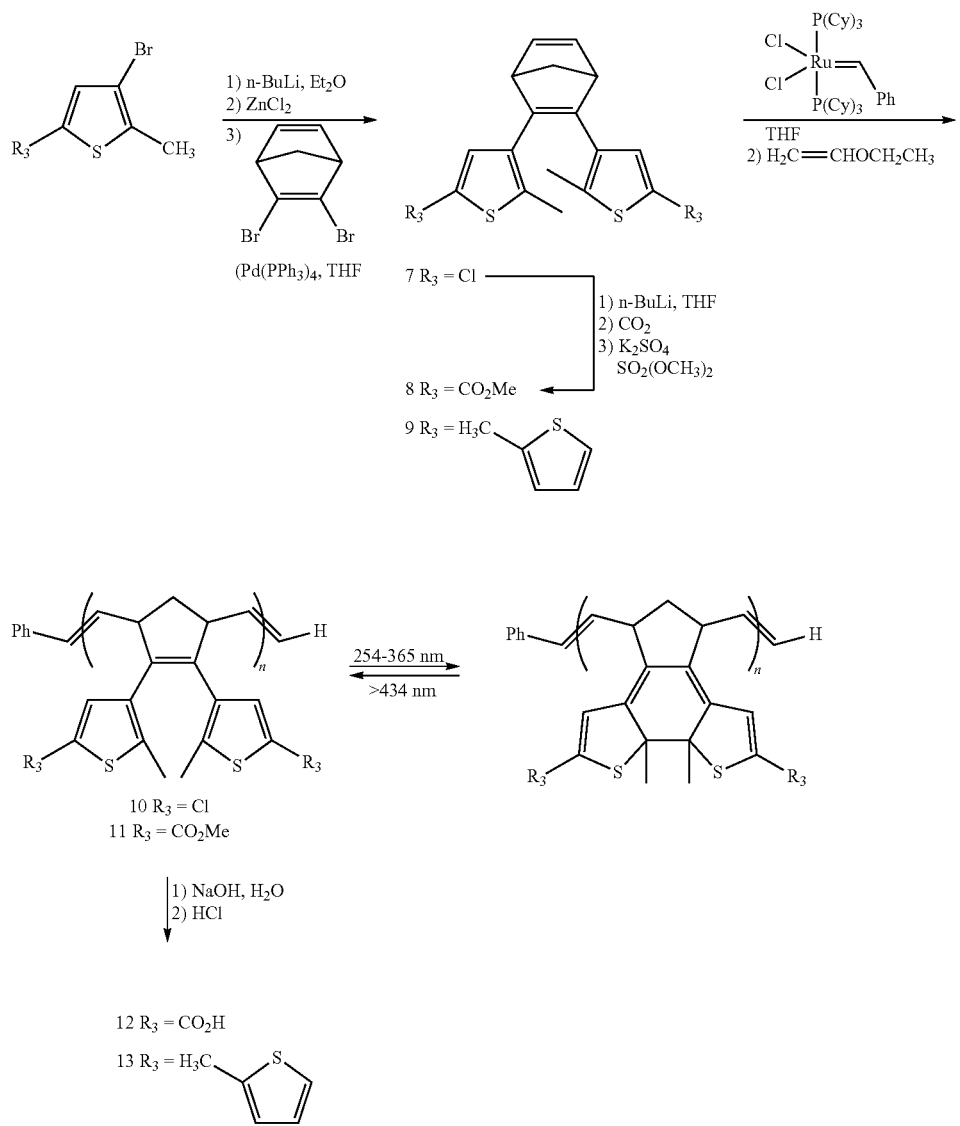

prises a compound of Formula 1 wherein $R_1$ is H, $R_2$ is CH=CH, $R_3$ is $CO_2CH_3$, $R_4$ is $CH_3$, and $R_5$ is H. In a further embodiment of the invention, the switching material comprises a compound of Formula 1 wherein $R_1$ is H, $R_2$ is CH=CH, $R_3$ is

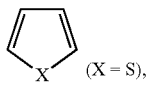 (X = S), $R_4$ is $CH_3$, and $R_5$ is H.

In other embodiments of the invention, the switching material comprises a compound of Formula 1 wherein the compound forms part of a polymer. In one embodiment of the invention, $R_1$ is H, $R_2$ is CH=CH and forms part of the polymer backbone, $R_3$ is Cl, $R_4$ is $CH_3$, and $R_5$ is H. In a further embodiment of the invention, the switching material comprises a compound of Formula 1 wherein $R_1$ is H, $R_2$ is CH=CH and forms part of the polymer backbone, $R_3$ is $CO_2CH_3$, $R_4$ is $CH_3$, and $R_5$ is H. In another embodiment of the invention, the switching material comprises a compound of Formula 1 wherein $R_1$ is H, $R_2$ is CH=CH and forms part of the polymer backbone, $R_3$ is $CO_2H$, $R_4$ is $CH_3$, and $R_5$ is H. In another embodiment of the invention, the switching material comprises a compound of Formula 1 wherein $R_1$ is H, $R_2$ is CH=CH and forms part of the polymer backbone, $R_3$ is

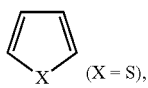 (X = S), $R_4$ is $CH_3$, and $R_5$ is H.

An example of a suitable chromophore for inclusion in the hybrid P/E switching material is one that exhibits both photostability as well as electrochemical durability. The photostability of a compound, e.g., the resistance of the chromophore to light induced degradation, can be measured by the amount of time it takes for the compound to degrade to a certain point under constant light exposure. For example, in one embodiment the compound can be measured in its dark state and its light state to determine its contrast ratio prior to testing. During testing, the contrast ratio is monitored periodically to determine degradation. Failure can be determined to occur when the contrast ratio falls below a certain level, or when the contrast ratio falls below 50% of the original contrast ratio. Other methods for testing are within the knowledge of persons skilled in the art. The photostability of embodiments of the invention can be tested using a QUV or QSUN testing unit made by Q-Lab of Cleveland, Ohio. In one embodiment, the hybrid P/E switching material of the invention comprises a chromophore having a photostability in the range of about 1000 hours to about 5000 hours, or over 5,000 hours of constant light exposure. The electrochemical durability of a suitable chromophore is measured as the number of cycles that the chromophore can maintain its switching activity between the light and dark state. In one embodiment, the hybrid P/E switching material of the invention comprises a chromophore having an electrochemical durability in the range of about 1000 to about 5,000 cycles or over 5,000 cycles. Typically, the hybrid P/E switching material according to the present invention contains (by weight) 0.05% to about 30%, or any amount or range therebetween, for example about 1, 2, 3, 4, 5, 6, 7, 8, 9, 10, 11, 12, 13, 14, 15, 16, 17, 18, 19, 20, 21, 22, 23, 24, 25, 26, 27, 28 or 29%. Examples of selected hybrid P/E compounds include: S001, S002, S042, S054 and S068; or derivatives thereof having different functional groups of the peripheral benzyl or thiophene rings.

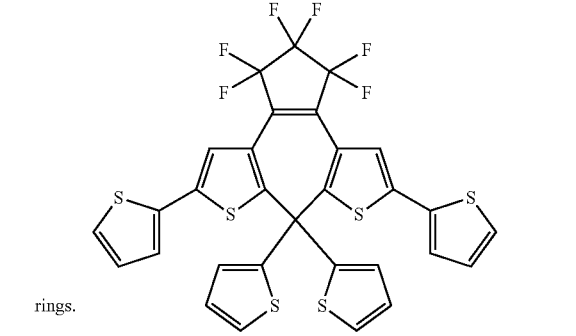

S001

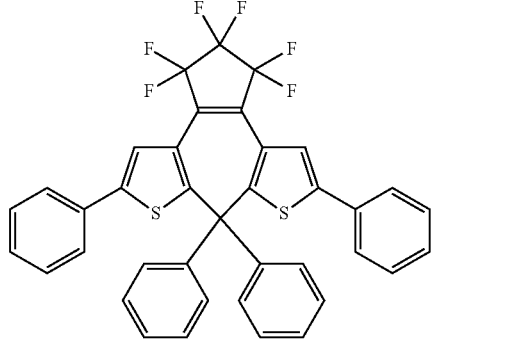

S002

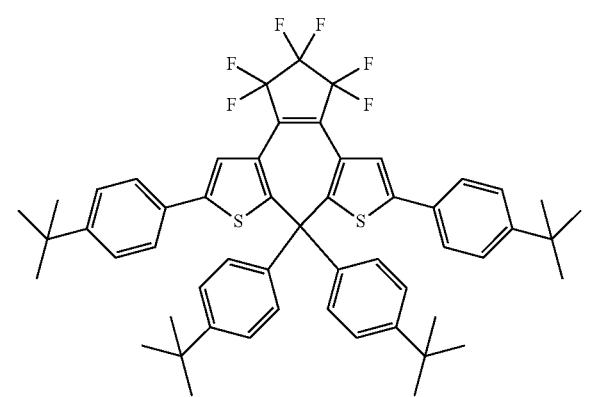

S042

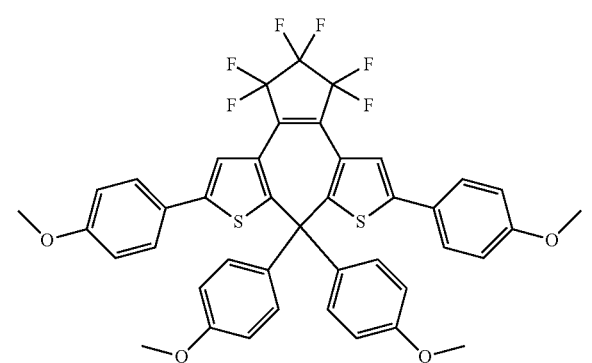

S054

-continued

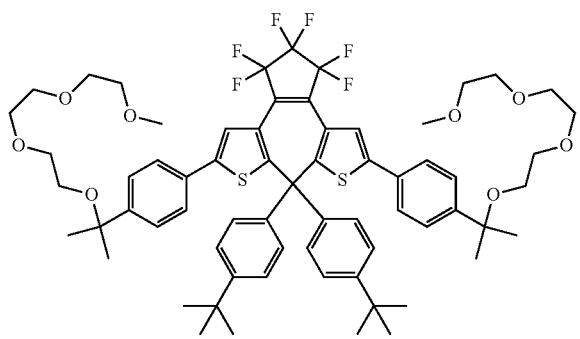

S068

Solvent:

The solvent component of the hybrid P/E switching material dissolves, intersperses and/or diffuses the one or more chromophores and other components throughout the hybrid P/E switching material. The solvent used in the preparation of the switching material is typically inert, e.g., photochemically and electrochemically inactive, and colourless, and has a sufficiently high boiling point to prevent solvent loss under typical operating conditions Examples of suitable solvents include, but are not limited to, triglyme, dichloroethane, tetraglyme, propylene carbonate, ethylene carbonate, water, butyrolactone, cyclopentanone and mixtures thereof. In one embodiment of the present invention, the solvent component comprises triglyme.

One or more solvents may be present in a switching material in an amount from about 50% to about 95% (by weight), or any amount or range therebetween, for example 50, 60, 70, 80 or 90%, or any amount or range therebetween.

Electrolyte:

Electrolytes are generally electrically conductive, and may include alkali metal salts, tetralkylammonium salts or the like. Examples of electrolytes include TBABF$_4$ (tetrabutylammonium tetrafluoroborate), TBAPF$_6$ (tetrabutylammonium hexafluorophosphate), tetrabutylammonium perchlorate, lithium bis(trifluoromethane sulfonimide), lithium triflate, LiBOB (lithium bis(oxatlato)borate), LiClO$_4$ (lithium perchlorate) or the like. The one or more electrolytes may be present in an amount from about 0.1% to about 10% (by weight) or any amount or range therebetween, for example 1, 2, 3, 4, 5, 6, 7, 8, or 9%.

Polymer Component:

In some embodiments of the invention, one or more polymers or sol-gels may be included in the compositions. Examples of polymers include polyvinylbutyral (PVB) B-90, PVB-B72, poly(methyl methacrylate) (PMMA), nitrile rubber (NBR), polyvinylpyrrolidone (PVP), polyvinylidene fluoride (PVDF), poly(dimethylsiloxane) (PDMS), poly(ethyl methacrylate) (PEMA), The one or more polymers or sol-gels may be present in an amount from about 0.1% to about 30% (by weight) or any amount or range therebetween, for example 1, 2, 3, 4, 5, 6, 7, 8, 9, 10, 12, 14, 16, 18, 20, 22, 24, 26, 28 or 30%, or any amount or range therebetween. In some embodiments the one or more polymers or sol-gels may function as a rheology modifier.

Charge Compensator:

In some embodiments of the invention, a charge compensator (charge-transfer complex or charge-transfer salt) may be included in one or more compositions. A charge compensator may be a cathodic material to aid in redox balance of an anodic chromophore. The charge compensator may be stable, or sufficiently stable in both reduced and oxidized forms. The charge compensator may be an organic semiconductor. Examples of charge compensators include Prussian Blue (PB), ferrocenium tetrafluoroborate, ferrocenium hexafluorophosphate, tetracyanoquinodimethane, tetrafluoro-tetracyanoquinodimethane, 1,4-dicyanobenzene, 1,2,4,5-tetracyanobenaene, pyrene, tetracene, pentacene or the like. The one or more charge compensators may be present in an amount from about 0.1% to about 10% (by weight) or any amount or range therebetween, for example 1, 2, 3, 4, 5, 6, 7, 8, or 9%

Charge Carrier:

The primary role of the charge carrier component is to facilitate transport of the electrons and "holes" between the two electrodes and consists of, or any combination of, substances known in the art to be suitable charge carrier materials. The charge carrier used in the preparation of the hybrid P/E switching material is typically redox active in the electrochemical potential range required to trigger colour lightening of the hybrid P/E switching material. Examples of suitable charge carriers include, but are not limited to tris(4-bromophenyl)amine, tris(4-chlorophenyl)amine, 10-methylphenothiazine, 9,9-(N,N,N',N'-tetrabiphenyl-N,N'-diphenyl)fluorene, 4,4'-di(N-carbozolyl)biphenyl, 1-(N-carbozolyl)-4-diphenylaminobenzene, N,N,N'N'-tetraphenylbenzidine, and 1-(N-Carbozolyl-4-N'-alpha-naphthyl-N'-phenylamine. The hybrid P/E switching material according to the present invention typically contains about 0.1% to about 10% by weight of the charge carrier component UV Stabilizer:

The primary role of the UV stabilizer is to inhibit photodegradation of the hybrid P/E switching material by scavenging radical intermediates formed in photodecomposition processes and consists of, or any combination of, substances known in the art to be suitable UV stabilizing materials. Examples of suitable UV stabilizers include, but are not limited to the class of compounds known in the art as hindered amine light stabilizers (HALS). One or more UV stabilizers may be present in an amount from about 0.01% to about 10% (by weight) or any amount or range therebetween, for example 1, 2, 3, 4, 5, 6, 7, 8, 9 or 10%.

UV Blocker:

The primary role of the UV blocker (or UV absorber) is to prevent photodegradation of the auto-darkening material by including a component of the material that absorbs higher energy UV light and dissipates the energy thermally preventing photodecomposition and consists of, or any combination of, substances known in the art to be suitable UV blocking materials. Examples of suitable UV blockers include, but are not limited to benzotriazoles, benzophenones. One or more UV absorbers may be present in an amount from about 0.01% to about 10% (by weight) or any amount or range therebetween, for example 1, 2, 3, 4, 5, 6, 7, 8, or 9%.

Tinting Agent:

Inclusion of a colourant or tinting agent in a composition according to various embodiments of the invention may achieve a desired colour and/or adjust the visible light transmission of the composition. A variety of colourants are known in the art, and selection of a colourant to achieve a desired colour, hue or transmissibility is within the ability of a skilled worker. Examples of colourants include one or more chromophores as described herein, Prussian blue, or the like. One or more colourants may be present in an amount from about 0.01% to about 10% (by weight) or any amount or range therebetween, for example 1, 2, 3, 4, 5, 6, 7, 8, or 9%

Although the optional components noted above have been described with reference to the hybrid P/E switching material, one of skill in the art would understand that some of these optional components could also be used when the variable transmittance optical filter comprises a switching material other than a hybrid P/E switching material.

Preparing the Optical Filter

Optical filters may be prepared by any of several methods, including pressing, knife coating, roll-to-roll processes, or similar methods that enable application of switching material to be applied to a substrate. A method for making a flexible VTO filter generally comprises the steps of: providing a first flexible transparent substrate, having a transparent conductive material coated or deposited on one side of the flexible transparent substrate to form at least one electrode, and coating or depositing the conductive side of the flexible substrate with a switching material. The method may further comprise a step of providing a second flexible substrate, and applying the second flexible substrate on top of the switching material to form a sandwich structure with the switching material in contact with the two transparent conductive electrodes. For an embodiment where the first flexible substrate comprises both first and second electrodes, the second flexible substrate need not comprise a conductive layer. For embodiments where the first flexible substrate comprises one electrode, the second flexible substrate may further comprise a conductive layer.

In some embodiments, a method of making an optical filter comprises providing a first transparent substrate, applying a substantially transparent conductive coating to one side of the transparent substrate in order to form an electrode, coating the substrate with a switching material, and laminating a second similarly prepared second transparent substrate coated with a conductive coating on top of the switching material to form a 'sandwich' structure, the switching material between the conductive coatings of the first and second substrates.

In one embodiment, the switching material is a fluid having a high viscosity at room temperature and may be made into a lower-viscosity liquid by heating to allow it to be applied or coated onto the substrates. In one embodiment, the switching material is heated to about 100° C. and pressed between the substrates. The switching material may comprise a co-solvent and may becast as a liquid (e.g. wet-coating for roll-to-roll methods), and further treated to remove the co-solvent and to increase the viscosity of the switching material. For example, the switching material can be dried (evaporating the solvent or co-solvent) ors cured to increase the viscosity to form a gel, semi-solid or solid. Curing the switching material may be accomplished with UV light, heat or a combination thereof. A photoinitiator may be added to the switching material which, when exposed to UV light, can help to cross-link the formulation to increase its viscosity. Other methods of curing such as exposure to electron beams may be possible with different formulations. One skilled in the art will appreciate that this polymerization and/or cross-linking can be initiated by chemical-, thermal-, or photo-type initiators. A common method of UV curing can be accomplished by adding a constituent that, when exposed to UV light, will form a radical to initiate polymerization and/or cross-linking. Suitable polymerization initiators are known in the art and include, for example, heat sensitive initiators such as AIBN, photoinitiators such as DAROCUR™ 4265. The gelled switching material can then adhere to both substrates to form an integral structure.

Once the filter has been made, it can be cut to size and/or sealed around the perimeter, and an electrical connection can be made to the electrodes. Bus bars and/or connectors may be placed before or after cutting and/or sealing. The electrical connection can be made by printing bus bars onto the substrates in contact with the transparent conductive coating; alternately, bus bars may be affixed with a conductive adhesive. Electrical leads can then be attached to the bus bars, and connected to the electrical control system and/or energy harvesting power source and/or power storage device. The optical filter when completed will darken automatically in the presence of UV light and allow the user to return it to a lighter state when an appropriate electrical charge is applied to the electrodes.

Power Source and Energy Storage Components

Devices according to various embodiments of the invention may comprise a power source. Examples of power sources include batteries, and energy harvesting power sources. In some embodiments, the device is a window such as an insert window, and the power source may be one or more batteries; the window may optionally be electrically connected to a building electrical system. An electrical connection to a building electrical system may be advantageous for a window according to various embodiments of the invention, as the window may continue to be operable in the event that the one or more batteries fail to supply sufficient power. In some embodiments, the window may comprise an energy harvesting power source that provides sufficient power to operate the window, and/or provide power for recharging an energy storage component.

The term "energy-harvesting" ("power harvesting" or "power scavenging") is used to refer to components that capture energy from external available sources. As used herein, energy-harvesting technology includes solar cells, solar panels, or other photovoltaics, vibrational energy-harvesting technologies such as piezoelectrics, acoustic converters, or other mechanical energy converters, and thermal energy-harvesting technologies such as pyroelectrics and thermoelectrics. Energy-harvesting may include but is not limited to low-power energy-harvesting. Harvested energy may be stored in an energy storage component, and the electricity used provide power to a device or system according to various embodiments of the invention, by application of a voltage across the first and second electrodes of the device.

Figure 3A:
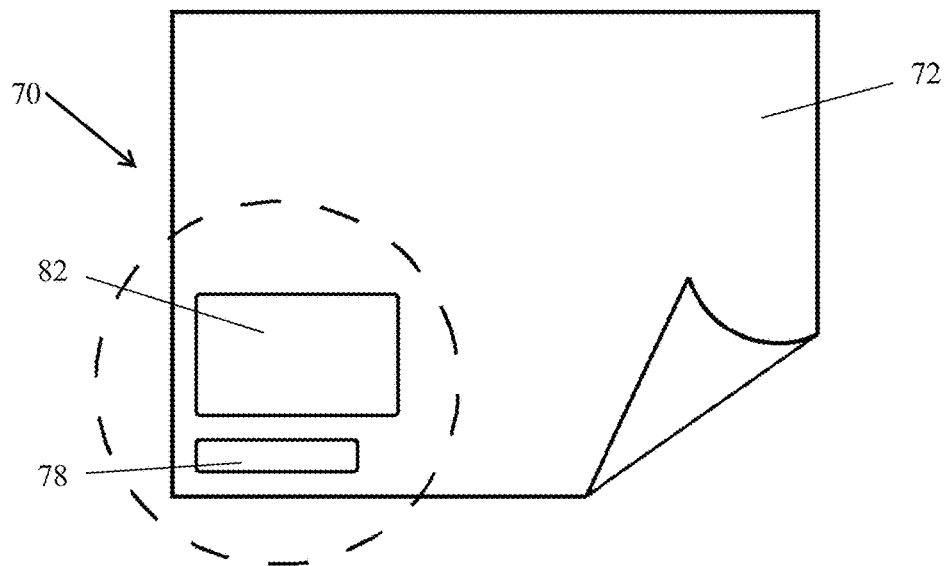
FIGS. 3A, 3B illustrate a self-powered variable transmittance optical device film, in accordance with an embodiment of the present invention.
Figure 3B:
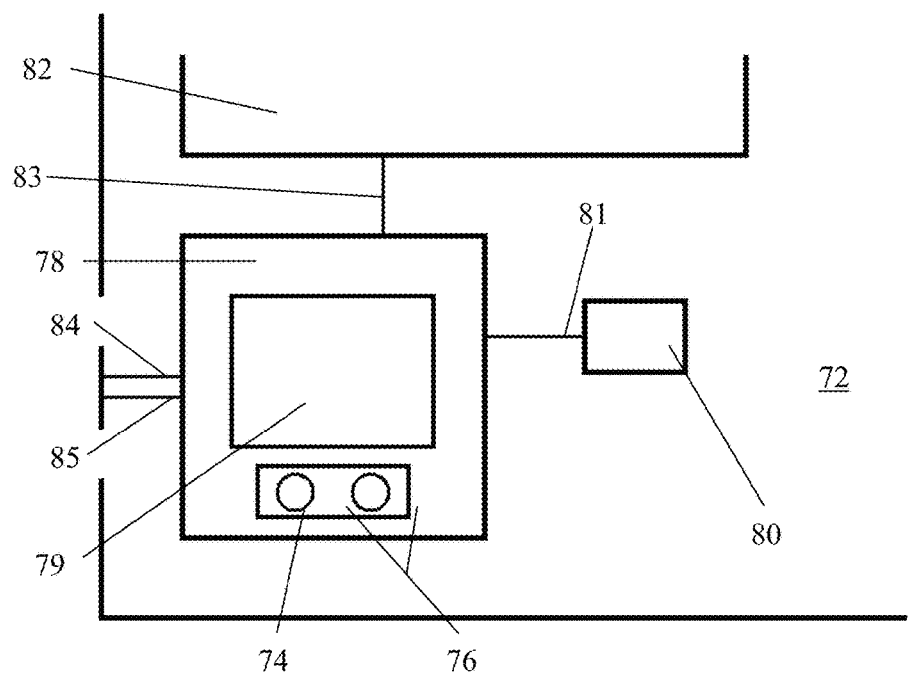

Referring to FIGS. 3A and 3B, a flexible self-powered variable transmittance optical device according to an embodiment of the invention is shown generally at 70. FIG. 3B is an enlarged view of the circled region of FIG. 3A. In some embodiments the device may be a film that may be applied to an existing window, a pane for use in a window, an opthalmic device, or a lens or visor for use in an opthalmic device. The device comprises a flexible optical filter 72. The device further comprises a user interface portion 74 with membrane switches 76, electrical system 78 operatively coupled to the user interface 74 by connectors (not shown). Electrical system 78 may comprise control circuitry, power management circuitry, optional display 79 for providing information relating to various parameters of the device such as VLT, applied voltage, voltage stored in the energy storage device, user instructions or the like, or other components for operation of the device. Electrical system 78 is operatively coupled to the first and second electrodes by connectors 84, 85 of the device for application of voltage thereto, and to one or more optional energy storage components 80 by connector 81. Energy harvesting power source 82 is operatively coupled to electrical system 78 by connector 83. Some or all of the user interface, the electrical system, the energy storage components, or the energy-harvesting power source, may be formed at least in part of flexible materials, such as flexible conductors, films, coatings or the like, thereby facilitating flexibility of the device. Alternatively some or all of these components may comprise a smaller, inflexible portion of the device, thereby facilitating flexibility of a substantial portion of the device. Components disposed on the device may be configured to have a low profile, thereby facilitating a thinner device.

Power for the voltage applied to the optical filter may be supplied by an energy-harvesting power source (EHPS). Devices in accordance with the present invention comprise one or more EHPS for generating power. The term "energy-harvesting" is used to refer to components that capture energy from an external source. Energy-harvesting power sources include photovoltaic power sources (e.g. solar cells, solar panels, or arrays thereof, photoelectric cells or arrays and the like); piezoelectric power sources; electrostatic (capacitive) power sources; pyroelectric power sources, thermoelectric power sources; or the like. EHPS may also include, or be described as, renewable power sources, or 'green' power sources. Energy harvesting may include but is not limited to low-power energy harvesting, for example energy harvesting of less than 20 W, less than 10 W, less than 5 W, less than 2 W or less than 1 W, In some embodiments, low-power energy harvesting may be from about 0.001 to about 20 W, or from about 0.001 to about 1, or from about 0.005 to about 2, or from about 1 to about 5, or from about 2.5 to about 20 or from about 5 to about 20 W, or any amount or range therebetween, The power is used at least in part for application of a voltage for transitioning the switching material of the optical filter. The power may also be used for operating aspects of the electrical system, such as control or user interface components. Inclusion of an EHPS in a device facilitates self-powering of the device according to various embodiments of the invention. Advantages of self-powered devices may include one or more of: reduction or elimination of the need to run power lines to devices: reduction or elimination of maintenance programs to recharge or replace batteries; increased portability of devices for increased periods of time; independence from centralized power sources, or the like, or a combination thereof. Installation of a self-powered device that uses a renewable energy source may provide societal, business and/or financial benefits to a user, through installation and/or use of a 'green' power source.

The EHPS may be a photovoltaic energy-harvesting power source (PV-EHPS). An example of a suitable PV-EHPS may be Sanyo Am-5608 (5 v, 17.8 mA-60.1×41.3 mm; available from Digikey). A small photovoltaic power source can be incorporated into a portion of the self-powered device, for example in a corner of a smart window in or on a variable transmittance optical filter, or applied to the frame of the window or other device. The photovoltaic power source may be sized to provide adequate power for a predetermined level of operation of the device, while remaining relatively inconspicuous and positioned for adequate exposure to a light source. Components of a PV-EHPS may be transparent, semi-transparent or opaque. Flexible PV-EHPS, and flexible electrical system components will be known to those of skill in the art, and may be used in embodiments of the invention if desired. A vibrational energy-harvesting power source may be an acoustic power source, or another power source configured to convert mechanical energy into electrical power. A piezoelectric power source may be used to transform ambient vibrations into electrical energy; see, for example U.S. Pat. No. 7,385,333, U.S. Pat. No. 6,984,902, U.S. Pat. No. 8,030,807, US 2010/0072759. Vibrational energy may be a readily available source of power for wearable devices (e.g. opthalmic devices) or for windows, since these may provide a large and readily available surface for receiving vibrations. A variable transmittance optical device according to some embodiments of the invention, capable of converting sufficient acoustic energy may further provide a noise dampening effect, which may reduce street noise, for example.

In some embodiments, the EHPS of a device may comprise a thermal EHPS such as pyroelectric power source or thermoelectric power source. Exterior windows form a boundary between building or vehicle interior and exterior and thus provide a thermal gradient (either the interior or exterior may be of the higher temperature, depending on the climate and environmental conditions), allowing exploitation of the thermoelectric effect to generate an electric voltage. Other thermal energy sources include a user's body heat, which may be useful for powering wearable devices such as ophthalmic devices, since these may be placed in contact with a user to draw body heat therefrom. Thermoelectric generators are known in the art, see, for example US2008/0066796, U.S. Pat. No. 7,397,169, US 2011/0215590.

The energy-harvesting power source may be supplemented or replaced with conventional power sources, such as power from an electrical outlet. For example the device may be configured for operatively coupling to building AC power via an AC/DC convertor, or vehicle battery power, or the like, which can be plugged in as needed to charge the energy storage component. In some embodiments, the control circuit comprises an AC/DC convertor. The energy-harvesting power source may be disposed on one or more selected surfaces of the one or more transparent substrates, or it may be disposed adjacent to the transparent substrates. For example, a solar cell or array thereof may be disposed on either side of either of the first or second transparent substrates, or at a plurality of locations. This may provide for additional flexibility in configuration of the present invention, to appropriately place the energy-harvesting power source for collection of energy. In some embodiments, if the switching material is disposed between a light source and a solar cell or array thereof, the switching material may, in a darkened state, inhibit or reduce powering of the solar cell, depending on its transmittivity characteristics to wavelengths of light converted to power by the solar cell. However, in such cases, an energy storage component may be used to facilitate switching of the switching material.

An electrical system receiving power from the EHPS may further comprise an energy storage device, capable of storing power generated by the EHPS. Examples of energy storage components include a capacitor, battery or super capacitor. The energy storage device may be charged by a charger, the charger and/or energy storage device receiving energy from the EHPS. Examples of chargers include a trickle charger or a float charger, The charger may comprise, or be operatively connected to, one or more of a charge regulator (e.g. battery regulator), a timer, or a voltage detector, that detects when the energy storage device is at or near a maximum charge capacity, and automatically ceases to charge the energy storage device further, until or unless its stored energy decreases.

Use of an energy storage component in conjunction with an EHPS may facilitate operation of the device when adequate energy is not available from the EHPS, for example when the device does not receive sufficient light, or light of suitable wavelengths if a photovoltaic power source is used (e.g. the sun isn't out, or the photovoltaic power source is partially obscured). An energy storage component may additionally, or alternatively, facilitate operation of the device when the power source does not provide sufficient power relative to that required for switching of the optical filter. For example, the energy storage component can be used to accumulate and store energy provided from the power source for intermittent operation of the optical filter.

In operation, where the EHPS is a photovoltaic device, incident light on the solar cell provides power that may be applied to the device to fade the switching material from dark to light state and also to charge an optional energy storage component. Additionally or alternatively, power from the solar cell may be used to recharge the energy storage component relatively quickly so that the energy storage component may provide sufficient power for operating the switching material from dark to light state. Where the incident light on the device comprises a UV portion, a hybrid P/E switching material will proceed to darken; power from the solar cell and/or energy storage component may be applied to the device to inhibit such a transition. The energy storage component may be of a suitable capacity to effect at least a one-time transition of the switching material from dark to light state after incident light (e.g. interior light or sunlight). In other embodiments, the device comprising a hybrid P/E switching material may receive sufficient power from the EHPS without the need for an energy storage component in the electrical system.

Electrical System

Embodiments of the present invention comprise an electrical system configured to receive power from the energy-harvesting power source and to provide power to the first electrode and the second electrode for application of the electric voltage. The electrical system is operatively coupled to the energy-harvesting power source and to the first and second electrodes, and is configured to provide controllable application of appropriate amounts of voltage to the electrodes for transitioning the switching material. The electrical system may comprise one or more energy storage components, voltage regulators, voltage transformers, current regulators, current transformers, voltage modulators, current modulators, sensing components, control system, feedback systems, communication electronics, microelectronics, voltage or current-controlled transistors, switches or relays, a charger, a charge regulator, user output interfaces such as annunciators, user input interfaces such as one or more push-buttons, membrane switches, capacitive touch pad or surface, mechanical switches, or the like; and connectors electrically connecting the one or more components. Connectors (electrical connectors) may include wires, cables, bus bars, leads, conductive traces or the like, connectors may be etched onto a board or wafer, or other support housing an EHPS and/or components of the electrical system. The electrical system may be provided on a flexible circuit which may be applied to or incorporated into devices or filters according to various embodiments of the invention. Components of the electrical system may have power needs supplied by the EHPS, energy storage components or other power source. The electrical system may comprise one or more sensors (e.g. light sensors, irradiance sensors, UV sensors, temperature sensors, current or voltage sensors or the like) coupled to and in communication with control electronics. Input from a sensor, switch, user interface or the like may be received by the control unit (control system).

The electrical system operatively couples components of the one or more energy harvesting power sources in series, in parallel, or a combination thereof. The operative coupling to the power sources and/or energy storage components may be configured to provide for a predetermined level of voltage and current as required by the electrical system for operation of the variable transmittance optical device. For example, an array of n solar cells may be coupled in series to provide power at a voltage which is substantially n times the voltage provided by each solar cell individually. As a further example, m banks of such arrangements of solar cells may be coupled in parallel to provide power at a current which is substantially m times the current provided by each bank individually. Other arrangements of conductors for receiving power from the energy-harvesting power source or sources may be provided as would be readily understood by a worker skilled in the art. In some embodiments, a PV-EHPS may comprise such an array of cells, alternately referred to as a photovoltaic array.

The energy storage component may function to accumulate and store sufficient amounts of energy to facilitate operating the switching material. The energy storage component may provide some or all of the power for operating the switching material at a given time. The energy storage component may be configured to store enough energy for operating the full area of hybrid switching material of the device from a dark state to a light state a single time, or a predetermined number of times, before needing to be recharged. The energy storage component may be recharged between, or in some embodiments during, switching events. In further embodiments, such an energy storage component may be used in conjunction with a photovoltaic power source which provides sufficient power to operate the full area of hybrid switching material of the device from dark to light state when light is available for conversion to electricity by the photovoltaic power source.

Figure 4A:
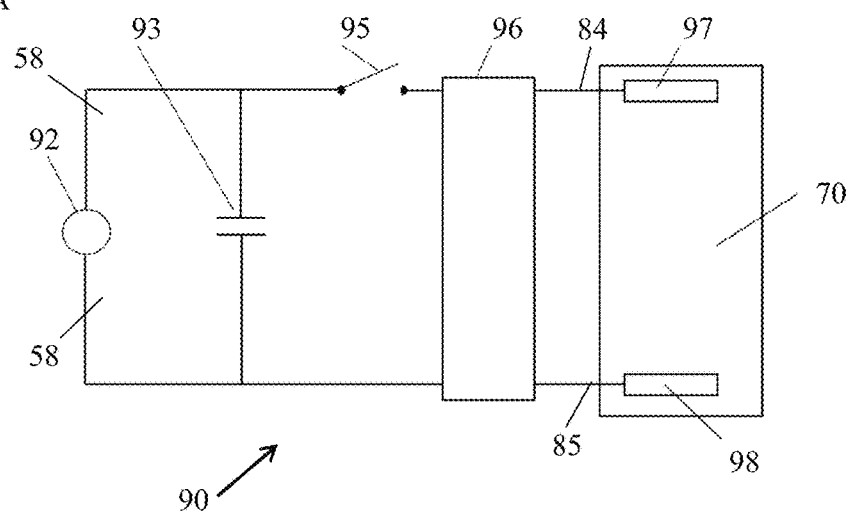
FIGS. 4A, 4B schematically illustrate embodiments of an electrical system of a self-powered variable transmittance optical device, in accordance with an embodiment of the present invention.

Referring to FIG. 4A, an electrical system according to various embodiments of the invention is shown generally at 90. An energy-harvesting power source 92 is operatively coupled to components of the electrical system by connectors 58 and configured to charge a capacitor or super capacitor 93. A switch 95, when closed, applies power from the power source 92 and/or capacitor 93 to input terminals of optional power converter 96. Switch 95 may be directly operable by a user, or it may be operable via a control system by closing and/or opening the switch in response to predetermined conditions (e.g. user input, sensor feedback, timer operation or the like). For example, switch 95 may be closed upon operation of a pushbutton by a user, and then opened again upon expiry of a timer, the timer set to expire after a period of time from switch closing corresponding to the time required to transition the optical filter from a dark state to a light state. Power converter 96 may comprise a voltage regulator, a voltage converter, a current converter, a waveform generator, or the like, or a combination thereof, to convert voltage and/or current supplied by the power source 92 and/or capacitor 93 to a form and level appropriate for supplying to the first and second electrodes of the optical filter 70 via bus bars 97 and 98 and connectors 84 and 85.

Figure 4B:
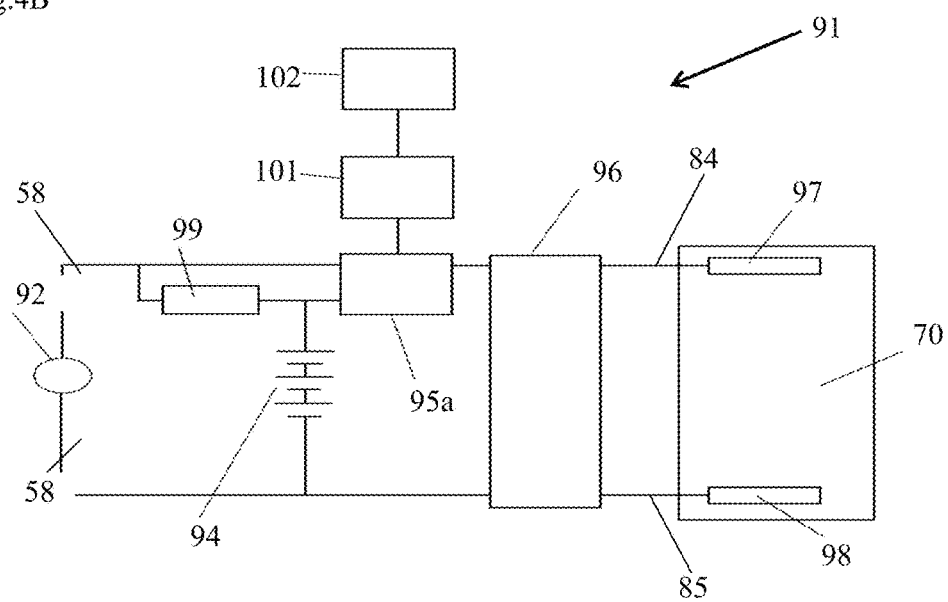

Referring to FIG. 4B, an electrical system according to various embodiments of the invention is shown generally at 91. Power source 92 is operatively coupled to the electrical system by connectors 58 and configured to directly supply power to the electrical system and/or charge an energy storage component 94. Optional charge controller 99 may be provided to control charging of the energy storage component 94. Switching system 95a comprises one or more switches for controllably coupling the power source 92 and/or the energy storage component 94 with the optional power converter 96, providing power to first and second electrodes of the optical filter 70 via busbars 97 and 98 and connectors 84 and 85. Switches of the switching system 95 may be of any suitable form, and may be connected in series, parallel, or a combination thereof, and optionally in one or more feedback loops, and may be operatively interconnected with each other and/or with control system 101.

In one embodiment, the switching system 95a comprises a first switch which may be closed by operation of the control system 101 to provide power from the power source 92 to power converter 96, configured to apply an appropriate voltage and/or current to the electrodes. In another embodiment, switching system 95a further comprises a second switch closable by control system 101 to provide power from the energy storage component 94 to power converter 96, configured to apply an appropriate voltage and/or current to the first and second electrodes.

Switches of the switching system 95a may be operable via a user interface 102, via control system 101 or a combination thereof, to open and/or close the one or more switches in a selected sequence and/or at a selected time interval. The selected sequence and/or time intervals may be determined based on one or more of user input, sensor feedback, or predetermined values, or a combination thereof. Control system ("control unit") 101 may comprise control electronics, and an input receive and be configured to implement logic such as ladder logic, or the equivalent, to perform such tasks. For example, control system 101 may be configured to close a switch upon detecting operation of a push-button of the user interface 102 by a user, and configured to open the switch upon expiry of a timer, the timer set to expire after a period of time from switch closing corresponding to the time required to transition the optical filter from a dark state to a light state. The period of time may be predetermined, or based on sensor feedback from monitoring the VLT of the optical device to which the control system is coupled. Control system 101 may be configured to select whether to draw power from power source 92 or energy storage component 94, depending on available power in each component and/or power needs of the optical device.

User interface 102 is operatively coupled to the control system 101, and may comprise one or more push-buttons, membrane switches, dials, or the like, for providing input to the control system 101, which in turn operates the switching system. In some embodiments, the user interface 102 comprises outputs such as annunciators, meters, or screens, for example to provide an indication to a user of available energy from the power source 92 and/or energy storage component 94, status of the device, or the like. The user interface 102 may be operatively coupled to the control system by signal wires or wirelessly. For an electrical system configured to operate on input from one or more sensors, the one or more sensors provide input for operation of the switching system. In some embodiments, the electrical system may be configured to switchably bypass the energy storage component, for example by providing an alternate electrical path which couples the power source to the optical filter and/or other components directly without the energy storage component in series. In some embodiments, the power source and the energy storage component may concurrently deliver power. For example, the alternate electrical path may be engaged automatically when sufficient power is available from the power source, or it may be engaged manually by operation of a switch or other user input.

Devices and Configurations

In some embodiments, an EHPS and one or more components of the electrical system may be formed or positioned on a flexible substrate material. This provides a flexible film which can be laminated onto or between transparent window portions, such as sheets of float glass, using an adhesive that provides an optically clear bond (e.g. an optically clear adhesive such as 8172PCL, available from 3M). In one embodiment, the transparent window portion is clear or tinted float glass (for example, as available from PPG Industries of Pittsburgh, Pa.), tempered glass, safety glass or the like. Other materials such as polycarbonate and other transparent polymer materials can also be used for transparent window portions.

Windows or lens systems may be planar or non-planar. A lens of a lens system, or a pane, or panes of a window system may be transparent or substantially transparent; lenses or panes may have a VLT of about 100%. A flexible film in accordance with the invention may be attached to a planar or non-planar transparent substrate with adhesive (e.g. an optically clear adhesive layer such as 8172 PCL from 3M, PVB, EVA or TPU). In one embodiment, the present invention is incorporated into the window system by laminating a flexible variable transmittance optical filter to a transparent substrate. In another embodiment, a variable transmittance optical filter is incorporated into a window system by laminating the flexible variable transmittance optical device film between two transparent panes (e.g. forming a variable transmittance layer between two rigid panes, such as exemplified in FIGS. 9 and 10). For a non-planar substrate, a flexible VTO filter that is a film may be applied to the non-planar substrate with tensioning or stretching, and/or the application of heat, to conform the flexible VTO film to the curve of the non-planar substrate.

Windows comprising a variable transmittance optical filter ("variable tint windows", "variable transmittance windows", "smart windows") may be used in vehicles (e.g. bus, car, train, plane, boat, ferry or the like) or buildings to improve occupant comfort (reduce glare, mediate brightness, reduce solar heat gain), reduce heating or cooling needs for the building or vehicle, and/or provide privacy for occupants. Variable tint windows of embodiments of the present invention can be manufactured (e.g. produced at the factory) comprising a variable transmittance optical filter, and EHPS, and optionally other components of the electrical system, or components useful for mounting the window in the building or vehicle (e.g. frame, mounting brackets, hinges or the like). In some embodiments, the variable transmittance optical filter and EHPS may be installed on an existing window of a building or vehicle (e.g. 'after market', 'retro-fitting'). In some embodiments, an insert window comprising a variable transmittance optical filter and EHPS may be installed for a building with existing windows ('secondary glazing', 'storm window', insert window or the like). For after-market installation, a variable transmittance optical film with EHPS may be applied to the vehicle window using a suitable adhesive. Control units and/or other components of an electrical system for operation of the VTO filter may be mounted on or nearby the window. Optionally, wireless controls may be used to, for example, initiate application of a voltage to the VTO filter.

Figure 5A:
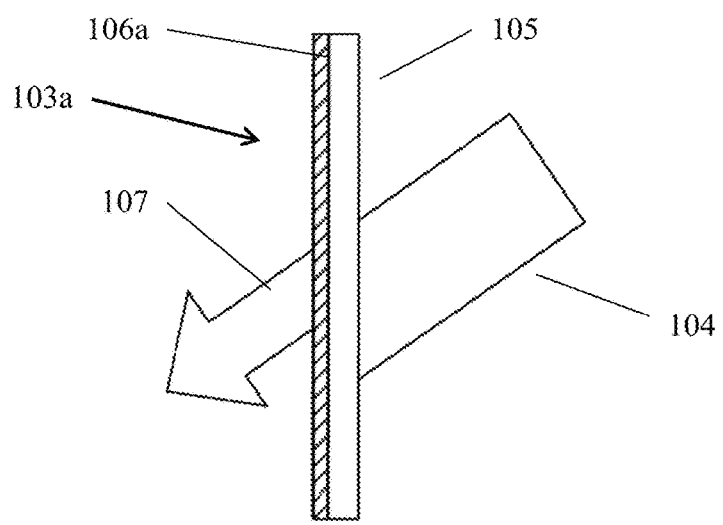
FIGS. 5A, 5B provide a diagrammatic view showing the transmission of light through a variable tint window in a dark state (FIG. 5A), and a light state (FIG. 5B), according to an embodiment of the present invention.
Figure 5B:
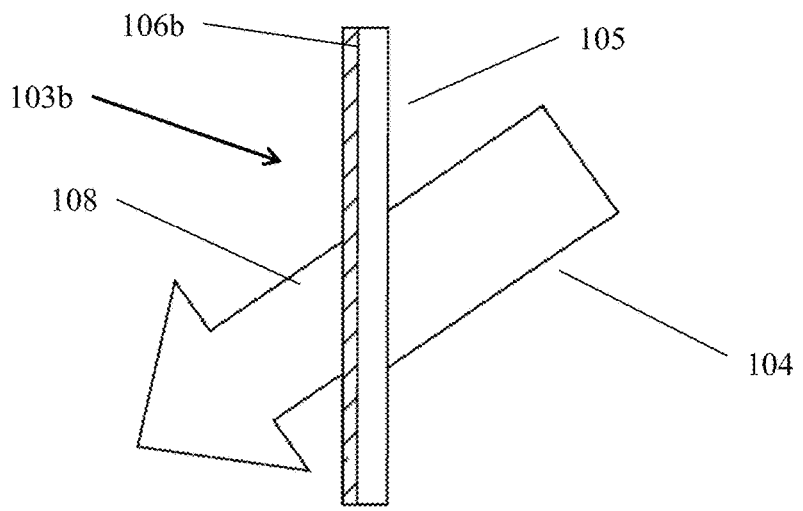

Referring to FIGS. 5A and 5B, a schematic diagram of a variable transmittance window according to various embodiments of the invention is shown at 103. The window comprises a pane 105, and a VTO filter 106a. Light 104 from a light source is incident on pane 105 and VTO filter 106a, VTO filter 106a is switched a dark state due to the presence of UV light in the incident light. The dark state of VTO filter 106a reflects and/or absorbs a portion of the incident light 104, allowing only a portion 107 of the incident light to be transmitted through the window. FIG. 5B shows the VTO filter 106b after a voltage has been applied, rendering the VTO filter to a light state. The light state of the VTO filter 106b allows for a greater portion 108 of the incident light to be transmitted through the window. Thus a single window may demonstrate variable transmittance of light—the portion of incident light transmitted is dependent on the particular configuration of the VTO filter, as exemplified herein.

In other embodiments, the window may comprise additional coatings or layers to block or reflect light in the UV, IR, VIS or NIR range, or a combination thereof. In some embodiments, the adhesive used to apply the VTO film to the window may block a portion of the UV light; or a UV-blocking film may be applied to the window. In some embodiments, the window may comprise more than one pane, and a surface of one or more panes may comprise a low-emissivity ("low-E") coating or a solar control coating. Low-E coatings may be used in building windows to further improve the insulating and/or solar heat gain properties of the window. Emissivity is expressed as a unitless value (emissivity number) and refers to the heat emitting property of a surface. Perfect emissivity has a value of 1; untreated window glass has an emissivity o about 0.8 to about 0.85; glass with a low-E coating demonstrates reduced emissivity, generally in the range of 0.05 to 0.45. A low-e coating may be provided on a pane of glass before assembly of the window, or applied to a pane of the window after assembly. A hard (or pyrolytic) low emissivity coating may comprise a single layer of a substantially transparent, electrically conductive oxide such as an oxide of Sn, Zn, In, W or Mo, or a combination thereof. The low-E coating comprises a further dopant, such as F, Cl, Sn Al, Ta, Nb, In, Ga or the like—e.g. fluorine-doped tin oxide or tin-doped indium oxide. The coating may further comprise a silicon or silicon oxynitride under layer. Solar control, or heat-reflective, coatings may comprise layers of Ag or Sn oxide, and reduce the amount of heat absorbed through the coated glass. Metallic heat reflective coatings may also be electrically conductive. Additional UV, IR, VIS and/or NIR reflecting or blocking may be provided by components of the optical filter, for example some materials used in the conductive layer may contribute to IR reflection.

Solar heat gain (quantified by a solar heat gain coefficient, or SHGC) is an indicator of the portion of the energy in the solar radiation spectrum that enters the building through the windows as heat. An SHGC of 1 means that all of the energy present in the solar radiation incident on the window enters the building, and a SHGC of 0 means that none of the energy in the solar radiation incident on the window enters the building. A low SHGC may be desirable in a hot climate where air conditioning is used to cool the inside of buildings. In such cases, a window with a lower SHGC can reduce the amount of energy used for air conditioning. Alternatively a high SHGC can be desirable in more northerly or southerly climates on cooler days when passive heat gain is desired. A window with an SHGC that can be varied according to the condition can be desirable for both reducing air conditioning use on hot days and for allowing for some passive heat gain on colder days.

In embodiments where the EHPS is a photovoltaic EHPS (PV-EHPS), and the VTO device is a window or an opthalmic device, the PV-EHPS may be located on, or embedded in the substrate or switching material of the optical filter, or affixed to a pane of the window, affixed adjacent to the window, affixed on a frame of the window or the like. In some embodiments, the PV-EHPS may be affixed so as to be exposed to interior light of the building, and the device may be powered at least in part by interior lighting, instead, or in addition to, solar energy. In some embodiments, this may allow for an electrical system without an energy storage component, as interior light may be used to meet the power needs of the self-powered window, for example, in periods of low daylight, or at night. In another embodiment, the electrical system comprises a PV-EHPS disposed for exposure to internal light, and an energy storage component that may be charged by the PV-EHPS, operatively coupled to a self-powered window. Such a configuration may allow for operation of a self-powered window where a light source is the internal light of the building, and the light source is insufficiently energetic for operation of the window and/or electrical system—the PV-EHPS receives the available light and charges the energy storage component. When the window is to be electrically faded, the power needed for fading may be supplied by the energy storage component.

Where the PV-EHPS is located so as to cover a portion of the visible area of the window, the size of the EHPS may be selected to minimize obscuring the window, while still harvesting a suitable amount of power for charging the energy storage component (if present), and/or providing a suitable voltage to effect fading or darkening of the and/or operate the electrical system of the device. A photovoltaic power source of limited area, or another power source of limited capacity, can still be used to power the optical device by use of an energy storage device, since the energy storage device can be substantially continuously charged, for example by trickle charging, to accumulate energy, which may then be used to power the optical device intermittently, since the optical device may not require a constant large power draw, but may only require power when switching from dark to light state. In some embodiments, a photovoltaic EHPS may have an area of less than about 25%, or less than about 10%, or less than about 5% of one pane of the window, or of a first substrate and/or second substrates; in other embodiments, the photovoltaic power source may have an area from about 1% to about 25%, or from about 1% to about 10%, or from about 1% to about 5%, or any amount or range therebetween. While the efficiency of a PV-EHPS may vary, it is known that the relationship between power output and size (area) of the PV-EHPS is substantially linear—a larger device produces more power. However, the relationship between the power requirement of a hybrid P/E device and the size of the device may not be linear, and thus a smaller than would be expected PV-EHPS may be suitable for providing sufficient power to a hybrid P/E device as described herein. The overall low power draw of a hybrid P/E variable transmittance optical device may be met by an EHPS small enough to be portable, and in some cases worn by a user (e.g. for providing power to an opthalmic device). Where the device is a window, the PV-EHPS may be incorporated along an edge, in a corner or another less obtrusive portion of the window itself, without affecting the window. The efficiency of EHPS, including PV-EHPS, varies widely. A readily available PV-EHPS may be capable of producing about 40 W/m$^2$ (about 3.9 W/ft$^2$)—one skilled in the art will be aware of PV-EHPS with greater power production capabilities.

Figure 14A:
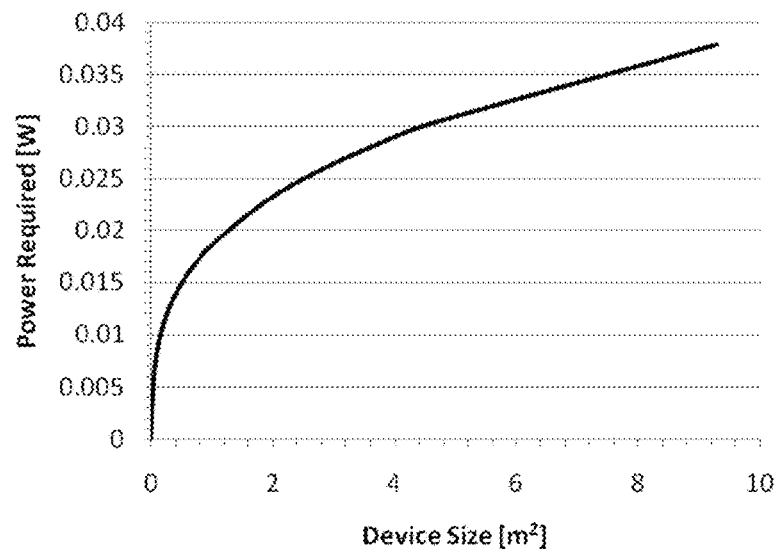
FIG. 14A shows a plot of power requirements for devices of a range of sizes ($m^2$), according to various embodiments of the invention.
Figure 14B:
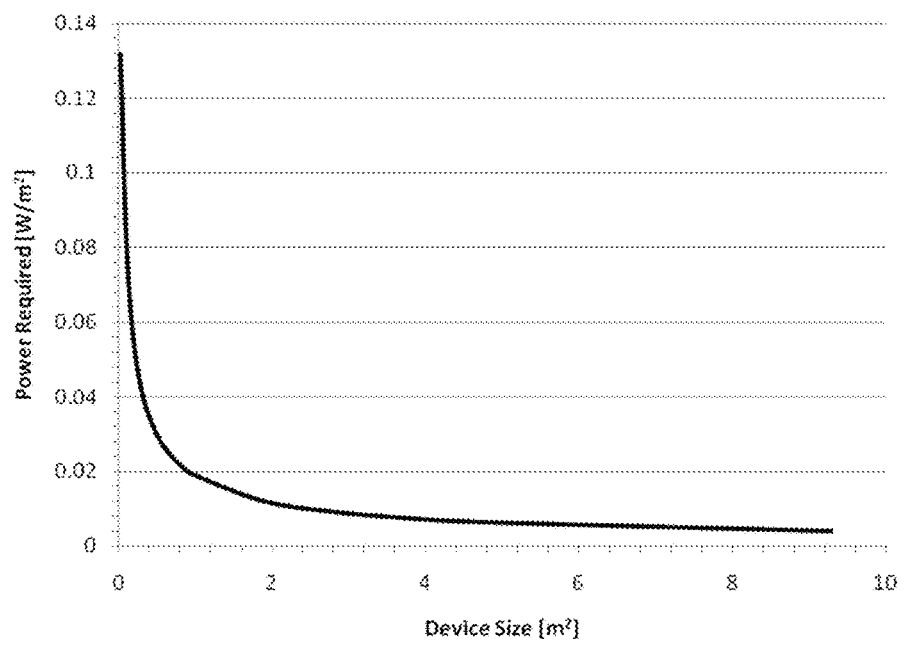
FIG. 14B shows a plot of the power requirement per unit area ($W/m^2$) relative to device size ($m^2$), for devices according to various embodiments of the invention.

Self-powered windows according to various embodiments of the present invention may exhibit low power requirements for switching. FIG. 14B illustrates the power required (W/m$^2$) relative to device size. As can be seen, the power requirement per unit area (m$^2$) decreases with increasing size of the variable transmittance optical filter in the device. In some embodiments of the invention the power requirement per unit area (W/m$^2$) relative to device size in meters squared (m²) may be from about 0.0001 W/m² to about 25 W/m², or from about 0.001 W/m² to about 10 W/m², or from about 0.0005 W/m² to about 5 W/m², or from about 0.001 W/m² to about 2 W/m², or from about 0.004 W/m² to about 1 W/m², or any amount or range therebetween. In some embodiments the power requirements, the range of power per unit area of variable transmittance optical filter is from about 0.034 W/m² to about 8 W/m² device/optical filter area.

In other examples, the lens of an opthalmic device comprising a hybrid P/E switching material and having a surface area of about 0.1 m² to about 0.2 m² can be faded with about 0.005 to about 0.01 W. For an exemplary automotive window (e.g. a sunroof, side window, rear window or windshield) having a surface area of about 0.2 m² to about 0.5 m², about 0.01 to about 0.02 W of power may be used to fade the lens of the automotive window. For an exemplary architectural window of about 0.5 m² to about 2 m², about 0.02 to about 0.25 W of power may be used to fade the lens of the architectural window. For a PV-EHPS capable of producing about 40 W/m², the area of a photovoltaic array for such applications would be about 1.25 to about 3.75 cm² for the opthalmic device; about 2.5 to about 5 cm² for the exemplified automotive window; or about 5-6.25 cm² for the exemplified architectural window. The power requirements may be higher or lower depending on the switching material used, the construction of the device, the efficiency of the electronics, environmental conditions and/or usage patterns of the device.

Figure 6:
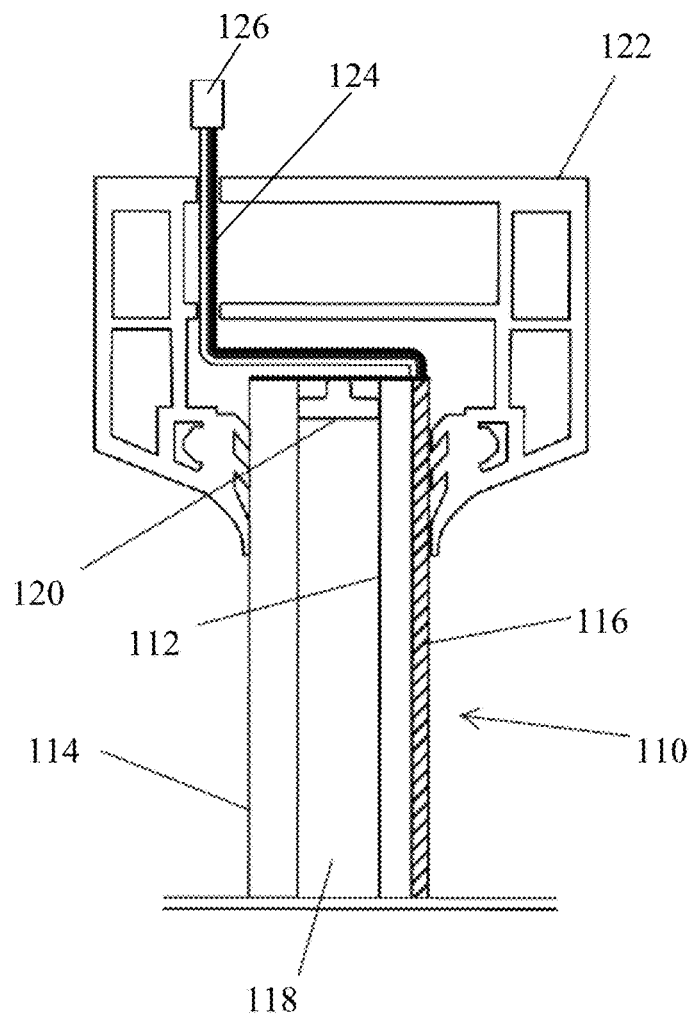
FIG. 6 is a cross-sectional schematic view of a variable transmittance window according to an embodiment of the present invention.

Architectural Windows:

For ease of description, a naming convention for reference to the particular surfaces of the multiple glass panes in an insulating glass unit (IGU), relative to the installation site, is used in the art; surface #1 is the exterior surface of the exterior pane of the window and consecutive surfaces of consecutive panes are numbered accordingly. A double-pane IGU, for example, would comprise surfaces #1, #2, #3 and #4, according to conventional numbering. Architectural windows may also be insert windows (retro-fitted windows, storm windows, secondary glazings or the like), suitable for installation in an existing building. Insert windows may themselves be an IGU, or may be a single pane of glass, or an optical filter with two rigid substrates, the insert window comprising a VTO filter as described herein. In one embodiment, there is provided an IGU comprising a variable transmittance optical filter laminated to surface #1, surface #2, surface #3 or and/or surface #4 of the panes of the IGU. In a further embodiment, the VTO filter may be laminated between two panes, and form one pane of the IGU. In another embodiment, the VTO filter may be suspended in the sealed gap between two panes. Referring to FIG. 6, a partial cross section of a window comprising a variable transmittance optical filter (a variable transmittance window) according to one embodiment is shown generally at 110. The illustrated window is an IGU comprising first pane 112 and second pane 114. An optical filter 116 is laminated onto surface #1 of first pane 112 of the IGU and is not in contact with sealed gap 118. The variable transmittance optical filter may comprise flexible first and second substrates, and may be a film. Spacer 120 provides a seal to form sealed gap 118 along with first and second panes, and the window is mounted in frame 122. Other components of an IGU are omitted for ease of illustration and clarity, but will be understood by one skilled in the art to be present. Wires 124 connect the optical filter 116 to a connector 126 that facilitates connection to an electrical system comprising an EHPS and other components for operation, such as those exemplified herein.

Figure 7:
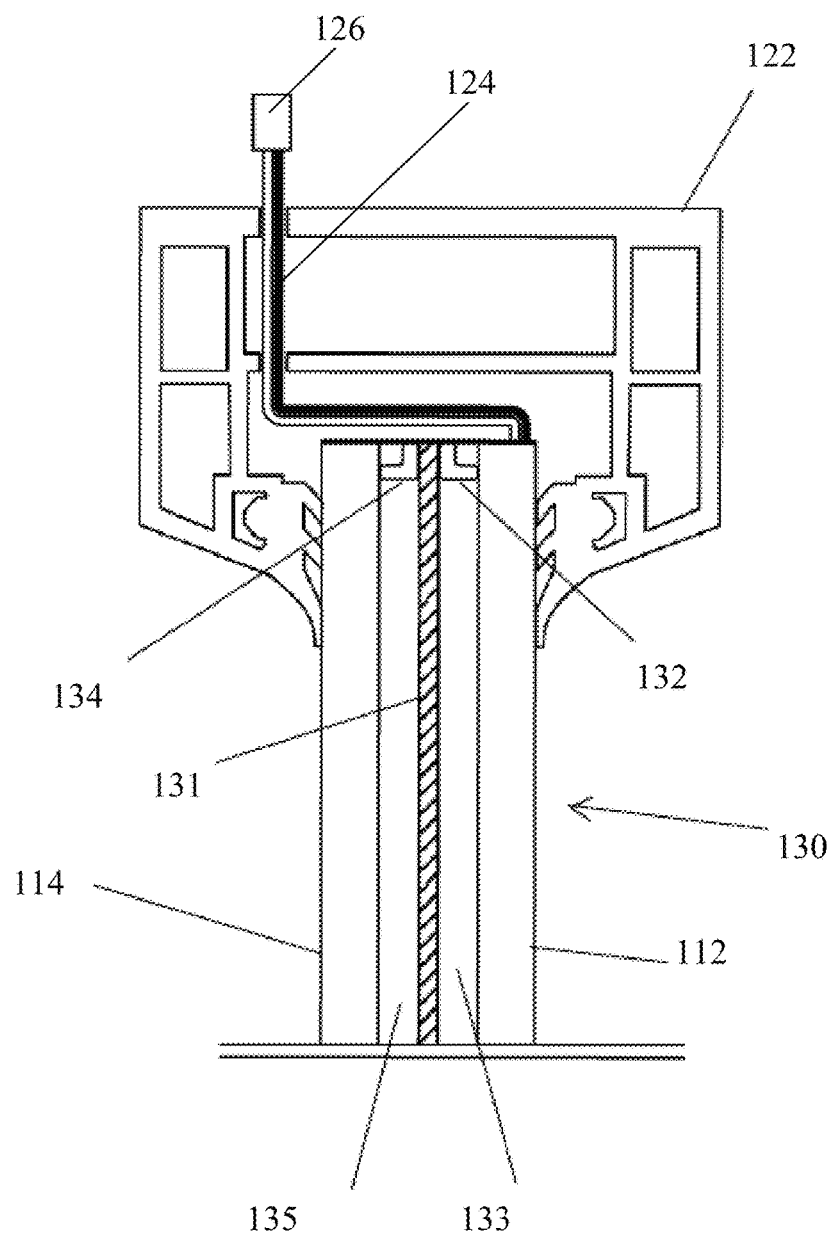
FIG. 7 is a cross-sectional schematic view of a variable transmittance window according to another embodiment of the present invention.

Referring to FIG. 7, a partial cross section of an insulating glass unit (IGU) according to another embodiment is shown generally at 130. IGU 130 comprises first pane 112 and second pane 114. A variable transmittance optical filter 13 is suspended between first pane 112 and second pane 114. Perimeter spacer and seal 132 creates a sealed space 135 between first pane 112 and optical filter 131. Perimeter spacer and seal 134 creates a sealed space 133 between second pane 114 and optical filter 131. The embodiment shown in FIG. 7 has two separate sealed spaces 133 and 135 on either side of optical filter 131, rather than just one sealed space as with most double-paned IGUs. Insulating glass unit 130 can be mounted in frame 122. Wires or electrical connectors 124, 126 are connected to electrodes in contact with the switching material, and to other components of an electrical system and an energy-harvesting power source (not shown). Other components of an IGU are omitted for ease of illustration and clarity, but will be understood by one skilled in the art to be present.

Figure 8:
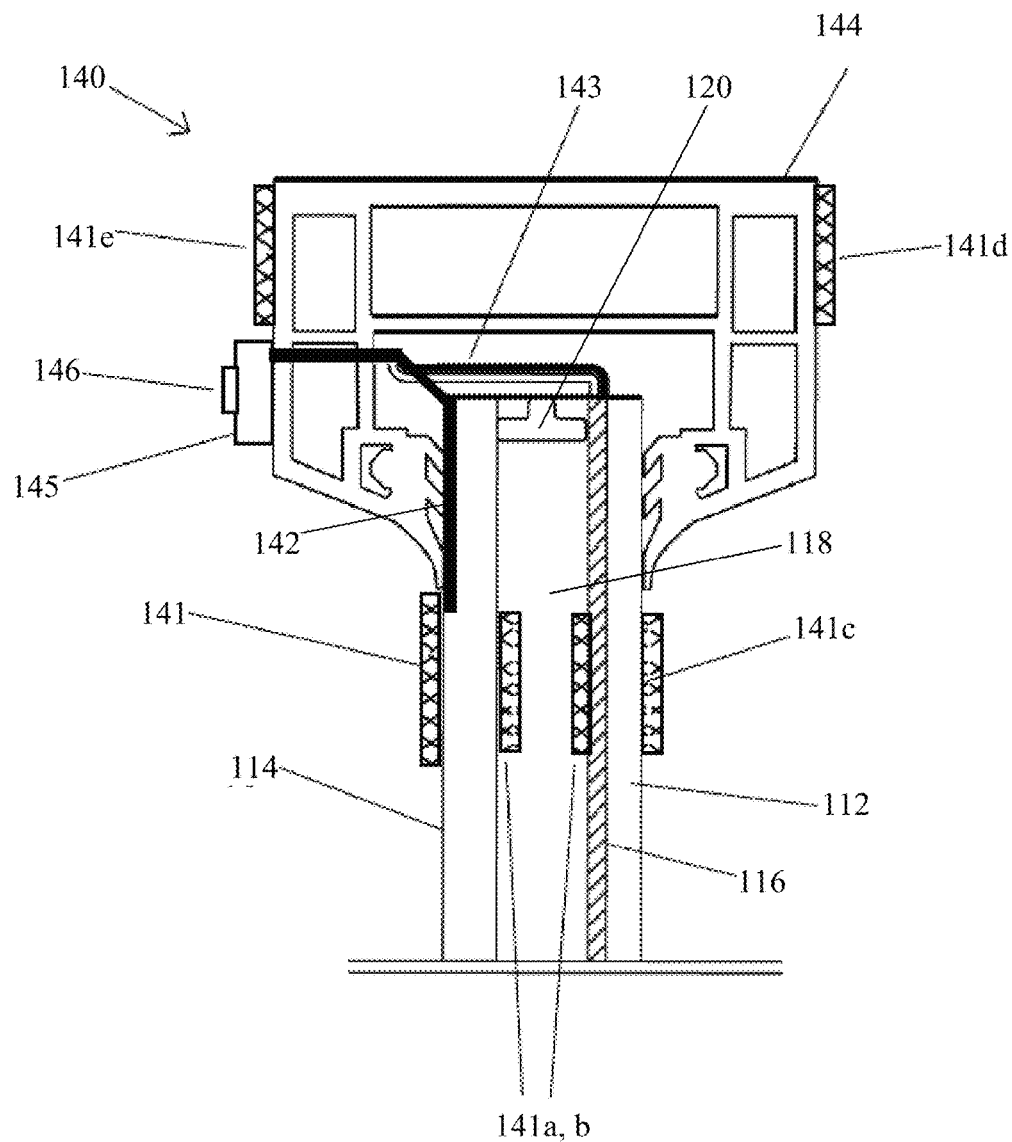
FIG. 8 illustrates a partial cross-section of a self-powered window, in accordance with an embodiment of the present invention.

Referring to FIG. 8, a partial cross-section of a variable transmittance window according to another embodiment is shown generally at 140. The illustrated window is an IGU comprising first pane 112, second pane 114, spacer 120, sealed gap 118 and variable transmittance optical filter 116 disposed (e.g. laminated) on surface #2 of the first pane. In the embodiment illustrated, an energy-harvesting power source 141, is affixed to surface #4 of the second pane 114 and operatively coupled to one or more components of the electrical system and the optical filter via connectors 142 and 143. The window is mounted in frame 144. Other components of an IGU are omitted for ease of illustration and clarity, but will be understood by one skilled in the art to be present. Other locations for energy-harvesting power sources may include, or alternately be 141a—surface #3 of second pane 114, 141b—the surface of the optical filter 116 disposed on surface #2 of the first pane 112, 141c—surface #1 of the first pane 112, 141d—on an exterior portion of frame 144 and/or 141e—an interior portion of frame 144. Selection of the location of an EHPS may be dependent upon the type of the EHPS, the configuration of the window and/or frame, the relative location of the optical filter; where the EHPS is a PV-EHPS, the PV-EHPS may be located so as to receive sufficient exposure to incident light of a suitable wavelength, whether natural or artificial. With consideration of the teachings herein, one skilled in the art will be able to select a suitable location for a PV-EHPS.

Figure 9:
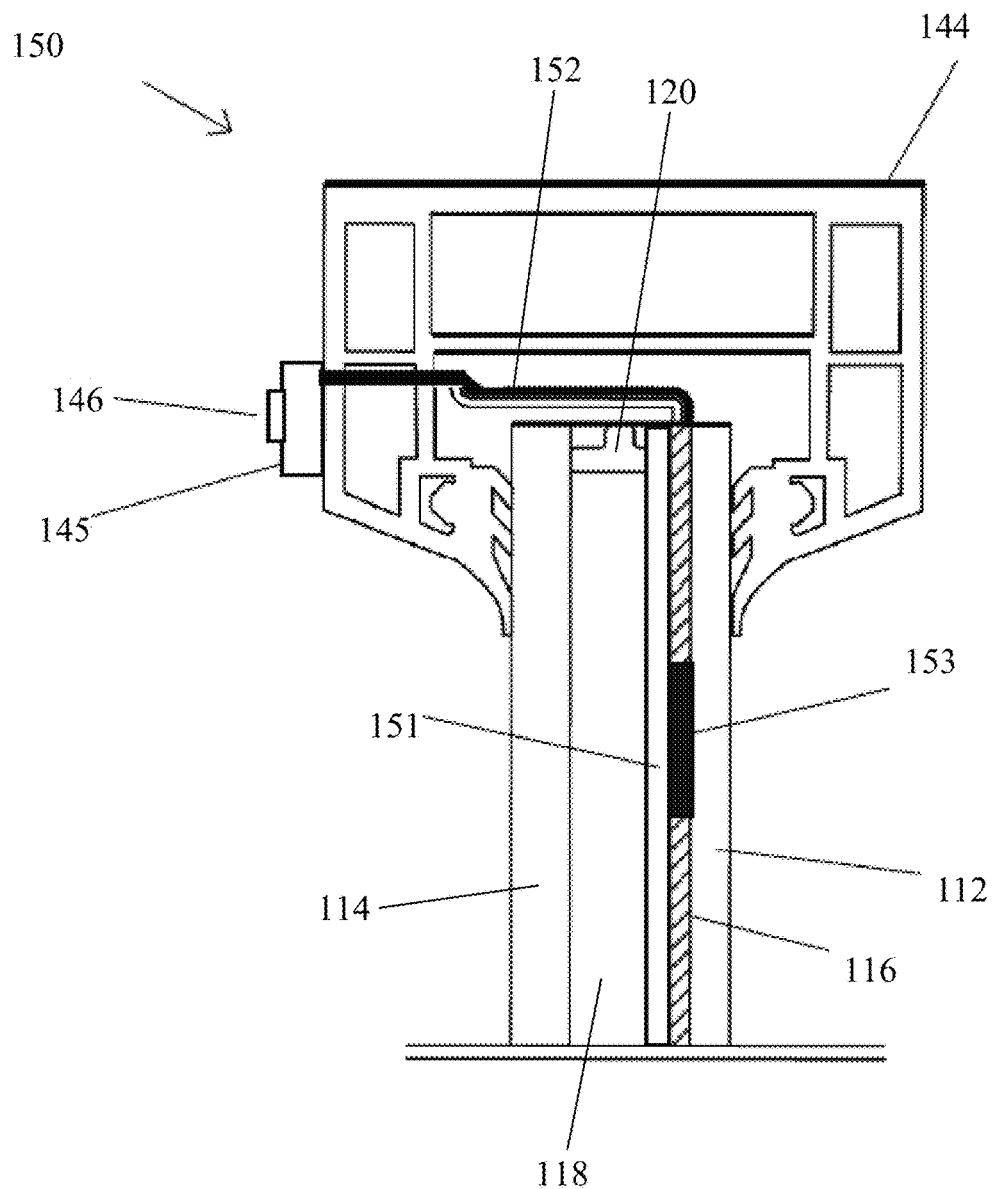
FIG. 9 illustrates a partial cross-section of a self-powered window, in accordance with another embodiment of the present invention.

Referring to FIG. 9, a partial cross-section of a variable transmittance window according to another embodiment is shown generally at 150. The illustrated window is an IGU comprising a frame 144, first pane 112, second pane 114, variable transmittance optical filter 116 between the first pane 112, and a third pane 151. Spacer 120 separates the second pane 114 from the third pane 151, describing gap 118. Other components of an IGU are omitted for ease of illustration and clarity, but will be understood by one skilled in the art to be present. Examples of suitable materials for interlayers in this and other embodiments include PVB (poly-vinyl-butaryl), EVA (ethyl-vinyl-acetate), TPU (thermoplastic polyurethane), pressure sensitive adhesives (PSA) or the like. In embodiments illustrated in FIG. 9 and FIG. 10, the variable transmittance layer may comprise a cutaway region to accommodate EHPS 153 between panes 112, 151. In an alternate embodiment, panes 112, 151 may be substrates, each comprising a conductive layer and accommodate a switching material therebetween—the panes and switching material together comprise an optical filter, with connectors configured to apply a voltage to the switching material. Wires 152 connect the EPHS to control system components 145 comprising push-button 146. Other connectors (not shown) provide electrical connection between the EPHS, the variable transmittance layer and other components as may be appropriate. The control system 145 comprises control electronics; in other embodiments, components of the electrical system may be located elsewhere. Operation of the push-button 146 operates a switch in the control electronics, causing appropriate voltage and/or current to be applied to the electrodes of the optical filter, effecting fading of the optical filter. In some embodiments, operation of the switch may also initiate a timer, to limit the amount of time the voltage and/or current is applied to the optical filter.

Figure 10:
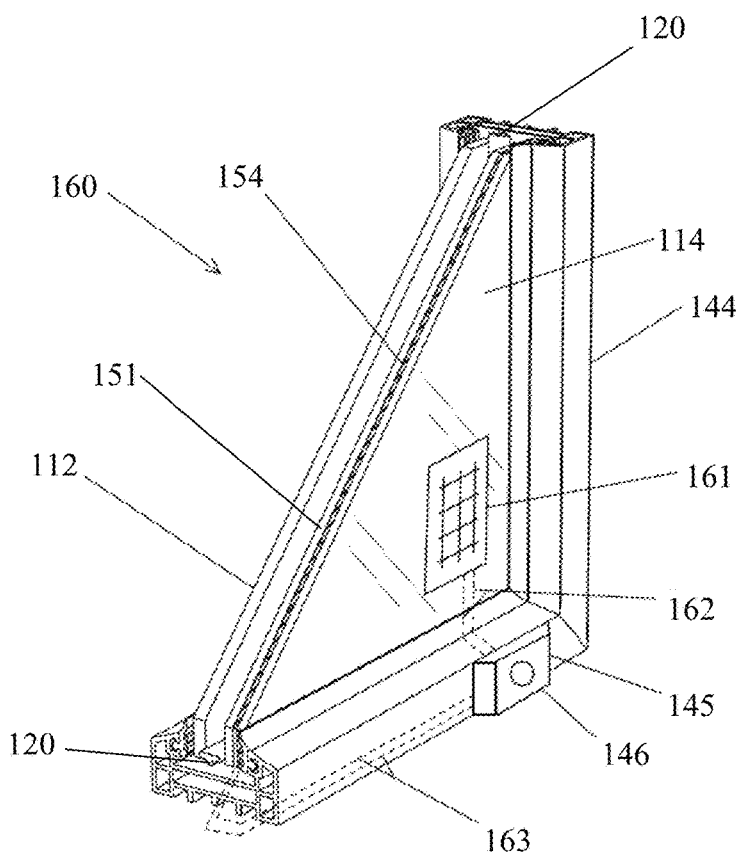
FIG. 10 illustrates a portion of a self-powered window, in accordance with another embodiment of the present invention.

Referring to FIG. 10, a perspective sectional view of a self-powered variable transmittance window is shown generally at 160. The illustrated window is an IGU comprising a frame 144, first pane 112, second pane 114, variable transmittance optical filter 116 between second pane 114 and third pane 151. Spacers 120, gap 118 are indicated; other components of an IGU are omitted for ease of illustration and clarity, but will be understood by one skilled in the art to be present. In some embodiments, variable transmittance optical filter 116 may be laminated between first pane 112 and third pane 151 with optically clear interlayers. The device further comprises an energy-harvesting power source 161. In the illustrated embodiment the PV-EHPS is affixed to a portion of a surface of the IGU. An electrical system for electrically connecting the electrodes of the variable transmittance layer with the EHPS and controls may comprise connectors 162 (between the EHPS and controls) and connectors 163 between the controls and electrodes of the variable transmittance optical filter 116. Routing of conductors is for illustrative purposes only, other configurations may be preferred or necessitated by design of the window, frame and/or installation site of the window. Control system 145 is mounted on a portion of frame 144, however it will be apparent to those skilled in the art that other locations are possible. Control system 145 comprises a push button 146 which may be activated by a user to initiate a transition of the switching material from a dark state to a light state. In other embodiments, control system 145 may be replaced or supplemented with distributed components; in other embodiments, the control may further comprise automated control components, sensors, additional user controls, displays or the like.

As will be apparent to those skilled in the art, upon consideration of the teachings herein, an EHPS may alternately, or additionally, be disposed on any of surfaces #1, #2, #3, or #4 or additional surfaces of an IGU having more than two panes, and/or the frame of the window. In further embodiments (not illustrated), the EHPS may be configured for attachment to a wall or surface adjacent to the window, and connected to the electrical system, the optical filter and other components of the electrical system by connectors.

Gaps 118, 133 and/or 135 may be filled with a gas such as air, argon, krypton, nitrogen or other gas, or may be evacuated (e.g. vacuum insulated glass, evacuated glazing), as is known to be used in an IGU.

There is further provide methods of making a variable transmittance IGU. In one embodiment, a method of making a variable transmittance IGU comprises the steps of: a) providing a first pane having a variable transmittance optical filter laminated thereto; b) providing a second pane; c) attaching the first pane to the second pane via a perimeter seal, thereby defining a sealed space between the first and the second pane; and optionally d) establishing a vacuum within the space or filling the sealed space with a gas. The first pane may be attached to the second pane placing the VTO filter in contact with the sealed space. In another embodiment, the first pane may be attached to the second pane placing the VTO filter not in contact with the sealed space. Optionally, the step a) may further comprise a step of laminating a pane (a third pane) to the VTO filter, forming a sandwich structure. The method may further comprise a step of mounting the attached first and second panes in a frame, the frame configured to facilitate installation of the variable transmittance window into a building. Optionally, for any or all of steps a) and b), the first and/or second pane may comprise a coating. Optionally, any or all of steps a) and b) may further comprise a step of applying a coating to a surface of a pane, examples of such coatings include anti-glare coatings, antireflective coatings, IR-reflective coatings, low-e coatings, UV blocking films or UV blocking coatings.

In another embodiment, there is provided an insert window comprising a variable transmittance optical filter. Where the insert window is a single-pane insert window (e.g. not an IGU), a VTO filter may be laminated to surface A (e.g. the surface of the pane facing the exterior of the building when the insert is installed) and/or surface B (e.g. the surface of the pane facing the interior of the building when the insert window is installed) of the panes of the insert window. Where the insert window is itself an IGU, the VTO filter may be laminated to surface #1, #2, #3, or #4 of the insert, as described supra. In a further embodiment, the VTO filter may be laminated between two panes with suitable interlayers (forming a variable transmittance layer), and this variable transmittance layer comprise a pane of the insert window. In another embodiment, the VTO filter, or variable transmittance layer may be suspended in the sealed gap between two panes of an IGU.

Figure 15:
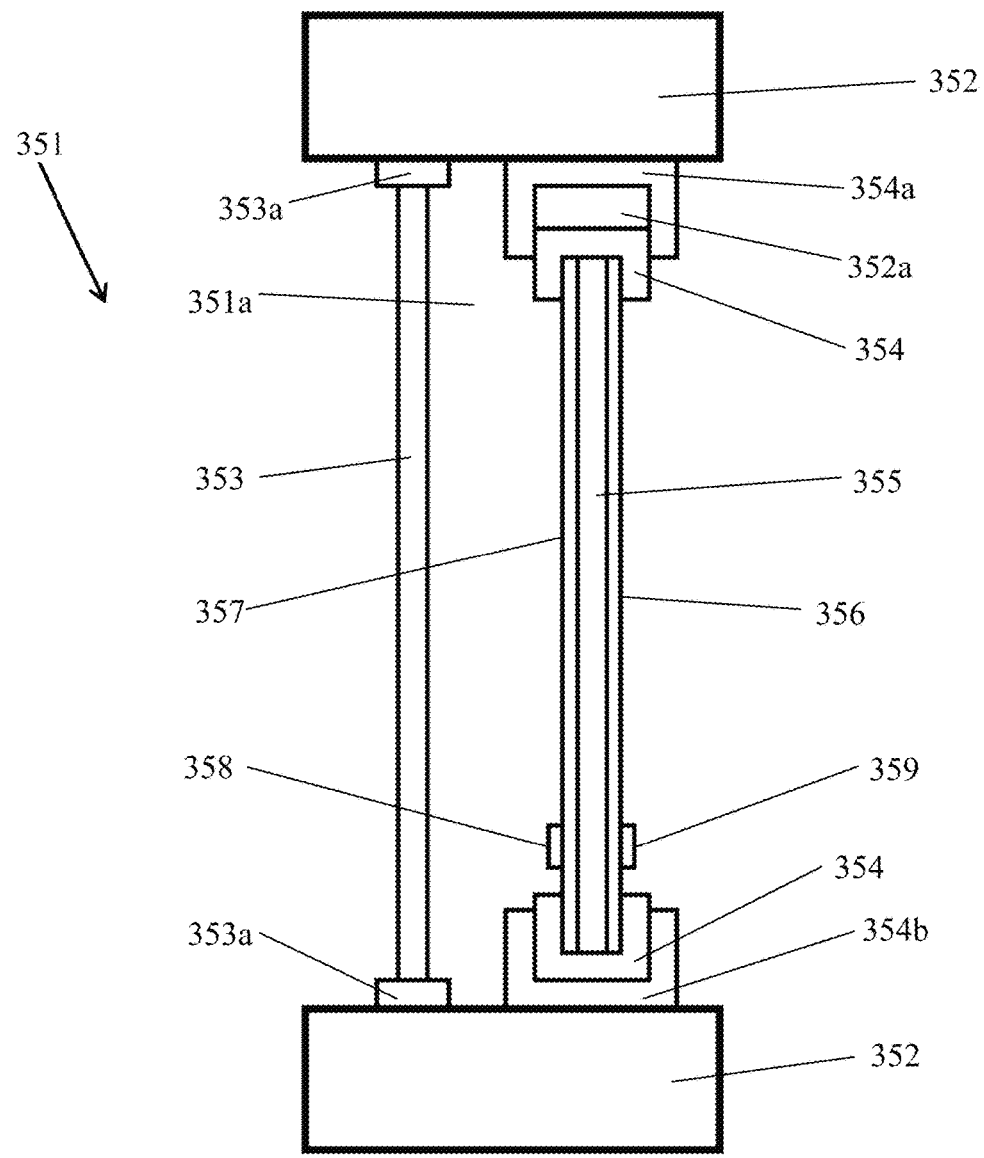
FIG. 15 shows an insert window according to one embodiment of the invention.

Referring to FIG. 15, a schematic cross-sectional diagram of variable transmittance insert window according to some embodiments of the invention is shown generally at 351. The walls 352 of a building define a window opening. A single pane window 353 is located in a window opening defined by walls 352 of a building, and held in place by frame 353*a*. As single pane windows generally have poor insulative or solar heat gain rejection properties, their presence may require a considerable expenditure of energy to heat the building, or keep it cool. An insert window comprising a single pane 355 is installed in the window opening, interior to the single pane window 353. The insert window further comprises a variable transmittance optical filter 357 in the form of a film laminated to surface A of the insert window (e.g. facing the exterior of the building), and a low-emissivity (low-E) coating 356 on surface B of the inset window (e.g. facing the interior of the building). Embodiments where the low-E coating is on surface A of the insert window, and the variable transmittance optical filter is on surface B of the insert window, or where the low-E coating and the variable transmittance optical filter are both on surface A or surface B are also contemplated, and may be constructed and operated according to methods described herein. Original single pane window 353 and insert window 355 have a gap 351*a* therebetween. In the embodiment shown, the gap may or may not be a sealed gap, but can provide an insulating layer of air between the windows. The illustrated insert window further comprises a power source 358 and control system 359 that form part of an electrical system. The electrical system receives power from the power source 358 for application to the window (in an automated manner, and/or in response to an input received by the control system), and for operation of other components of the electrical system, as described herein. Operation of the variable transmittance insert window is described herein. In some embodiments, the power source is an energy harvesting power source, such as a photovoltaic power source. In some embodiments, the variable transmittance window may be electrically connected to the building's power system, to provide power to operate the window. The insert window is mounted in frame 354, and the framed insert window is in turn slidably mounted in track 354*a*. The lower portion of frame 354 is seated in the bottom portion of track 354*a*, while there is a gap 352*a* between the upper portion of frame 354 and the upper portion of track 354*a*. Track 354*a* is configured to allow a close fit with frame 354 while allowing lateral sliding of the insert window, and vertical movement of the insert window to facilitate removal of the framed insert window if desired. Gap 352*a* accommodates manual removal of the framed insert window to by lifting upward and angling out the bottom portion of the framed insert window. Alternatively, frame 354 could be attached directly to the window opening defined by the building walls 352. The variable transmittance optical filter (for this embodiment it may be a film) 357 can be attached to glass 355 using a pressure sensitive adhesive (PSA) or the like.

A low-E coating increases the energy efficiency of the insert window by reducing the heat absorbed by the glass 355 from the inside of the building and by reducing the emission of heat from the glass 355 to the building when the glass 355 is hotter than the inside of the building. Hard coat low-E coatings, typically applied using a pyrolytic process are known in the art to be more durable than soft-coat low-E coatings and more tolerant of contact or abrasion. An example of a glass 355 with a hard-coat low-E coating that can be used is Sungate 500 made by PPG.

Figure 16:
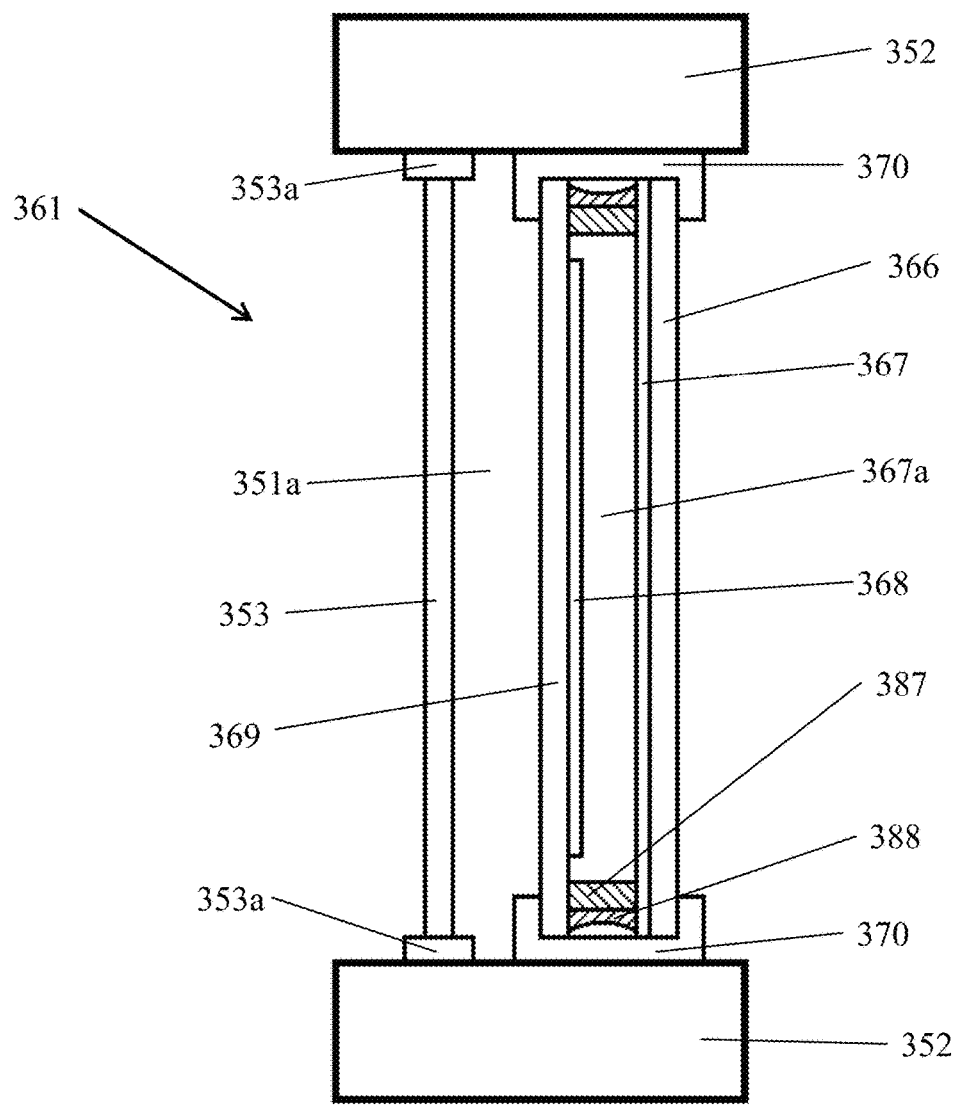
FIG. 16 shows an insert window according to another embodiment of the invention.

Referring to FIG. 16, a schematic cross-sectional diagram of an insert window according to another embodiment is shown generally at 361. Walls 352 of a building define a window opening. A single pane window 353 is located in a window opening defined by walls 352 of a building, and held in place by frame 353*a*. A double-pane insert window is installed in the window opening. In some embodiments the double-pane window is an IGU. The IGU comprises a first pane 369 and a second pane 366, the first and second panes separated along their periphery by spacer 387, and sealed by seal 388. A gap 367*a* may be filled with air or another gas, or may be a vacuum. The IGU of the illustrated embodiment further comprises a variable transmittance optical filter 368 in the form of a film applied to surface #2 of the first pane, and a low-E coating 367 on surface #3 of the second pane of the IGU. The variable transmittance optical film 368 can be applied using a pressure sensitive adhesive. The IGU is mounted in frame 370, attached to building walls 362. Original single pane window 353 and the insert window 355 describe a gap 351*a* therebetween. The illustrated insert window may further comprise a power source and control system, and an electrical system (not shown). The electrical system receives power from the power source for application to the window (in an automated manner, and/or in response to an input received by the control system), and for operation of other components of the electrical system, as described herein. Operation of the variable transmittance insert window is described herein. In some embodiments, the power source is an energy harvesting power source, such as a photovoltaic power source. In some embodiments, the variable transmittance window may be electrically connected to the building's power system, to provide power to operate the window.

In alternative embodiments, variable transmittance film 368 can be applied to surface #1, #3, or #4, and low-E coating 367 can be applied to surfaces #1, #2, or #4. In some embodiments, variable transmittance optical filter may be applied to a pane, and a low-E coating subsequently applied to the variable transmittance optical filter. The pane so prepared may subsequently be used in a window, insert window or IGU as described herein.

An advantage of applying the variable transmittance optical film 368 to surface #2 is that any heat absorbed by the variable transmittance optical film 368 (particularly in its dark state) is separated from the inside of the building by insulating air gap 367*a* of the IGU insert window. The low-E coating can be a soft-coat or a hard-coat low-E coating. In some embodiments, a low-E coated glass (e.g. Solarban glass available from PPG) may be used for the second pane 366.

Figure 17:
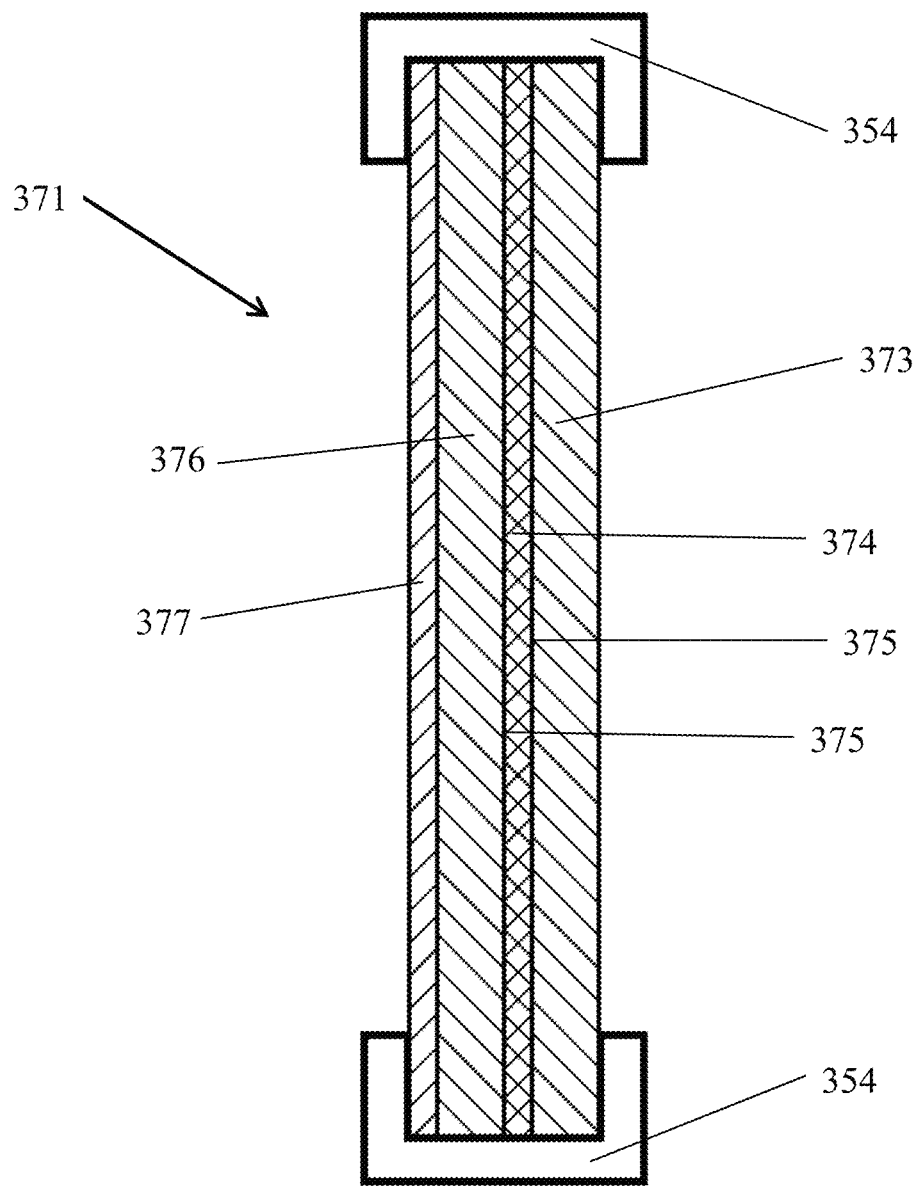
FIG. 17 shows an insert window according to another embodiment of the invention.

Referring to FIG. 17 a schematic cross section of an insert window is shown generally at 371. The 'single pane' insert window formed from laminated glass comprises a variable transmittance optical film 374 laminated between a first pane 376 and a second pane 373 with interlayers 375 between the film and panes 376, 373. Surface A of the insert window (facing the exterior of the building when installed has a low-E coating 377 applied thereto. In alternate embodiments, the low-E coating may be applied to an interior-facing surface of the insert window. The insert window is mounted in frame 354, and the framed insert window may be mounted in a track 354*a* as described.

Figure 18:
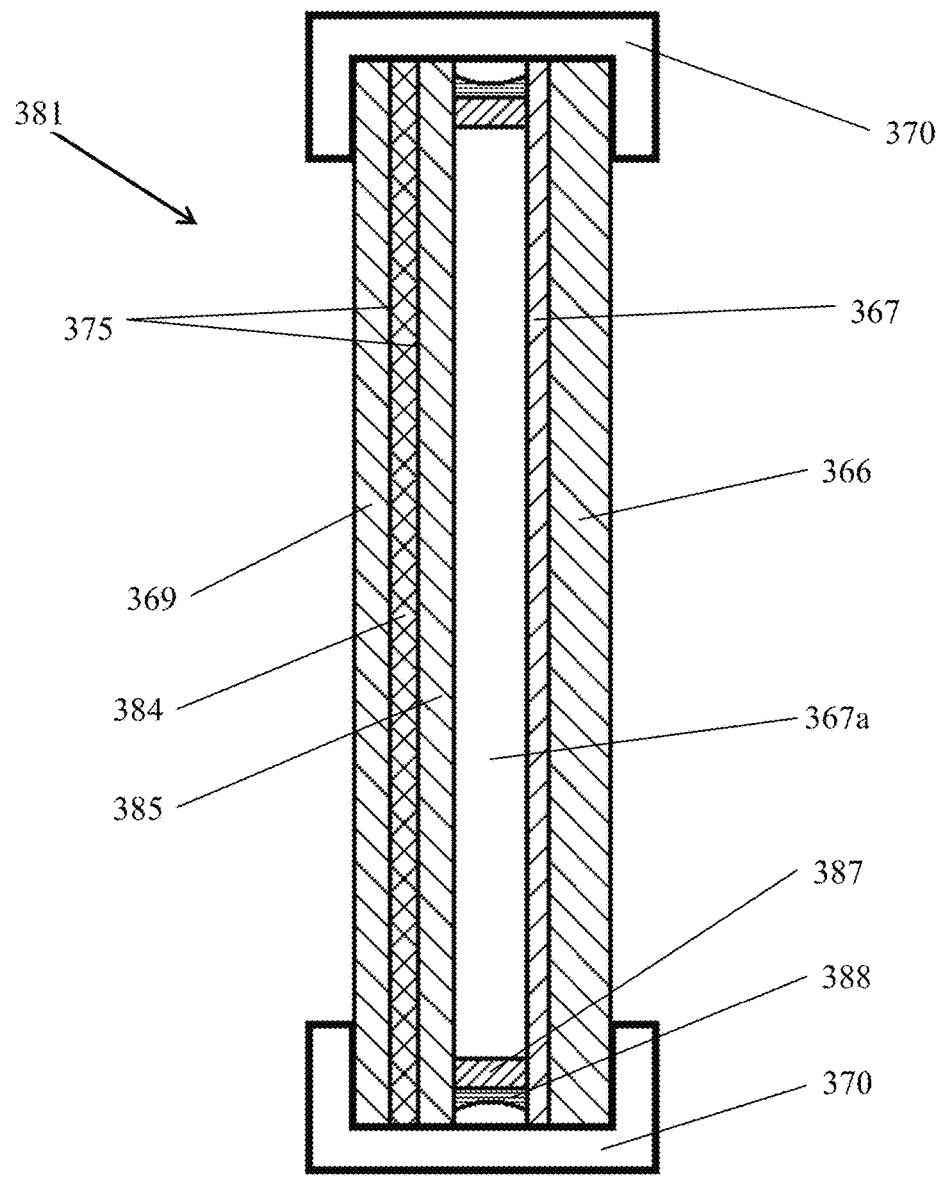
FIG. 18 shows an insert window according to another embodiment of the invention.

Referring to FIG. 18 an insert window according to another embodiment of the window is shown generally at 381 comprising a variable transmittance optical filter 384 laminated between a first pane 383 and a second pane 385 with interlayers 375 as described, and then formed into an IGU by adding a third pane 366 separated from the laminated structure by spacers 387 and sealant 388. The IGU can be mounted into a frame 370 in order to facilitate installation into an existing window frame on the interior side of an existing window. The IGU structure provides excellent insulating properties. If combined with an existing single-pane window, the insulating value (known as the U-value) of the entire window can approach that of triple-glazed windows. In this example, a low-E coating 367 is applied to surface #3 of the IGU. In other embodiments, the low-E coating can be applied on any of the surfaces #1, #2 or #4. Selection of the surface for the low-E coating may depend on the building type and/or geographical location.

Insert windows with variable transmittance optical filters can be used to increase the energy efficiency of a building without replacing the existing glazing. In some cases, as glazings are a part of the building envelope, replacement of existing glazing may not be possible, or practical due to cost, aesthetic reasons and/or regulations—a variable transmittance insert window may overcome one or more of these obstacles, for example, when retrofitting a building for energy efficiency.

In some embodiments, windows according to various embodiments may have the EHPS positioned so that it is exposed to the interior lighting of the building, for example. The EHPS may thus be powered all or in part by the interior lighting.

A myriad of fastening, framing and mounting systems for installation of architectural windows are known in the art, selection of a particular system or method may be dependent on the particulars of the window and the site of installation, such as the configuration of the window opening in the building envelope, construction materials, nature of the window, local building codes or the like. Examples of window fastening, framing and/or mounting systems include those described in US 2011//0063061, describing a magnetic attachment system; US 2011/0078963 describing a press-fit storm window system comprising flexible gaskets for a friction fit of the insert window in the existing window frame; US 2011/0047875 describing a storm window frame comprising clips to lock the frame in place and bulb seals to provide a seal; U.S. Pat. No. 3,837,118 describes a hung window sash system wherein the sashes are installed in a flush track in a window jamb; U.S. Pat. No. 5,806,256 describes a modular glazing system that may be used for removable mounting of insert windows; U.S. Pat. No. 5,649,389 describes an interior storm window assembly for mounting to an interior building wall over a window opening; U.S. Pat. No. 4,370,830 describe a frame for slidable mounting of a window in a wall of a building; U.S. Pat. No. 6,256,931 describes a window retention system comprising a frame and slidable window mounting for use with the window retention system. It is within the ability of one skilled in the art to select a fastening, framing or mounting system suitable for the installation site and/or specific design of window.

Vehicle Windows:

Windows comprising a variable transmittance optical filter ("variable tint windows", "variable transmittance windows") may be used in vehicles (e.g. bus, car, train, plane, boat, ferry or the like) to improve occupant comfort (e.g. reduce glare, mediate brightness, provide privacy, reduce solar heat gain or the like).

In some embodiments, the invention further provides for a self-powered variable transmittance window of a vehicle, and methods of making such windows. The window may be a sunroof, rear, front and/or side window of a vehicle, and may comprise a variable transmittance layer, an energy harvesting power source and electrical system components for operation of the window. The windows may further comprise a frame or gasket and/or other components for installation of the device.

Two or more variable transmittance windows in a vehicle may have the same, or different VLT in light and dark states, and/or same or different contrast ratios. For example, a vehicle may have a sunroof with about 10% VLT in a dark state and about 30% in a light state (~3:1 contrast ratio), while a side or rear window may have about 15% VLT in a dark state and about 60% VLT in a light state (~4:1 contrast ratio). Greater VLT and/or a higher contrast ratio may provide increased visibility. This may be desirable to provide vehicle passengers with a better view outside. Solar heat gain through rear or side windows may be generally less than would occur with a sunroof. For front (windshield) and side-front windows where driver visibility is of greater importance, a variable transmittance window with greater VLT than is used in the rest of the vehicle's windows may be selected. In one embodiment, front side window has a visible light transmittance of 20% in the dark state and 80% in the light state. In some embodiments, a portion of the window of the vehicle may comprise a portion that has variable transmittance. For example a top portion of a front window may comprise a variable transmittance optical filter that darkens with exposure to sunlight, and may be cleared automatically with application of a voltage when a light sensor indicates reduced light outside, or in response to a drivers preference by activation of a switch to initiate application of a voltage. For a vehicle with multiple variable transmittance windows, each window may be independently controlled, or the multiple windows may be simultaneously controlled as a group via a control system.

The substrate for a variable transmittance window for a vehicle (e.g. "automotive window") may be tempered automotive glass, polycarbonate, acrylic or the like. A variable transmittance window for a vehicle may comprise first and second substrates and a variable transmittance optical filter as illustrated generally in FIG. 1, the variable transmittance optical filter comprising a switching material as described herein. The variable transmittance window may further comprise a power source, such as an energy harvesting power source, and an electrical system configured to receive power from the power source and to provide a voltage to a first electrode and a second electrode of the variable transmittance optical filter. The variable transmittance window may further comprise a frame, such as a generally C-shaped gasket surrounding the periphery of the window. Electrical system and power sources, including energy harvesting power sources as described herein may be used in the variable transmittance window. A variable transmittance optical filter may be laminated to one side of the window using an adhesive, such as 8172 PCL, as described herein. Alternately, a variable transmittance optical filter may be laminated between two substrates with interlayers, as described above.

The variable transmittance window may automatically darken when exposed to light comprising wavelengths of about 350 to about 420 nm (e.g. for embodiment where the switching material is a hybrid P/E switching material). Activation of a switch (e.g. by control electronics or by a user) applies power from the power source to the first and second electrodes of the variable transmittance window and fades the window.

Opthalmic Devices:

The invention further provides for a self-powered variable transmittance ophthalmic device, and methods of making such a device. Variable transmittance ophthalmic devices are configured to darken when exposed to a light source, and lighten when a voltage is applied to the optical filter of the device. Opthalmic devices according to various embodiments of the invention comprise an energy-harvesting power source, and a lens, the lens comprising an optical filter as described herein. The lens may be a prescription lens. Where the optical filter is a film, the film may be applied to the lens. Examples of opthalmic devices include sunglasses, glasses, sports eyewear such as goggles or cycling glasses, safety eyewear, visors, shields or the like; prescription or otherwise that may be used to aid or protect a user's vision, mediate brightness, reduce glare, reduce eyestrain, and/or protect a users' eyes from UV or IR light. In some embodiments a variable transmittance opthalmic device may further comprise a UV and/or an IR blocking component, layer or film. The UV and/or IR blocking component may be located on the 'inside' of the lens (e.g. the surface closest to a user's eye, or between the light source and the user's eye) to block UV light reaching a user's eye without interfering with the UV light induced photochromism of the variable transmittance optical filter; alternately, the UV blocking component may be located on the 'outside' of the lens (surface farthest away from the user's eye) to reduce or block the UV light reaching a user's eye, and also block the amount of UV light available to induce photochromism of the variable transmittance optical filter. For a lens having a curved surface, the concave surface may be the 'inside'; UV/IR blocking components may be on the concave surface. The variable transmittance optical filter may be on the inside or outside of the lens. An energy harvesting power source may be incorporated into the ophthalmic device, for example as part of a lens, attached to the frame or other component of the optical device, or operatively coupled to the ophthalmic device by a wire and worn on a piece of clothing, for example.

Figure 11:
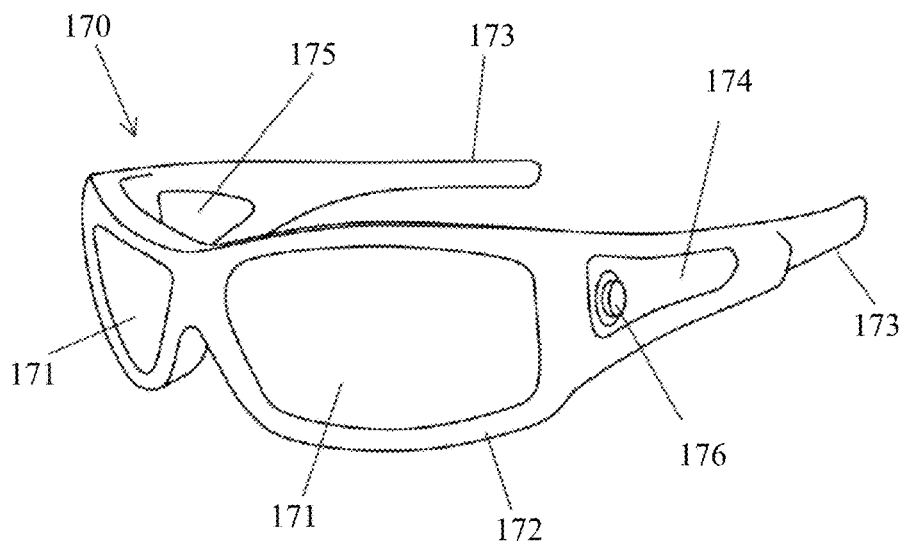
FIG. 11 is a general view of an ophthalmic device according to an embodiment of the present invention.

Referring to FIG. 11, an opthalmic device according to one embodiment of the invention is shown generally at 170. The device comprises variable transmittance lenses 171 positioned in front of the eyes, with frame 172 and arms 173. Incorporated into the frame are an EHPS 174 and a button 176 for activation by a user. Control unit 175 on the opposite side of an EHPS and switch comprises additional components of the electrical system for operation of the device. In the embodiment shown, the EHPS is on the outside of each of the arms 173, with the control unit on the inside of the arms 173. The lens darkens automatically when exposed to light, when a light state is desired by a user, button 176 is actuated by the user and a voltage is applied to the lens 171, and the lens switches from a dark state to a light state, allowing for an increase in VLT. Frame 172 may be made of any suitable material, for example metal or plastic, or a combination thereof. The lens may be made of any suitable transparent material, for example, glass or polymer; examples of polymers include plastics, acrylic, polycarbonate or the like.

The optical filter of the invention can be incorporated into ophthalmic devices in a variety of ways. In one embodiment, the optical filter itself is made into the variable transmittance lens. In another embodiment, the optical filter is attached to the lens of an ophthalmic device.

Operation

To control the operation of the variable transmittance optical filter of embodiments of the present invention, the filter is controllably coupled to a power source by a control circuit of the electrical system as described herein. The coupling facilitates establishing a suitable potential difference (voltage) between the electrodes of the optical filter and providing a sufficient current to the electrodes for establishing a desired electric field therebetween. A single variable transmittance window can be connected to one control circuit, or multiple variable transmittance windows can be connected to a single control circuit. Control electronics (control circuits, or control circuitry) incorporated into the electrical system allow harvesting, storage and/or use of the harvested power to be controlled. Control may be automated, semi-automated, or manual (user-controlled). A control system may further include electronic circuitry to apply an alternating waveform to the VTO filter of the device, instead of a constant DC voltage.

Control electronics can also include electronic circuitry to apply a pulsed or alternating waveform to the optical filter instead of a constant DC voltage. The waveform can be in the form of a square wave, a sawtooth wave, a sinusoidal wave, or some other waveform. The amplitude of the wave can vary. In one embodiment, a square wave can be applied to the electrodes of the optical filter by control electronics. The square wave can range from amplitude of about −2 Volts to about +2 Volts. When one of the electrodes is at 2 Volts, the other transparent electrode is at 0 Volts. In one embodiment, the waveform varies from 0 to a positive voltage at one electrode and the other electrode varies from 0 to a corresponding negative voltage. In another embodiment, the waveform varies from about 0 to about 2 Volts at one electrode and from about 0 to about −2 Volts at the other electrode. Applying the voltage to the electrodes as a square wave may reduce the lightening time and/or increase the cycle life of the optical filter. In one embodiment, the frequency of the waveform is 100 Hz. In a further embodiment of the invention, waveform frequencies range between about 0.1 Hz to about 1,000 Hz. In another embodiment, waveform frequencies range between about 0.001 Hz to about 100 KHz.

Figure 12:
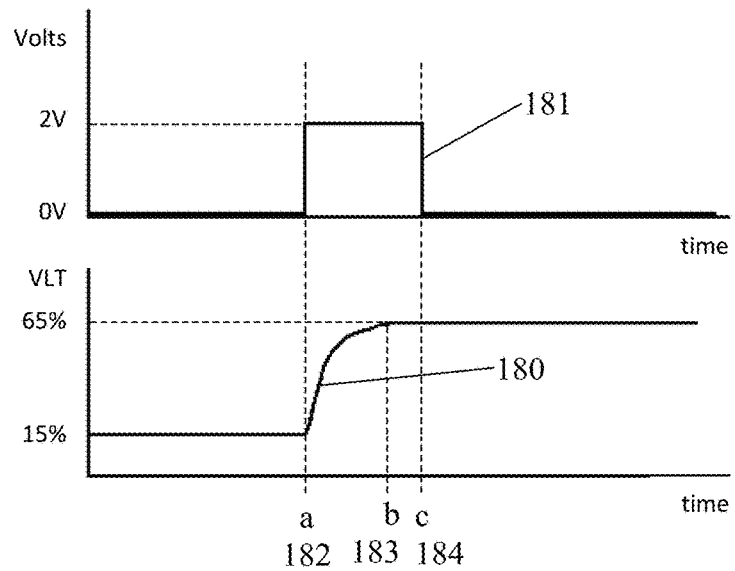
FIG. 12 illustrates the response of a hybrid photochromic/electrochromic optical filter to application of voltage, in accordance with embodiments of the present invention.

A voltage converter, timer and/or a voltage regulator may also be included. Timer circuits may be implemented by relays or other digital or analog circuitry, as understood in the art. FIG. 12 graphically illustrates the response of a hybrid P/E optical filter to an application of voltage at the electrodes operatively coupled thereto The line 180 illustrates the % VLT exhibited by the optical filter of the device over time; line 181 represents the voltage difference between first and second electrodes. Before time a 312, the optical filter is in a dark state (~15% VLT for this embodiment), and there is substantially no voltage difference at the electrodes. At time a 182, a voltage is applied to the electrodes, providing a voltage therebetween (~2 V for this embodiment), and the electrochromic fading of the switching material proceed, reducing the % VLT over time interval a-b, reaching a faded state (~65% for this embodiment) at time b 183. The voltage applied to the electrodes is reduced to substantially zero after the faded state is reached at a time after time b, or about time c 184. In the absence of further stimulus (UV light), the device remains in the faded state. Thus, to transition the optical filter to a light state, the electrodes need to be driven between time a 182 and at least time b 183, but may not require constantly applied voltage at other times to maintain the light state.

User-control of a variable transmittance device (window, lens or the like, such as exemplified herein) may be effected by a user-activated switch or function, via a button, touchpad or the like, such as those exemplified herein. When exposed to UV light (e.g. natural sunlight, or some interior light sources), the device achieves a dark state. To transition to a faded state, the switch (e.g. a "CLEAR" switch or "CLEAR" function) is activated and a voltage is applied to the device for a predetermined period of time. The period of time may be controlled by a timer, and determined empirically based on incident light, device construction and/or formulation (e.g. faster or slower switching time, presence or absence of UV blocking films, thickness of the switching material or the like), and may be from about 10 seconds to about 5 minutes, or any amount or range therebetween. When the predetermined amount of time has elapsed, the switch is reversed and voltage application to the device stopped. If the device is no longer exposed to UV light, it will remain in the faded state. If the device is exposed to UV light, the photochromic darkening reaction will occur and the window will return to the dark state, until or unless additional voltage is applied to the device.

In some embodiments, the optical filter will begin to darken again when exposed to UV light, thus may transition from light to dark over time in absence of applied voltage. If it is desired that the device be maintained in a faded state, while subject to UV from incident light, voltage may be applied to the device over a prolonged period of time. In some embodiments, a second switch or function (e.g. a "HOLD" switch or a "HOLD" function) may be provided for user operation in this manner. Activation of the switch or function causes a voltage to be applied continuously to the device until the application is stopped, e.g. by a second pressing of the switch or cancelling of the HOLD function.

The optical filter may be maintained at an intermediate VLT state or range (e.g. between first and second intermediate % VLTs, the first intermediate % VLT less than the %

VLT of the fully dark state, and the second intermediate % VLT is greater than the % VLT of the fully faded state, and less than the first intermediate % VLT) by application of voltage during the auto-darkening of the variable transmittance optical filter (in response to incident light). The first and second intermediate % VLT may be predetermined (e.g. programmed into a control system), or may be set by a user, for example by a potentiostat or multi-position switch. Alternately, an intermediate state may be achieved by interrupting or disconnecting the electric voltage during the fading process. For example, a user may control the VLT by controlling the electric field applied to the filter. The intermittent application of voltage may be initiated and terminated by a user (e.g. by operation of a switch); alternatively, application of voltage may be fully or partially automated, and the application of voltage initiated and/or terminated by control electronics of the system. The voltage may be applied to a filter intermittently that is in the process of darkening.

Additionally, the control electronics may comprise an LED or other indicator light(s) to indicate the status of voltage application to the device (off or on). Other control schemes can be used to provide input for the power control electronics, and different types and numbers of switches and buttons can also be used. In a further embodiment, the one or more buttons are replaced with a three position knob.

Preparation of Self-Powered Variable Transmittance Optical Devices.

The present invention provides, in part, methods of preparing self-powered variable transmittance optical devices, and methods of preparing films for use in such devices.

A method for preparing a self-powered variable transmittance device according to some embodiments of the invention comprises the steps of a) providing a first transparent substrate, b) disposing a layer of switching material on the substrate, c) providing an energy harvesting power source and d) providing an electrical system for coupling the energy-harvesting power source to the switching material. The method may further comprise, following any one of steps b), c) or d) a step of applying to the layer of switching material a second substrate, thereby forming a 'sandwich' of a layer of switching material between first and second substrates.

In another embodiment of the invention, a method for preparing a self-powered variable transmittance device according to some embodiments of the invention comprises the steps of a) providing a first transparent substrate with a conductive layer disposed thereon, b) disposing a layer of switching material on the conductive layer of the substrate, c) providing an energy harvesting power source and d) providing an electrical system for coupling the energy-harvesting power source to the switching material. The method may further comprise, following any one of steps b), c) or d) a step of applying to the layer of switching material a second substrate with a conductive layer disposed thereon, thereby forming a 'sandwich' of a layer of switching material between conductive layers of the first and second substrates. In some embodiments, the first conductive layer may be applied and/or etched so as to provide two or more electrically separated electrodes.

Variable transmittance optical filters used in devices may be prepared according to methods known in the art. For example, roll-to-roll processing methods may be used for making a variable transmittance optical filter. Roll-to-roll methods may be particularly suited to the preparation of flexible variable transmittance optical filters in the form of films. Such methods generally comprise the steps of a) providing a first flexible substantially transparent substrate comprising a first conductive layer (a first electrode), b) disposing a layer of switching material on the conductive layer of the first substrate, c) providing a second, flexible substantially transparent substrate comprising a second conductive layer (a second electrode) and laminating the second substrate to the switching material, the switching material contacting the first and second electrodes over substantially all of the area of the switching material, d) providing an energy harvesting power source and an electrical system comprising connectors for connection of the energy harvesting power source to the first and second electrodes.

The method may further comprise after step d), a step of applying the optical filter to a lens of an optical device, or a pane of a window. The method may further comprise after step d) a step of affixing the energy harvesting power source to a substrate of the optical filter. The step of applying the optical filter to a lens or pane may comprise application of an adhesive (e.g. PSA, PVB, EVA, TPU or the like) to the lens or pane, and/or the optical filter.

Methods in accordance with some aspects of the invention generally comprise disposing a layer of switching material on a first substantially transparent substrate, and optionally between the first substrate and a second substantially transparent substrate, the switching material capable of transitioning between a light state and a dark state based at least in part on application of an electric voltage. For example, the switching material may be capable of transitioning from a light state to a dark state on exposure to UV radiation and from a dark state to a light state with application of an electric voltage. A first and second electrode may be provided such that the switching material is substantially in contact with the first and second electrodes. In some embodiments, the electrodes are disposed on the surface of at least one of the substrates. In some embodiments, the electrodes may be disposed on a surface of the switching material itself. The methods further comprise providing an energy harvesting power source. In some aspects the power source is a photovoltaic EHPS The methods further comprise providing an electrical system configured to receive power from the energy harvesting power source and to provide power to the first electrode and the second electrode for application of the electric voltage through the first and second electrodes, thereby electrically connecting the first electrode and the second electrode to the energy harvesting power source.

A method in accordance with other aspects of the present invention comprise disposing a layer of switching material on a first substantially transparent and flexible substrate and optionally between the first substrate a second substantially transparent and flexible substrate. The switching material capable of transitioning between a light state and a dark state based at least in part on application of an electric voltage. For example, the switching material may be capable of transitioning from a light state to a dark state on exposure to UV radiation and from a dark state to a light state with application of an electric voltage. A first electrode and a second electrode are flexibly disposed on the surface of at least one of the substrates such that the switching material is proximate with the first and second electrodes. The method further comprises disposing a flexible energy-harvesting power source on the device film, such as a photovoltaic energy harvesting other power source. The method further comprises disposing a flexible electrical system on the device film. The electrical system is configured to receive power from the energy-harvesting power source and to provide power to the first electrode and the second electrode for application of the electric voltage through the first and second electrodes, thereby electrically connecting the first electrode and the second electrode to the energy-harvesting power source. In some embodiments, the electrical system may comprise an energy storage component, such as a battery, capacitor or super capacitor, or array of batteries, capacitors or super capacitors, disposed on the device film. The energy storage component may be flexible, inflexible, or it may be an array of flexibly interconnected but substantially small sub-components. The method may comprise forming each component of a flexible self-powered variable transmittance optical device film on one or more layers of thin, flexible material. Multiple such layers may then be laminated together to form the completed optical device film.

In accordance with another embodiment of the invention, there is provided a method of making a variable transmittance window pane, the method comprising: providing a transparent window pane, applying a variable transmittance optical filter to a surface of the pane, providing a power source electrically connected to the electrodes of the variable transmittance optical filter, and providing an electrical system configured to receive power from the power source and to provide a voltage to the electrodes of the variable transmittance optical filter.

In accordance with another embodiment of the invention, there is provided a method of making a variable transmittance window pane, the method comprising providing first and second transparent panes and laminating a variable transmittance optical filter between the first and second panes with interlayers, providing a power source electrically connected to the electrodes of the variable transmittance optical filter, and providing an electrical system configured to receive power from the power source and to provide a voltage to the electrodes of the variable transmittance optical filter.

The variable transmittance window pane may be an architectural window such as an insert window, or may be used as a first or second pane in an IGU. The variable transmittance window pane may be a vehicle window, such as a sunroof, windshield, rear or side windows of a car.

The vehicle window may be installed in a vehicle during production (e.g. as part of the processes of an assembly line), or may be installed after-market. Therefore, embodiments of the invention further provide for a vehicle comprising a device according to various embodiments of the invention; in some embodiments, the device is a vehicle window.

The architectural window may be installed in a building during construction, or may be installed after-market (e.g. retrofitting). Therefore, embodiments of the invention further provide for a building comprising a device according to various embodiments of the invention, in some embodiments the device is an architectural window.

The variable transmittance window pane may comprise part of an IGU. The variable transmittance pane may be assembled into an IGU during manufacture (e.g. on a production line of a glazing factory), or may be installed after the IGU is assembled. Therefore, embodiments of the invention further provide for an IGU comprising a device according to various embodiments of the invention; in some embodiments, the device is a variable transmittance window pane.

In some embodiments, the variable transmittance insert window may be installed after construction (retrofitting), by a consumer. The variable transmittance insert window according to various embodiments of the invention may comprise a portion of a kit, along with instructions for its installation and/or operation. Therefore, embodiments of the invention further provide for a kit comprising a variable transmittance insert window. The kit may further comprise mounting hardware, framing hardware, attachment hardware or the like to aid in installation of the insert window. Various types of hardware for such purposes will be known in the art.

The variable transmittance optical filters described in the following examples have been prepared with hybrid photochromic/electrochromic switching materials and have been included to demonstrate general properties of the hybrid photochromic/electrochromic switching materials in the format of an optical filter. It will be understood that the following examples are intended to illustrate some embodiments of the invention and are not intended to limit the invention in any way.

Example 1: Preparation of Selected Hybrid P/E Compounds

S001 and S002 were prepared as described in U.S. Pat. No. 7,777,055

Synthesis of S042—

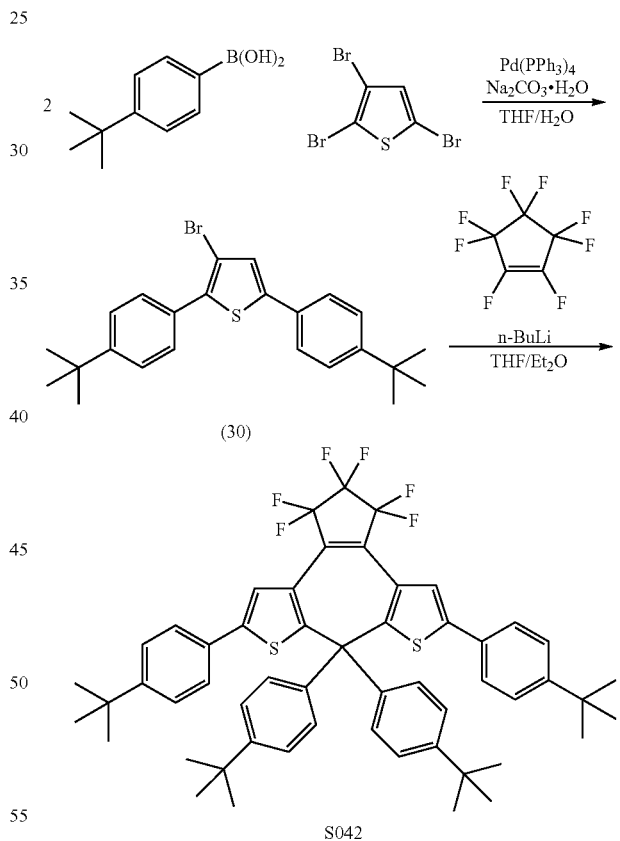

Synthesis of 3-bromo-2,5-bis(4-(tert-butyl)phenyl) thiophene: (30)

Sodium carbonate monohydrate (58.0 g, 468 mmol) was dissolved in water (500 mL) and a solution of 4-(tert-butyl)-phenylboronic acid (40.0 g) and 2,3,5-tribromothiophene (30.0 g, 94 mmol) in THF (500 mL) was added, and deoxygenated by bubbling with argon. Pd(PPh$_3$)$_4$ (5.0 g, 4.30 mmol) was added and the mixture refluxed for 24 h.

The mixture was cooled and the aqueous phase separated and extracted with EtOAc. Organic fractions were combined washed with water (500 mL) and dried over MgSO₄. The solvent was evaporated and the crude product washed in MeOH, filtered and dried overnight to afford a light yellow, powdery solid (35.46 g, 89%).

Synthesis of S042

(3,3'-(perfluorocyclopent-1-ene-1,2-diyl)bis(2,5-bis(4-(tert-butyl)phenyl)thiophene): A solution of (30) in anhydrous THF/ether cooled to −45° C. and treated with nBu-Li_(2.5 M in hexanes, 35 mL, 87 mmol) dropwise under a n argon atmosphere. The reaction mixture was stirred for a further 15 minutes followed by addition of octafluorocyclopentene (5.6 mL, 41.5 mmol) using a cooled gas tight syringe. The reaction was allowed to stir until the temperature reached −10° C., quenched by the addition of 10% HCl (50 mL). The aqueous layer was separated and extracted with ether. The organic phases were separated and pooled, dried over MgSO₄, filtered and solvent removed by rotary evaporation. The crude product was stirred in MeOH for 3 hours, and the resulting precipitate filtered, dried and purified using flash chromatography (hexanes), affording 2 fractions—F1 was pure S006 (TLC), F2 contained S006 along with a fluorescent byproduct by TLC. F1, 5.35 g, 14.8%) and F2, 10.4 g (~75% pure, 22%) as light yellow, powdery solids. $^1$H NMR (400 MHz, CDCl₃) δ 7.37 (d, J=8.5 Hz, 4H), 7.30 (d, J=8.5 Hz, 4H), 7.05 (d, J=8.4 Hz, 4H), 6.92 (d, J=8.4 Hz, 4H), 6.13 (s, 2H), 1.34 (s, 18H), 0.91 (s, 18H).

Synthesis of S054—3,3'-(perfluorocyclopent-1-ene-1,2-diyl)bis(2,5-bis(4-methoxyphenyl)thiophene)

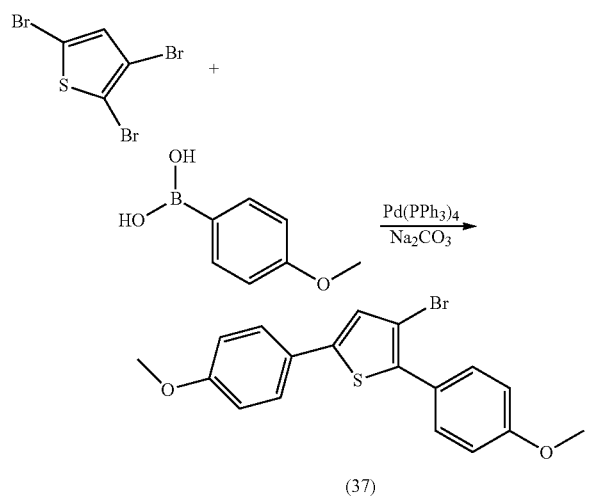

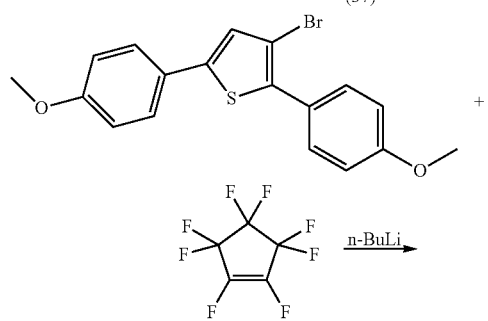

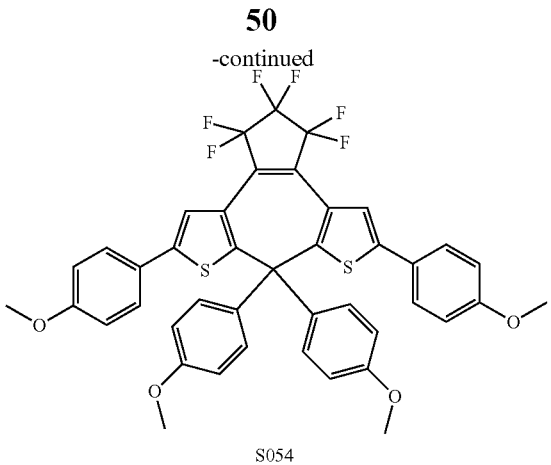

S054

Synthesis of 3-bromo-2,5-bis(4-methoxyphenyl)thiophene (37)

2,3,5-Tribromothiophene (6.42 g, 20 mmol), 4-methoxyphenylboronic acid (6.38 g, 42 mmol) and sodium carbonate (8.5 g, 80 mmol) were stirred in THF/water mixture (125/50 ml) for 90 min at RT under argon flushing. Pd(PPh₃)₄ (693 mg, 0.6 mmol) was added. The mixture was refluxed for 16 h (TLC), cooled to RT and THF was removed by evaporation. Water was added and aqueous fractions extracted with EtOAc. The organic fractions were combined, solvent removed and the crude product purified by flash chromatography (Silica gel; hexane/chloroform/EtOAc; gradient up to 20% chloroform then 20% EtOAc) to yield 3-bromo-2, 5-bis(4-methoxyphenyl)thiophene (4.9 g, 13 mmol, 65%).

Synthesis of S054: Compound (37)

(10.64 g; 28.4 mmol) was dissolved in anhydrous ether (350 mL) and cooled to −25° C. n-BuLi (14.2 mL; 35.5 mmol; 2.5 M in hexane) was added. The mixture was stirred at this temperature for 0.5 h. Octafluorocyclopentene (1.9 mL; 14.2 mmol) was added in two portions, and the reaction was allowed to warm slowly over 3 h. The reaction was quenched by addition of 10% aqueous HCl (50 mL). Organic layer was separated and the aqueous was extracted with EtOAc (250 mL). Solvent from the combined organic extracts was evaporated and crude material was purified by column chromatography (Silica gel; hexanes/EtOAc up to 30%). Collected product was sonicated in methanol and pale yellow powder was filtered and dried in air (4.46 g; 5.82 mmol; yield 41%). $^1$H NMR (400 MHz, CDCl₃) δ 7.32 (d, J=8.7 Hz, 4H), 6.91 (dd, J=8.7, 2.4 Hz, 9H), 6.60 (d, J=8.6 Hz, 4H), 6.25 (s, 2H), 3.85 (s, 6H), 3.41 (s, 6H).

Synthesis of S068—12,12'-((4,4'-(perfluorocyclopent-1-ene-1,2-diyl)bis(5-(4-(tert-butyl)phenyl)thiophene-4,2-diyl))bis(4,1-phenylene))bis(12-methyl-2,5,8,11-tetraoxatridecane)

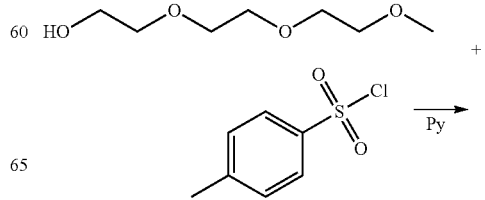

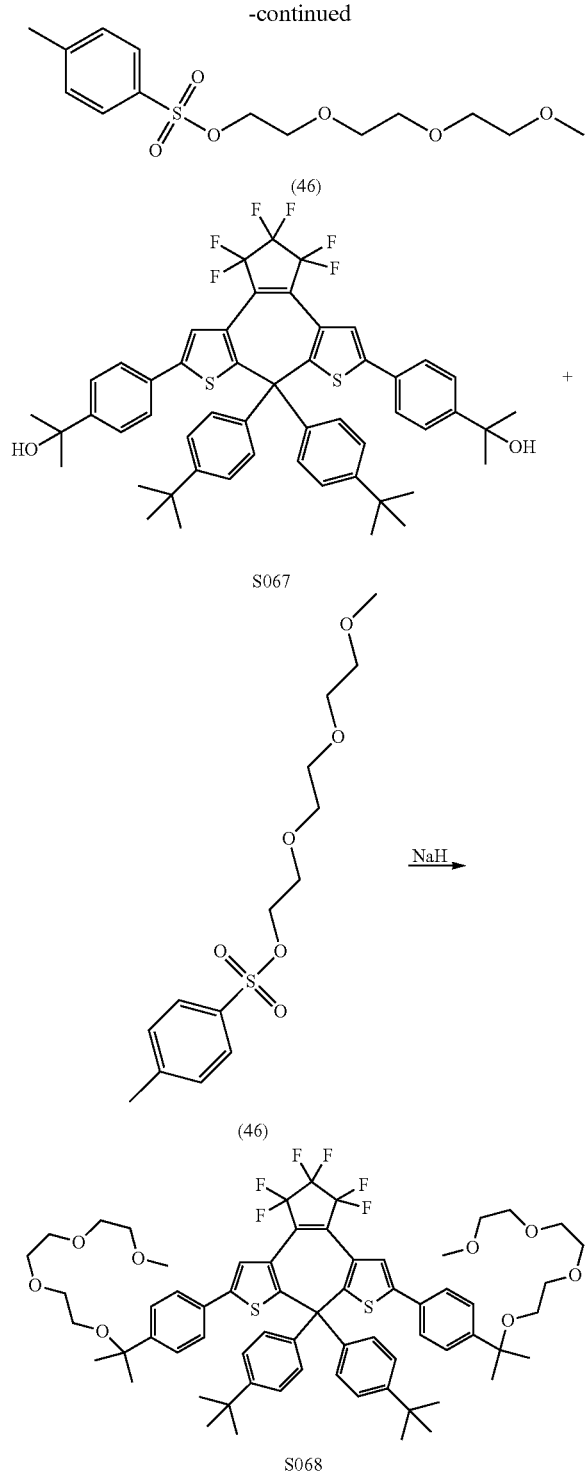

organic fractions were pooled, dried (MgSO₄ and NaHCO₃), filtered, and concentrated under reduced pressure to give 4.87 g, 15.3 mmol (79%) of 2-(2-(2-methoxyethoxy)ethoxy)-ethyl 4-methylbenzene sulfonate as a colorless oil.

Synthesis of S068

Sodium hydride (0.24 g, 6 mmol, 60% dispersion in oil) was washed with hexanes (6 mL) and a solution of di-alcohol S067 (1.33 g, 1.52 mmol) in THF (25 mL) was added under argon. The reaction mixture was stirred for 1 h at RT. To the resulting suspension was added a solution of (46) (1.06 g, 3.35 mmol) in anhydrous dimethylformamide (12 mL) in one portion and the mixture was stirred for 48 h. The reaction was quenched by addition of brine (100 mL) and extracted with EtOAc (3×100 mL). The organics were combined, washed with water (2×100 mL), dried over MgSO₄, filtered and evaporated to dryness. The residue was purified by column chromatography (Silica gel; hexane/EtOAc (50/50) as the eluent to obtain 1.24 g (1.06 mmol; 70%). ¹H NMR (400 MHz, CDCl₃) δ 7.44 (d, J=8.4 Hz, 4H), 7.36 (d, J=8.4 Hz, 4H), 7.09 (d, J=8.4 Hz, 4H), 6.96 (d, J=8.3 Hz, 4H), 6.21 (s, 2H), 3.72-3.68 (m, 12H), 3.66 (t, J=5.3 Hz, 5H), 3.61-3.57 (m, 4H), 3.43-3.37 (m, 10H), 1.58 (s, 12H), 0.95 (s, 18H).

Example 2: Preparation of Variable Transmittance Optical Filters

Method A:
An ITO-coated PET substrate having a thickness of 7 mil (~178 microns) and a sheet resistance of S50 ohms/square (0050, made by CP Films) is cut into two 15 cm×15 cm sheets. The substrate may be cleaned before use, and is temporarily laminated to glass plates to facilitate handling. Steel spacers are positioned at the perimeter of the PET, to set the gap for the final pressed device (from 20-70 microns). A volume of switching material (below, heated to facilitate dispensing), is placed on the PET to completely fill the gap between the PET sheets when the device is pressed. A second piece of glass-backed PET is placed on top, so that the PET sheets overlap such that there is some ITO coating exposed, to act as the external electrical contacts. The sandwich (glass-PET-switching material-PET-glass) is placed in the center of a press platens (heated to 45° C.). Pressure greater than 160 psi is applied to the filter using a Carver hydraulic press, or nip rollers, for a time sufficient to allow the switching material to attain a uniform thickness (at least 10 seconds, up to about a minute, or up to several hours). After the pressure is released, the glass plates are separated, any excess switching material is wiped off and conductive tape is applied to the exposed ITO. Total thickness of an optical filter (e.g. ITO-coated PET+switching material) is about 16 mil (~406 microns), including a 2 mil (~51 microns) layer of switching material.

Method B:
An ITO-coated PET substrate is prepared as described above. A switching material comprising a low-boiling solvent (e.g. THF as per Formulation #7) is then coated onto the conductive side of a first sheet of ITO-coated PET using a slot die, a knife coater, or other roll-to-roll coating method (according to manufacturer's instructions). The thickness of the coater is set such that the final coating once the low-boiling solvent is evaporated off is the desired thickness. For example, to obtain a final switching material thickness of about 50 microns, the initial wet coating may be set to about 114 microns. The low-boiling solvent is evaporated from the switching material using blown air or heat or a combination Synthesis of 2-(2-(2-methoxyethoxy)ethoxy)ethyl 4-methylbenzene sulfonate (46)

To a solution of p-toluenesulfonyl chloride (3.17 g, 19.3 mmol) in 20 mL of pyridine was added 2-(2-(2-methoxyethoxy)ethanol (4 g, 21 mmol), stirred at 0° C. for 12 h and at RT for 2 h. To this suspension, water and hexanes and ethyl acetate were added and separated. The organic layer was neutralized with dilute HCl and separated again;

of both. A second layer of ITO-coated PET is laminated on top of the coating with the conductive side in contact with the switching material to form a sandwich structure. The laminated structure is cut to the desired size (if required) and electrical contacts (e.g. busbars) added. An exemplary optical filter produced in this manner demonstrated a total thickness of about 16 mil (~406 microns), with a switching material layer of about 2 mil (~51 microns).

Example 3: Preparation of the Switching Material

The switching material was formulated to demonstrate how the components of the formulation can be varied. These formulations can be readily adapted to a desired application by a worker skilled in the art, by replacing the listed ingredients with one or more other ingredients in accordance with embodiments of the present invention. Table 1 sets out formulations for switching material that may be used in a device according to various embodiments of the invention. Compounds that may be used in the formulations include those according to Formulae IA/IB, and those illustrated herein. In some examples, the compound used in a formulation may be S001, or a derivative thereof having a functional groups on one or more of the four peripheral thiophene rings; or S002, or a derivative thereof having a functional group on one or more of the peripheral phenyl rings; or S042, or a derivative thereof having another functional group on one or more of the peripheral phenyl rings; or S054, or a derivative thereof having another functional group on one or more of the peripheral phenyl rings; or S068, or a derivative thereof having a functional group on one or more of the peripheral phenyl rings.

PEGDMA, solvents, electrolytes, initiators, charge carriers, co-solvents, polymers and other formulation components are available from commercial suppliers (e.g. Sigma-Aldrich); or as indicated. DAROCUR™ is available from CIBA Specialty Chemicals of Basel Switzerland, a division of BASF. PVB B-90 is available from Butvar, a division of Solutia Inc. of St. Louis, Mo.

Formulation #2 was prepared for photostationary state (PSS) determination, using $2\times10^{-5}$ M of the indicated compound, in a solvent (triglyme).

Formulation #7, upon removal of co-solvent (evaporation) yields a switching material according to Formulation #4.

Hybrid P/E compounds used in formulation #1 include S001 or a derivative thereof having different functional groups on the four peripheral thiophene rings, or S002 or a derivative thereof having different functional groups on the four benzene rings. Hybrid P/E compounds used in formulation #2 include S054 or a derivative thereof having different functional groups on the four benzene rings. Hybrid P/E compounds used in formulation #3 include S001 or a derivative thereof having different functional groups on the four peripheral thiophene rings, or S002 or S042 or a derivative thereof having different functional groups on the four benzene rings. Hybrid P/E compounds used in formulation #4 include S001 or a derivative thereof having different functional groups on the four peripheral thiophene rings, or S054 or a derivative thereof having different functional groups on the four benzene rings. Hybrid P/E compounds used in formulation #5 include S054 or a derivative thereof having different functional groups on the four benzene rings. Hybrid P/E compounds used in formulation #6 include S001 or a derivative thereof having different functional groups on the four peripheral thiophene rings, or S054 or a derivative thereof having different functional groups on the four benzene rings. Hybrid P/E compounds used in formulation #7 include S054 or a derivative thereof having different functional groups on the four benzene rings. Hybrid P/E compounds used in formulation #8 include S042. Hybrid P/E compounds used in formulation #9 include S001.

Example 4: Optical Properties of Switching Material

The optical properties of the switching material are tested with samples of the switching material. The VLT spectrum of formulation #3 comprising S001, S002 or S042 were determined for light and dark states. An Ocean Optics spectrometer was used to measure the % visible light transmittance of the sample, in its light and dark states, over an electromagnetic spectrum. The formulation is first

TABLE 1

Switching Material Formulations

| Formulation component | Type of formulation component | Formulation (% wt of components) | | | | | | | |
|---|---|---|---|---|---|---|---|---|---|
| | | 1 | 3 | 4 | 5 | 6 | 7 | 8 | 9 |
| hybrid P/E compound | | 3 | 3 | 5 | 3.4 | 3.4 | 2 | 0.5 | 5 |
| solvent | triglyme | 75 | 74 | 72 | 70.7 | 70.6 | 28.8 | 93.5 | |
| | cyclopentanone | | | | | | | | |
| | tetraglyme | | | | | | | | |
| | GBL | | | | | | | | 89 |
| electrolyte | LiClO4 | 1 | 1 | | | | | 1 | |
| | TBAPF6 | | | 1 | 1 | 1 | 0.4 | | 1 |
| polymer | PEGDMA860 | 15 | | | | | | | |
| | PMMA | | 15 | | | | | 5 | 5 |
| | PVB B90 | | | 22 | 24.9 | 25 | 8.8 | | |
| initiator | DAROCUR | 0.01 | | | | | | | |
| charge carrier | TBPA | 6 | 6 | | | | | | |
| | HALS A | | | | | | | | |
| cosolvent | THF | | | | | | 60 | | |
| charge compensator | DNB | | 1 | | | | | | |
| | PB | | | | | | | | |
| Total (wt %) | | 100 | 100 | 100 | 100 | 100 | 100 | 100 | 100 | exposed to UV light to switch to the dark state, decreasing the transmittance of the material in the visible range between about 400 and about 750 nm. An electric charge of 2 Volts is then applied to the switching material sample for 3 minutes, causing the sample to revert to its light state. In the light state, more light is permitted to pass through the switching material resulting in an increase in percent transmittance in the range from 400 to 750 nm. An exemplary spectra for S001 demonstrated a VLT in the light state of about 80%, and the visible light transmittance in the dark state is about 20%. This provides a contrast ratio of 4.

Figure 13:
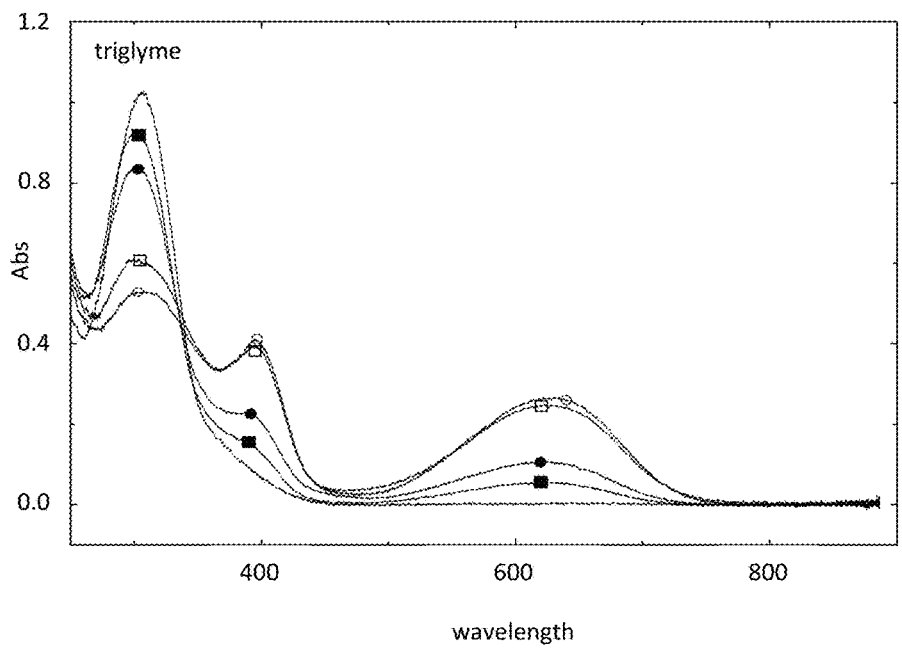
FIG. 13 shows an exemplary plot of the absorbance spectra of a hybrid photochromic/electrochromic switching material according to Formulation #2, comprising compound S054. Faded state (solid line); darkened using a 365 nm light source without (open circle) or with (open square) EnergyFilm™; and darkened using a solar simulator without (solid circle) or with (solid square) EnergyFilm™.

The sensitivity of the switching material to the intensity of UV light was also studied. Formulation #2 was exposed to both UV light at 365 nm and solar radiation (using a solar simulator) with and without a UV blocking film made by Energy Film of Portland, Ore. The Energy Film UV blocking film acts as a band-pass filter and effectively blocks the high intensity UV light (below about 365 nm). As illustrated in FIG. 13, depicting the absorbance spectra of the switching material under the various UV light intensities, the switching material maintains sensitivity to the low intensities of UV light (above about 365 nm) to darken. FIG. 13 shows a plot of the absorbance spectra of S054 in triglyme in a faded state (solid line); darkened using a 365 nm light source without (open circle) or with (open square) EnergyFilm™; and darkened using a solar simulator without (solid circle) or with (solid square) EnergyFilm™. In a faded state (solid line), the absorbance of the formulation is reduced to baseline. Absorbance reaches a maximum at about 620-240 nm for all sample treatments, with the maximum absorbance varying with light source and presence or absence of a partial UV blocking layer. Highest absorbance is reached for a UV light source without EnergyFilm™—about 0.265. Placement of the UV blocking layer between the sample and light source reduces the maximum absorbance to about 0.254. Simulated full spectrum sunlight provides a maximum absorbance in the dark state of about 0.105; inclusion of the UV blocking layer reduces the maximum absorbance to about 0.055.

Example 5: Visible Light Transmittance (VLT) Determination of the Optical Filter The VLT of the optical filter prepared by method A described in Example 2 comprising formulation #4 with S054 was measured using an Ocean Optics spectrometer. Optical filters exposed to 365 nm UV light for about 3 minutes had a VLT of 17%. The transmission increased after application of a charge of 2 Volts for about 3 minutes to 69%.

Example 6: Haze Determination of the Optical Filter

The clarity of the optical filter prepared by method A described in Example 2 comprising formulation #4 with S054 or S001 was measured using a XL-211 Hazegard Hazemeter manufactured by BYK Gardner. The haze of the optical filter was measured to be about 2%.

Example 7: Switching Speed Determination of the Optical Filter

Switching speed is determined by the amount of time it takes for the optical filter to go from the dark state to the light state, and vice versa. To transition from the light state to the dark state, the optical filter is exposed to 365 nm UV light for 3 minutes. To transition from the dark state to the light state, a charge of 2 Volts is applied to the filter for 3 minutes. Switching time from the light state to the dark state is measured as the time required to achieve 90% of the VLT of the dark state from the fully light state. Switching time from the dark state to the light state is measured as the time required to achieve 90% of the VLT of the light state, from the fully dark state.

The optical filter prepared by the method A described in Example 2 comprising the switching material that had been prepared according to formulation #4 comprising S001 or S054, the optical filter comprising a UV blocking film (Energy Film) applied to the glass-backed PET opposite to the switching material, was tested. The switching speed of the optical filter is about 30 seconds from the light state to the dark state, and about 2 minutes for switching from the dark state to the light state. The switching speed of the optical filter prepared according to formulation #1 comprising S001 or S002 was measured to be about 35 seconds from the dark state to the light state and 2 minutes from the light state to the dark state. The switching speed of the optical filter prepared according to formulation #7 with S054, measured to be about 3 minutes 20 seconds from the dark state to the light state and 12 seconds from the light state to the dark state. The switching time for transitioning from the light state to the dark state can be different from the switching time for transitioning from the dark state to the light state.

Example 8: Photostability Determination of the Optical Filter

Photostability of the optical filter is determined by exposing the samples to UV light similar to the UV light in the solar spectrum. Samples are tested at regular intervals to determine degradation. When the contrast ratio has dropped to 50% of the original contrast ratio of the device (determined prior to testing), the device is considered to have failed. The photostability of the optical filters is determined using a QUV accelerated weathering tester from Q-Labs. Photostability of the optical filter is also determined using an S16 accelerated testing instrument from Solar Light to test the photostability of the optical filter at higher power densities. The photostability of the optical filter made according to the method described in Example 2 comprising formulation #5 using S054 was tested on a QUV for 1300 hours at about 7.3 mW/cm$^2$ before 50% degradation was reached. The same optical filter was tested on a Solar Light unit at 135 mW/cm$^2$ for 540 hours before 50% degradation was reached.

Example 9: Cycling Durability Determination of the Optical Filter

Cycling durability is determined by exposing the optical filter to continuous UV light using a Spectroline transilluminator and applying a voltage to the optical filter at regular time intervals. First, the amount of time required to darken and lighten the optical filter is determined. This is then used to determine how much time the voltage should be turned on and off for in the automated test. Typically, the voltage "on" time is set to be the amount of time it takes for the optical filter to bleach to about 90% of its initial value. The voltage "off" time is set to be the amount of time it takes for the optical filter to darken to 90% of its original value. The cycling is then controlled by an automated cycling set-up using a PC, a LabJack instrument (available from LabJack Corporation of Lakewood Colo.). In the "off" state, the two electrodes are shorted together to dissipate the charge on the optical filter.

The cycling durability of an optical filter made according to the method described in Example 2 comprising formulation #6 comprising S054, with a UV blocking film (Energy Film) applied to the glass-backed PET opposite to the switching material, was tested. To observe the effect of ambient atmosphere on the durability of the device, a first preparation of the formulation (6-1) was prepared at the bench (exposed to ambient atmosphere), and a second preparation of the formulation (6-2) was prepared in an oxygen-free atmosphere (glove box). The optical filter comprising formulation 6-1 demonstrated 741 switching cycles before reaching a 50% degradation point (the contrast ratio decreased to 50% of the starting contrast ratio). In comparison, the optical filter comprising formulation 6-2 demonstrated 1553 cycles before reaching a 50% degradation point.

Example 10: Sheet Resistance Determination of the Optical Filter

The operability of optical filters using substrates of different sheet resistances was tested. Optical filters were made according to the method described in Example 2 comprising formulation #4 with S001 or S054 and ITO-coated substrates of S0 Ohms/square, 100 Ohms/square, and 300 Ohms/square. Optical filters were also made comprising formulation #8 with S042, and ITO-coated substrates of 1,000 Ohms/square, and 100,000 Ohms/square. The optical filters were tested for the ability to transition between light and dark states. In all examples the optical filters were still able to lighten upon application of electricity; optical filters with lower sheet resistance s were observed to switch faster.

Example 11: Required Voltage Determination of the Optical Filter

To determine the minimal voltage required to cause the optical filters to switch from the dark state to the light state, incrementally higher voltages are applied until the device begins to transition from the dark to the light state. In an optical filter made according to the method described in Example 2 comprising the switching material that had been prepared according to formulation #4 with S001 or S054, fading from the dark to light state is observed at about 1.8 Volts. The transitioning is faster at about 2 Volts. It has been observed that too high a voltage may not be desirable because other electrochemical reactions may be introduced that may cause fouling of the electrodes. For example, transitioning in the optical filter is impacted when a voltage greater than about 2.5 volts is applied, and brown spots are observed if the optical filters are left at that potential for a longer period of time.

Example 12: Intermediate States of the Optical Filter

A prototype device made using formulation #3 comprising S001, S002 or S042 was tested for the ability to achieve intermediate states. The device was first darkened under UV light (365 nm) although solar light can equally be used. A DC voltage of about 2 Volts was then applied to the device for a short period of time (e.g., about 10% of the total switching time) before being switched off. During the time the power was applied the VLT of the device increased, but did not go all the way to the light state. Once the voltage was switched off, the device remained in its intermediate dark state without the need for any further application of power. If the voltage is turned on again, the device continued to transition to its light state.

Example 13: Photostability of Chromophores in Switching Materials of the Optical Filter The photostability of chromophores in various combinations of the switching material, are tested by exposing the combination to UV light similar to the UV light in the solar spectrum. Optical filters comprising the combination are tested at regular intervals to determine degradation. When the contrast ratio of a device drops to 50% of the original contrast ratio (determined prior to testing), the device is considered to have failed. The photostability of an optical filter comprising the combination is determined using a QUV or QSUN accelerated weathering tester from Q-Labs, or an S16 accelerated testing instrument from Solar Light (SL) to test the photostability of the combination at higher power densities. Chromophores were tested in combination with various switching material components prepared according to Example 2 and the results are shown in Table 2 below. Each chromophore was capable of achieving 700 hours in at least one of the combinations of switching material before 50% degradation was reached.

TABLE 2

Formulation and flexible devices tested. All devices employed EnergyFilm ™ UV blocker applied externally, save for Device #26. Device 25 included an additional acetate layer. All devices employed OC50 substrate, save for Device #32 (glass substrate) and Device #2 (graphene substrate). PB - 50 nm layer of Prussian blue electrochemically deposited on electrodes.

| Device | | | Formulation | | | | | | | |
|---|---|---|---|---|---|---|---|---|---|---|
| No. | Size (cm) | Thickness ($\mu$) | Chromophore (%) | Polymer (%) | Solvent | Electrolyte (%) | Additives | method | avg int (mW/cm$^2$) | Failure (hours) |
| 1 | 1.5 (ø) | 60 | S001 (3) | PVB (25) | Triglyme | | | SL | 120 | 438 |
| 2 | 1.5 (ø) | 60 | S001 (3) | PVB (25) | Triglyme | | | SL | 130 | 288 |
| 3 | 1.5 (ø) | 50 | S001 (3) | PVB (25) | Triglyme | | | SL | 110 | 255 |
| 4 | 1.5 (ø) | 60 | S068 (3) | PVB (25) | Triglyme | | | SL | 110 | 191 |
| 5 | 9 × 6 | 50 | S054 (3.5_ | PVB (25) | Triglyme | | | QUV | 9.8 | 1537 |
| 6 | 2.5 × 2.5 | 50 | S068920) | PVB (25) | Triglyme | | | QUV | 9.8 | 1130 |
| 7 | 9 × 6 | 50 | S054 (3) | PVB (25) | Tetraglyme | TBAPF6 (1) | | QUV | 9.8 | 1073 |
| 8 | 2.5 × 2.5 | 50 | S068 (15) | PVB (25) | Triglyme | | | QUV | 9.8 | 1037 |
| 9 | 1.5 (ø) | 50 | S054 (3.5) | PVB (20.2) | Triglyme | TBAPF6 (1) | HALS A | SL | 95 | 104 |
| 10 | 2.5 × 2.5 | 50 | S068 (10) | PVB (25) | Triglyme | | | QUV | 9.8 | 901 |
| 11 | 1.5 (ø) | 60 | S001 (3) | PVB (25) | Triglyme | | | QUV | 9.8 | 865 |
| 12 | 1.5 (ø) | 50 | S054 (3.5) | PVB (20.2) | Triglyme | TBAPF6 (1) | | SL | 110 | 76 |

TABLE 2-continued

Formulation and flexible devices tested. All devices employed EnergyFilm ™ UV blocker applied externally, save for Device #26. Device 25 included an additional acetate layer. All devices employed OC50 substrate, save for Device #32 (glass substrate) and Device #2 (graphene substrate). PB - 50 nm layer of Prussian blue electrochemically deposited on electrodes.

| | Device | | Formulation | | | | | | | |
|---|---|---|---|---|---|---|---|---|---|---|
| No. | Size (cm) | Thickness (μ) | Chromophore (%) | Polymer (%) | Solvent | Electrolyte (%) | Additives | method | avg int (mW/cm$^2$) | Failure (hours) |
| 13 | 3 × 5 | 50 | S054 (3) | PVB (25) | Triglyme | | PB | QUV | 9.8 | 837 |
| 14 | 9 × 6 | 50 | S054 (3) | PMMA (25) | Triglyme | | | QUV | 9.8 | 801 |
| 15 | 9 × 6 | 50 | S054 (3) | PEMA (25) | Triglyme | | | QUV | 9.8 | 794 |
| 16 | 9 × 6 | 50 | S054 (3) | PVB (25) | Triglyme | | | QUV | 9.8 | 787 |
| 17 | 1.5 (ø) | 60 | S068 (3) | PVB (25) | Triglyme | | | QUV | 9.8 | 772 |
| 18 | 9 × 6 | 50 | S054 (3) | PVB (25) | Tetraglyme | | | QUV | 9.8 | 636 |
| 19 | 9 × 6 | 50 | S054 (2) | PVB (24) | Triglyme | TBAPF6 (1) | | QUV | 9.8 | 608 |
| 20 | 9 × 6 | 50 | S054 (3.5) | PEMA (25) | Tetraglyme | TBAPF6 (1) | | QUV | 9.8 | 586 |
| 21 | 2.5 × 2.5 | 50 | S068 (5) | PVB (25) | Triglyme | | | QUV | 9.8 | 572 |
| 22 | 9 × 6 | 50 | S054 (3) | PMMA (25) | Tetraglyme | | | QUV | 9.8 | 543 |
| 23 | 3 × 5 | 50 | S054 93.5) | PVB (25) | Tetraglyme | TBAPF6 (1) | PB | QUV | 9.8 | 522 |
| 24 | 3 × 5 | 50 | S054 (3.5) | PVB (25) | Tetraglyme | TBAPF6 (1) | | QUV | 9.8 | 522 |
| 25 | 3 × 5 | 50 | S054 (6) | PVB (22) | Triglyme | TBAPF6 (1) | | Qsun | 5.6 | 688 |
| 26 | 7.5 × 7.5 | 50 | S054 (5) | PVB (25) | Triglyme | | | QUV | 9.8 | 386 |
| 27 | 9 × 6 | 36 | S054 (1.5 | PVB (24) | Triglyme | TBAPF6 (1) | | QUV | 9.8 | 358 |
| 28 | 9 × 6 | 25 | S054 (2) | PVB (24) | Triglyme | TBAPF6 (1) | | QUV | 9.8 | 293 |
| 29 | 2.5 × 2.5 | 50 | S068 (2..5) | PVB (25) | Triglyme | | | QUV | 9.8 | 136 |
| 30 | 9 × 6 | 50 | S054 (1.7) | PMMA (25) | PC | | | QUV | 9.8 | 64 |
| 31 | 9 × 6 | 50 | S054 (3.5) | PVB (25) | GBL | | | QUV | 9.8 | 21 |

Example 14: Impact of Optical Filter on Electrical Consumption and CO$_2$ Emissions The ability of a variable transmittance window of embodiments of the present invention to provide significant energy and cost savings was determined. A building with variable transmittance IGUs was modeled using window and energy modeling software (Window 6, Optics5) available from Lawrence Berkeley National Laboratories of Berkeley, Calif.). The building modeled was a 400 square foot small office with a 0.9 wall-to-window ratio. The building was modeled in five U.S. cities (Miami, Los Angeles, New York, Houston, and Chicago). The variable transmittance smart window used for the model is an insulating glass unit with an optical filter laminated onto one of the panes, and a low emissivity coating on the inside of the exterior pane facing the sealed space. The variable transmittance smart window used for the model was an insulating glass unit (IGU) with an optical filter laminated onto one of the panes, and a low emissivity coating on the inside of the exterior pane facing the sealed space. A variable transmittance window of this configuration was determined to achieve a solar heat gain coefficient (SHGC) of about 0.15 in the dark state, and about 0.32 in the light state. Using this variable transmittance window in the dark state resulted in average electricity savings of 28%, according to the model. The electricity savings resulted from a reduced requirement for air conditioning due to the variable transmittance windows. CO$_2$ emissions were reduced from about 19% to about 25%, due mostly to the reduction in electricity usage.

The variable transmittance window of the model achieves a solar heat gain coefficient (SHGC) of about 0.15 with a corresponding percent visible light transmittance (VLT) of about 10% in the dark state. In the light state, the percent visible light transmittance of the variable transmittance window increases to about 58-60%, and the solar heat gain coefficient increases to 0.32. In the dark state, the variable transmittance window has a significantly lower solar heat gain coefficient than standard low-emissivity ("Low-E") glass. Standard Low-E glass in the same model achieves an SHGC of about 0.36, with a VLT of about 60-62%. Standard float glass (no coatings) in the same model achieves an SHGC of about 0.68, with a VLT of about 68%. Solarban 70XL Glass from PPG Industries (Pittsburgh, Pa.) in the same model achieves an SHGC of about 0.24, with a VLT of about 47%. The standard float glass has the highest solar heat gain coefficient while Solarban 70XL glass has the best SHGC of the non-dynamic glazings. The SHGC of an IGU using standard float glass is about 0.70 (according to the dataset included with the software). The SHGC of an IGU made using the Solarban 70XL glass is about 0.25 (according to the dataset included with the software). The model demonstrates that an SHGC of less than 0.25 can be achieved with variable transmittance smart windows and dynamic glazings. In this example, the modeled variable transmittance window was assumed to have a contrast ratio of about six.

Example 15: Photovoltaic Panel Size

As the size of the optical filter increases, power demand of the device may increase, and the relationship of power demand to device size may affect selection of the type and/or configuration of an energy harvesting power source. A constant voltage of about 2 volts was applied to a variety of sizes of optical filters comprising a hybrid P/E switching material (windows, lenses and test devices), and current draw analyzed to determine the steady-state current of the optical filter after 5 minutes of applied voltage (all devices had achieved a faded state by this time). FIG. 14A shows a plot of power draw (W) vs. device size (m$^2$) of the devices of Table 3 (with trend line), demonstrating a non-linear relationship between power draw (P=VI) and device size. Table 4 sets out examples of power requirements for devices of various sizes, according to some embodiments of the invention.

TABLE 3

Current and power draw for hybrid P/E devices of varying size.

| Device # | Size (W × H) | Area (cm2) | Max Current [mA] | Steady State Current [mA] | Steady State Power [mW] | Steady State Power per m2 [W/m2] |
|---|---|---|---|---|---|---|
| 1B | 7.7 cm × 7.4 cm | 56.98 | 12.4 | 0.183 | 0.341 | 0.060 |
| 2 | 7.7 cm × 7.3 cm | 56.21 | 10.6 | 0.305 | 0.609 | 0.108 |
| 3 | 7.6 cm × 7.5 cm | 57 | 10.5 | 0.403 | 0.803 | 0.141 |
| 4 | 7.7 cm × 7.5 cm | 57.75 | 12.4 | 0.256 | 0.511 | 0.089 |
| 6 | 24.4 cm × 24.9 cm | 607.56 | 32.7 | 3.149 | 6.282 | 0.103 |
| 9 | 4.4 cm × 2.9 cm | 12.76 | 2.9 | 0.049 | 0.097 | 0.076 |
| D3602 | 80 cm × 81.3 cm | 6504 | 62.7 | 7.9 | 16.195 | 0.025 |

TABLE 4

Power requirements for switching of variable transmittance optical filters comprising a hybrid P/E switching material, for various size devices.

| Device size (m$^2$) | Power (W) | Example devices |
|---|---|---|
| 0.001-0.1 | 0.001-0.008 | Opthalmic devices |
| 0.1-1 | 0.008-0.02 | Opthalmic devices, vehicle windows, architectural windows |
| 1-2 | 0.02-0.025 | vehicle windows, architectural windows |
| 2-4 | 0.025-0.03 | vehicle windows, architectural windows |
| 4-6 | 0.03-0.034 | vehicle windows, architectural windows |
| 6-10 | 0.034-0.04 | architectural windows |

As illustrated in FIGS. 14A and B, and set out in Tables 3 and 4, the power requirement of a hybrid P/E device increases with increasing size of the device however this relationship is not linear, and the power draw per unit area can decrease as the area of the device increases (illustrated in FIG. 14B). The range of wattage per unit area of device is from about 0.0034 w/m$^2$ to about 8 w/m$^2$ of optical filter in a device. This reduced power requirement for devices comprising a hybrid P/E switching material may be of particular interest for applications such as architectural glass involving large areas (windows), as the power requirements of the large windows may be satisfied with a relatively small power source compared to 'smart' windows using other types of variable transmittance technologies. For small devices, while the wattage per unit area for a small device appears large (e.g. 8 W/m$^2$ for smallest devices), the device area itself may be small (e.g. lens of an opthalmic device).

While the efficiency of a photovoltaic energy harvesting power source may vary, it is known that the relationship between power output and size (area) is substantially linear—a larger device produces more power. As an example, a lens of a ski goggle may have an area of about 17×6 cm (about 0.1 m$^2$), and fading of the ski goggle lens would be expected to draw about 0.007-0.008 W. For a solar cell capable of producing at least 3.9 W/ft$^2$ (41.97 W/m$^2$), about 28 mm$^2$ of solar cell area would be expected to meet this ski goggle lens power draw. An exemplary automotive sunroof of about 38×63 cm (about 0.24 m$^2$), would be expected to draw about 0.01-0.02 W; a solar cell of the same efficiency would require an area of about 273 mm$^2$ would be expected to meet this sunroof's power draw. An exemplary window of about 36×58 inches (91×147 cm, or about 1.33 m$^2$) would be expected to draw about 0.019-0.02 W; the same efficiency solar cell of about 602 mm$^2$ would be expected to be able to meet this window's power draw.

Example 16: Insert Window

Several insert window configurations were modeled for U-value, solar heat gain coefficient (SHGC), and visible light transmittance (VLT) using window modeling software packages Optics5 and Window 6.3, available from Lawrence Berkeley National Laboratories of Berkeley, Calif.—URL: http//windows.lbl.gov/materials/optics/). The insert windows were modeled with a 63.5 mm (2.5") gap between the insert window and the existing (single pane, exterior) window. For insert windows that are IGUs, the surfaces of the IGU insert window are numbered as described herein. For insert windows that are not IGUs, the surfaces of the pane are referred to as surface A and surface B—surface A, when the insert window is installed faces the exterior of the building, and surface B faces the interior of the building. A glass pane with a low-emissivity (low-E) coating on it used for the configurations is Solarban 70XL; a glass pane with a hard coat low-E coating on it is Sungate S00. A flexible film variable transmittance optical filter (VTOF) comprises first and second ITO-coated PET substrate films with switching material disposed therebetween as described herein; a rigid variable transmittance optical filter (VTOF) comprises a flexible film optical filter laminated between a first pane and a second pane with PVB. The rigid VTOF may be the single pane of the insert window (e.g. configuration C), or may be a pane of an IGU insert window (e.g. configurations E, F and F-2). First, second and optional third panes may be 3 mm float glass.

Single Pane: a single pane clear glass window with no treatments or coatings (e.g. as may be found in an older installation; not an IGU). For the model, this is the existing window in the building (e.g. 353 of FIGS. 15 and 16).

Configuration A: a single pane insert window comprising a low-E hard coat on surface A and a flexible VTO filter laminated to surface B using a pressure sensitive adhesive (PSA). Configuration A is a relatively light insert window, about 17-24 lb for a 15 ft$^2$ window.

Configuration B: a single pane insert window comprising a flexible VTO filter laminated to surface A using a PSA. Configuration B is a relatively light insert window, about 17-24 lb for a 15 ft$^2$ window.

Configuration B-2: a single pane insert window comprising a low-E coating on surface B and a flexible VTO filter laminated to surface A using PSA. Configuration B-2 is a relatively light insert window, about 17-24 lb for a 15 ft$^2$ window.

Configuration C: an insert window comprising a rigid VTO filter and a low-E hard coat on surface A. Configuration C is a medium weight insert window, about 34-48 lb for a 15 ft$^2$ window. FIG. 17 illustrates a rigid VTO filter comprising first and second panes, and a flexible VTO filter laminated therebetween with PVB.

Configuration D: an insert window comprising a rigid VTO filter and a low-E hard coat on surface B. Configuration C is a medium weight insert window, about 34-48 lb for a 15 ft² window. FIG. 17 illustrates a rigid VTO filter comprising first and second panes, and a flexible VTO filter laminated therebetween with PVB.

Configuration E: an IGU insert window as shown in FIG. 16, comprising a flexible VTO filter laminated to surface #2 of the IGU, a low-e coating (soft coat) on surface #3 of the IGU, and a 12.7 mm gap with argon fill Configuration E is a moderate weight insert window, about 34-48 lb for a 15 ft² window.

Configuration F: an IGU insert window as shown in FIG. 18 comprising a variable transmittance layer (comprising PVB interlayers) between the first pane (the pane facing the exterior of the building when the insert window is installed) and a third pane (first and third panes provide surfaces #1 and #2 of the IGU). Configuration F comprises a low-E soft coat on surface #3 of the IGU and a 12.7 mm gap with argon fill. Configuration F is a heavier weight insert window, about 51-72 lb for a 15 ft² window.

Configuration F-2: an IGU insert window similar to configuration F, but with the low-E coating on the opposite side of the gap (argon gap). The window comprises a variable transmittance layer comprising a variable transmittance optical filter and PVB interlayers between the first pane and a third pane (first and third panes provide surfaces #1 and #2 of the IGU). Configuration F-2 comprises a low-E soft coat on surface #2 of the IGU and a 12.7 mm gap with argon fill. Configuration F-2 is a heavier weight insert window, about 51-72 lb for a 15 ft² window. Table 5 shows the results of the modeling of the different insert window configurations A-F.

solid bars represent the SHGC when the insert window is in the dark state. All of the insert window configurations modeled demonstrated lower SHGC values compared to the single pane base case for both the dark and light states. This can provide increased energy efficiency through reduced air conditioning costs. The single pane insert windows demonstrate moderate SHGC reductions compared to the original single pane windows. Of the single-pane insert window configurations, configuration B-2 demonstrates the best SHGC reduction. Configuration B-2 comprises a variable transmittance film facing the exterior of the building and the low-E coating oriented facing the interior of the building. This is an unexpected result—low-E coatings are known in the art to be optimally oriented facing an air gap (e.g. surface #3 of a conventional IGU) in part to protect the low-E coating from handling or abrasion, however the interaction and impact off the positioning of a VTO filter and low-E coating on SHGC has not been previously investigated. For a single-pane insert window, this would mean the low-E coating should be oriented facing the exterior side of the building (surface A, as per configuration A, with VTO filter on surface B). However, configuration B-2 (low-E on surface B, with VTO filter on surface A) shows significantly lower SHGC characteristics than configuration A. This is consistent with the trend observed for the rigid VTO filter windows of configuration C and D. Configuration D, which has a low-E coating facing the interior of the building, also demonstrates lower SHGC values than configuration C, which has the low-E coating facing the exterior of the building.

TABLE 5

VLT, SHGC and U-Value of modeled windows of configurations A-F.

| Window Properties | Single Pane | A | B | C | D | E | F | F-2 | B-2 |
|---|---|---|---|---|---|---|---|---|---|
| VLT - Untinted | 0.899 | 0.668 | 0.718 | 0.69 | 0.69 | 0.516 | 0.532 | 0.532 | 0.668 |
| VLT - Tinted | N/A | 0.252 | 0.273 | 0.272 | 0.271 | 0.197 | 0.212 | 0.212 | 0.252 |
| SHGC - Untinted | 0.86 | 0.679 | 0.701 | 0.687 | 0.628 | 0.323 | 0.345 | 0.287 | 0.613 |
| SHGC - Tinted | N/A | 0.652 | 0.651 | 0.649 | 0.548 | 0.204 | 0.231 | 0.205 | 0.521 |
| SHGC Change | N/A | 0.027 | 0.05 | 0.038 | 0.08 | 0.119 | 0.114 | 0.082 | 0.092 |
| U-Value (W/m2-K) | 5.912 | 2.143 | 2.831 | 2.08 | 2.094 | 0.981 | 0.964 | 0.964 | 2.156 |

Figure 19A:
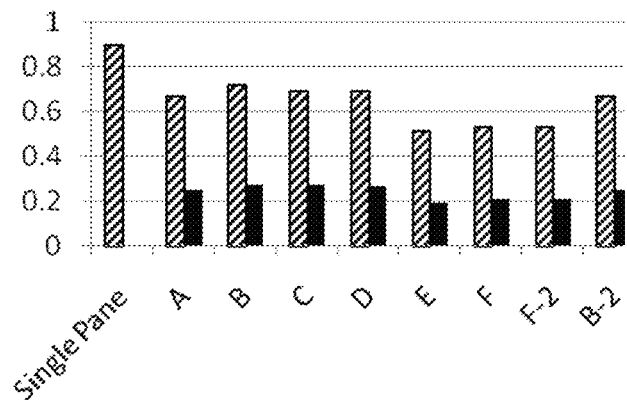
FIGS. 19A, 19B, 19C show, for window configurations A-F, bar graphs of visible light transmittance (VLT) of the modeled windows x axis indicates the window configuration modeled, y axis is the VLT (hatched bars window in dark state; solid bar—window in faded state) (FIG. 19A); solar heat gain coefficient (SHGC) of the modeled windows—x axis indicates the window configuration modeled, y axis is the unitless SHGC values (hatched bars—window in dark state; solid bar—window in faded state) (FIG. 19B); C) U-value ($W/m^2$-K) of the modeled window—x axis indicates the window configuration modeled, y axis is the U-value (FIG. 19C)
Figure 19B:
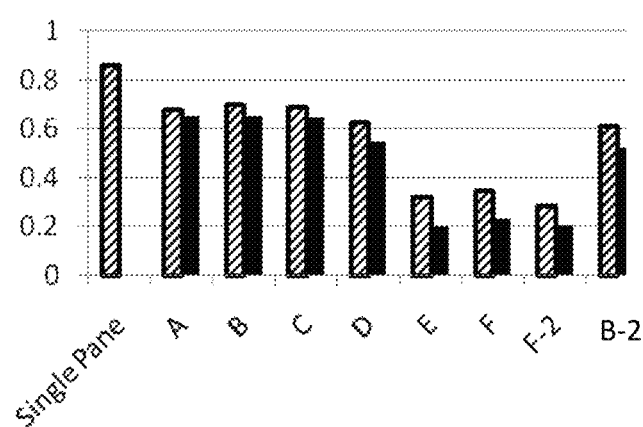
Figure 19C:
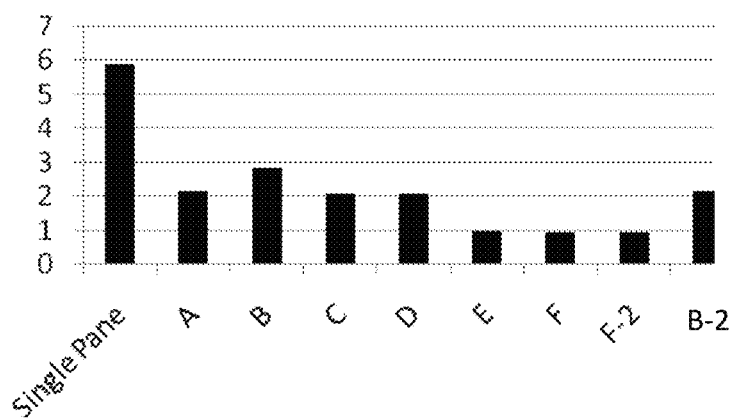

FIGS. 19A-C provide bar graphs of VLT, SHGC, and U-Value for modeled windows of configurations A-F. FIG. 19A shows the VLTs of the different configurations modeled. Only a single VLT is shown for the base single pane case because the window does not have variable transmittance. For configurations A through F, F-2, and B-2, VLTs are shown in the light state (bars with hashed lines) and in the dark state (solid bars) for each configuration. The same variable transmittance optical film was used in each configuration. The IGU insert windows (configurations E, F and F-2) demonstrate reduced light transmission overall in both dark and faded states because these devices comprise at least one additional layer of glass (relative to configurations A-D), as well as an argon-filled gap. The presence of a low-E coating also serves to reduce the overall VLT of the insert window. Modeled windows provided a contrast ratio of about 2.50 to 2.65. Other ratios may be obtained depending on the thickness and/or composition of the switching material (e.g. type and concentration of hybrid P/E compound) as described herein.

FIG. 19B shows the SHGC values for the insert window configurations modeled. The hatched bars represent the SHGC when the insert window is in the light state, and the The three IGU configurations (E, F, and F-2) demonstrate the greatest SHGC reductions. IGUs are known to generally provide better thermal insulation than a single pane, however the interaction and impact of the positioning of a VTO filter and low-E coating on SHGC in an IGU used as an insert window has not been previously investigated. For the configurations tested, the VTO filter is mounted away from the interior of the building (laminated to surface #2 for configuration E, or between surfaces #1 and #2, for configurations F and F-2). The variable transmittance optical filter can absorb light in its dark state and heats up as a result. If the VTO filter is located next to the building's interior, the heat can be transferred more easily into the building, whereas when the VTO filter is separated from the interior of the building by an air gap, and in some configurations, an additional pane of glass, less heat is transferred into the building (hence the lower SHGC value). Soft-coat low-E coatings may have a greater impact on SHGC values than hard-coat low-E coatings because soft-coat low-E coatings can reflect near-infra-red (IR) radiation, further reducing the heat entering the building. An IGU insert window may be desirable for some installations in that it provides a greater SHGC reduction, however the increased weight and cost of the IGU insert window should also be considered.

FIG. 19C shows the U-Values calculated by the modeling software for the combination of existing single pane window and the various insert window configurations modelled. The U-Value is a measure of the insulative value of the window configuration and how much energy is lost or gained through the window by heat conduction. A lower U-Value means that less heat can be conducted into or out of a building through the windows over a given period of time. All of the insert window configurations modeled demonstrated significantly lower U-Values than the original single pane windows by themselves. In the case of the single-pane insert windows, configurations A, C, D, and B-2 demonstrated similar U-Value reduction. Configuration B, while still significantly better insulating than the single pane base case, demonstrated a slightly higher U-Value than the other single-pane insert window configurations—this may be due to the lack of a low-E coating. The IGU insert window configurations E, F, and F-2 provided even lower U-Values than the single-pane insert window configurations because of the extra layer of glass and the extra air space in the IGU.

The insert windows demonstrated reduced U-values relative to a single pane of glass; inclusion of a low-E coating provided a lower U-value (compare configurations A and B). However, the relative position of the low-E coating and VTOF did not affect the U-value as much (compare configurations A and B-2; C and D), IGU insert windows configurations demonstrated improved U-values, again arrangement and configuration of low-E and VTOF did not affect the U-value greatly configurations E, F and F-2).

Example 17: Energy Consumption Model

Figure 20:
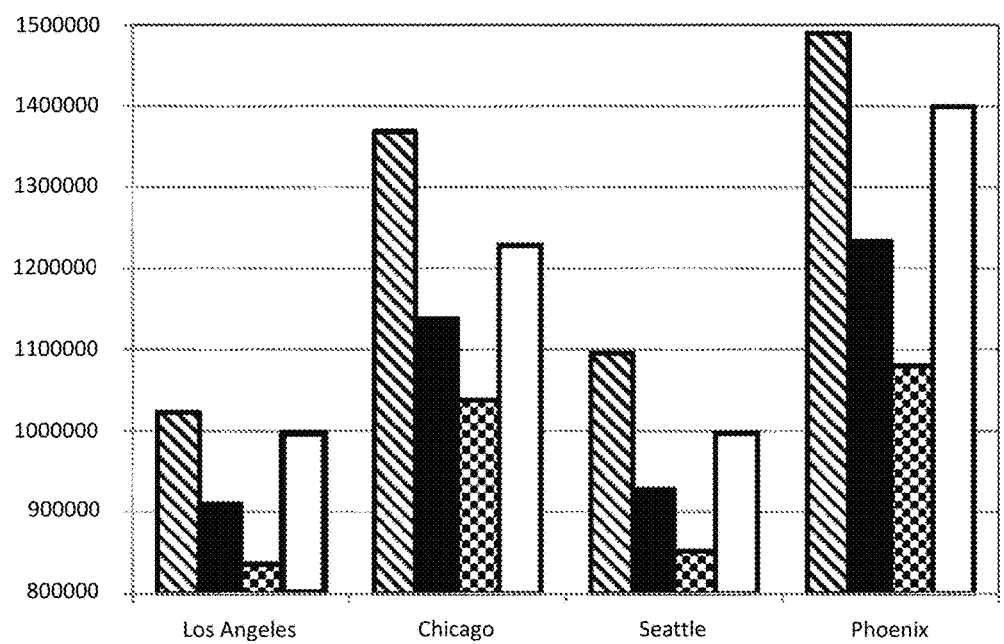
FIG. 20 shows a bar graph illustrating the energy used for an office building modeled using the DoE EnergyPlus package in four cities, with four window configurations. Y axis is Annual Energy use in kWh. Striped bars—single pane window with no insert; solid bar; single pane window with single pane insert window comprising variable transmittance optical filter (equivalent to configuration B-2); checked bars—double pane IGU smart insert window with variable transmittance optical filter (configuration E above; open bars—single pane clear insert window with float glass and low-E coatings or any variable transmittance.

FIG. 20 shows an example of the overall energy impact of several insert window configurations on the annual energy use of a medium-sized office building in four different locations. The modeling was done using the US Department of Energy's EnergyPlus software version 6.0. Reference building input files (also from the US Department of Energy) for pre-1980 construction were used with minor modifications. Briefly, the window-to-wall ratio was increased from 33% to 66%; the U-values and SHGC of the input files were replaced with the U-values and SHGC values obtained from the model described in Example 16; and the software was set to switch the smart insert windows from the light state to the dark state when the solar irradiance exceeded 100 W/m$^2$ and the exterior temperature was higher than 10° C. Four different cases were considered:

1) original single pane windows with no insert window (striped bars);
2) single pane smart insert window with variable transmittance optical filter (equivalent to configuration B-2 above) (solid bars);
3) double pane IGU smart insert window with variable transmittance optical filter (configuration E above) (checked bars); and
4) single pane clear insert window with float glass and no low-E coatings or any variable transmittance film (open bars).

Simulations were run for each case in four different locations: Los Angeles, Chicago, Seattle, and Phoenix. As can be seen in FIG. 20, energy use could be significantly reduced in all four locations through the addition of an insert window to the existing single pane window. In all locations, the variable transmittance single-pane window (configuration B-2) reduced the energy used by the building more than the plain clear insert window. The double-pane insert window (configuration E) reduced the energy used by the greatest margin in all four locations. The energy savings result from both reduced SHGC and reduced U-Value. The greatest energy savings result in Phoenix and Chicago, which are similar in latitude to Los Angeles and Seattle respectively, but have more extreme climates due to their inland location.

Other Embodiments

It is contemplated that any embodiment, aspect, example, method, composition, or element discussed in this specification may be implemented or combined in any suitable manner with any other embodiment, aspect, example, method, composition, or element.

The present invention has been described with regard to one or more embodiments. However, it will be apparent to persons skilled in the art that a number of variations and modifications can be made without departing from the scope of the invention as defined in the claims. Therefore, although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. In the specification, the word "comprising" is used as an open-ended term, substantially equivalent to the phrase "including, but not limited to," and the word "comprises" has a corresponding meaning. As used herein, the singular forms "a", "an" and "the" include plural referents unless the context clearly dictates otherwise. Citation of references herein shall not be construed as an admission that such references are prior art to the present invention, nor as any admission as to the contents or date of the references. All publications are incorporated herein by reference as if each individual publication was specifically and individually indicated to be incorporated by reference herein and as though fully set forth herein. The invention includes all embodiments and variations substantially as hereinbefore described and with reference to the examples and drawings.

Unless defined otherwise, all technical and scientific terms used herein have the same meaning as is commonly understood by one of ordinary skill in the art to which this invention belongs. If a definition set forth in this section is contrary to or otherwise inconsistent with a definition set forth in the documents that are herein incorporated by reference, the definition set forth herein prevails over the definition that is incorporated herein by reference.

What is claimed is:

1. A self-powered variable transmittance optical device film comprising:
    (a) a first and second substantially transparent substrate;
    (b) a switching material flexibly disposed on at least one of the first and second substantially transparent substrates, the switching material capable of transitioning between a light state and a dark state based at least in part on application of an electric voltage;
    (c) a first and second electrode both disposed on the first substantially transparent substrate, both disposed on the second substantially transparent substrate, or each disposed on one of the substantially transparent substrates;
    (d) an energy-harvesting power source flexibly disposed on the device film; and
    (e) an electrical system configured to receive power from the energy-harvesting power source and to provide power to the first electrode and the second electrode for application of the electric voltage, the electrical system disposed on the device film.

2. The optical device film of claim 1, wherein the optical device film comprises a window in a vehicle.

3. The optical device film of claim 1, wherein the optical device film comprises a sunroof.

4. A window comprising:
(a) a variable transmittance optical (VTO) filter comprising:
  (i) a first substantially transparent substrate;
  (ii) a second substantially transparent substrate;
  (iii) a first and second electrode both disposed on the first substantially transparent substrate, both disposed on the second substantially transparent substrate, or each disposed on one of the substantially transparent substrates;
  (iv) a switching material disposed between the first and second transparent substrates and operatively coupled to the first and second electrodes, the switching material transitionable from a first light transmittance state to a second light transmittance state with application of a first stimulus, and transitionable from the second light transmittance state to the first light transmittance state with application of a second stimulus, wherein at least one of the first stimulus and the second stimulus comprises a voltage applied to the switching material through the first and second electrodes;
(b) an energy harvesting power source; and
(c) an electrical system configured to receive power from the power source and to provide the voltage to the first electrode and the second electrode, wherein the electrical system comprises an energy storage component configured to receive and store power from the energy-harvesting power source, and to provide power for application of the voltage to the switching material,
wherein transitioning of the switching material from the first transmittance state to the second transmittance state under predetermined conditions requires an operating power exceeding a power delivery capacity of the energy-harvesting power source, and wherein the energy storage component is configured to facilitate providing the operating power under the predetermined conditions.

5. The window of claim 4, wherein the switching material comprises a compound that exhibits photochromic and electrochromic characteristics.

6. The window according to claim 4, wherein the energy-harvesting power source is selected from the group consisting of a piezoelectric power source, a photovoltaic power source, a vibrational energy-harvesting power source and a thermal energy-harvesting power source.

7. The window according to claim 4, wherein the energy-harvesting power source is a photovoltaic power source.

8. The window according to claim 7, wherein the photovoltaic power source has an area from about 1% to about 25% of the area of the variable transmittance optical filter.

9. The window according to claim 8, wherein the energy-harvesting power source is disposed on a surface of the window.

10. The window according to claim 8, wherein the energy-harvesting power source is disposed away from a surface of the window.

* * * * *